United States Patent
Enokida et al.

(10) Patent No.: US 7,580,577 B2
(45) Date of Patent: Aug. 25, 2009

(54) METHODS, APPARATUS AND COMPUTER PRODUCTS FOR GENERATING JPEG2000 ENCODED DATA IN A CLIENT

(75) Inventors: Miyuki Enokida, Kanagawa (JP); Tomoe Ishikawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 552 days.

(21) Appl. No.: 10/729,007

(22) Filed: Dec. 8, 2003

(65) Prior Publication Data
US 2004/0177155 A1    Sep. 9, 2004

(30) Foreign Application Priority Data

| Dec. 9, 2002 | (JP) | 2002-356738 |
| Jun. 20, 2003 | (JP) | 2003-176930 |
| Jul. 24, 2003 | (JP) | 2003-201162 |

(51) Int. Cl.
*G06K 9/36* (2006.01)
*G06K 9/20* (2006.01)
*G06F 15/16* (2006.01)

(52) U.S. Cl. ............... 382/232; 382/240; 382/282; 709/236; 709/247

(58) Field of Classification Search ............... 382/240, 382/232, 282; 709/236, 247
See application file for complete search history.

(56) References Cited

U.S. PATENT DOCUMENTS

| 5,481,374 A | 1/1996 | Tachibana et al. ............ 358/444 |
| 5,760,847 A | 6/1998 | Enokida ..................... 348/700 |
| 5,812,283 A | 9/1998 | Tachibana et al. ............ 358/444 |
| 6,041,143 A | 3/2000 | Chui et al. .................. 382/232 |
| 6,473,526 B1 | 10/2002 | Enokida ..................... 382/232 |

(Continued)

FOREIGN PATENT DOCUMENTS

JP       06-098125       4/1994

(Continued)

OTHER PUBLICATIONS

Deshpande, S.—"HTTP streaming of JPEG2000 images"—IEEE—2001, pp. 15-19.*
Marcellin, M.—"JPEG2000: Highly scalable image compression"—IEEE Apr. 2001, pp. 268-272.*

*Primary Examiner*—Bhavesh M Mehta
*Assistant Examiner*—Bernard Krasnic
(74) *Attorney, Agent, or Firm*—Fitzpatrick, Cella, Harper & Scinto

(57) ABSTRACT

Encoded data, which can be used by a versatile JPEG2000 decoder in a client, and can assure a high-speed decode process of the encoded data and a high-speed display process of image data, is suitably generated using fragmentary encoded data cached in the client, and fragmentary encoded data received as needed from the server. To this end, a client stores first encoded data of encoded data managed by a server, and calculates short second encoded data on the basis of encoded data required to generate JPEG2000 encoded data, and the first encoded data. The client acquires the second encoded data from the server, and segments the encoded data into a plurality of independent encoded data by interpreting the header information of the second encoded data. When not all data of independent encoded data are stored for each segmented unit, the client stores dummy encoded data, and outputs the encoded data as the JPEG2000 encoded data.

7 Claims, 37 Drawing Sheets

U.S. PATENT DOCUMENTS

| | | | |
|---|---|---|---|
| 6,668,086 B1 | 12/2003 | Enokida | 382/233 |
| 7,113,643 B2 * | 9/2006 | Le Leannec et al. | 382/235 |
| 7,200,272 B2 * | 4/2007 | Ishikawa | 382/233 |
| 7,236,637 B2 * | 6/2007 | Sirohey et al. | 382/240 |
| 2002/0118389 A1 * | 8/2002 | Fukuda et al. | 358/1.15 |
| 2002/0159653 A1 * | 10/2002 | Dekel et al. | 382/282 |
| 2003/0067627 A1 * | 4/2003 | Ishikawa et al. | 358/1.15 |
| 2003/0091333 A1 | 5/2003 | Kotani et al. | 386/69 |
| 2003/0142871 A1 | 7/2003 | Ishikawa | 382/233 |

FOREIGN PATENT DOCUMENTS

| | | |
|---|---|---|
| JP | 09-259263 | 10/1997 |
| JP | 2001-209566 | 8/2001 |
| JP | 2002-49514 A | 2/2002 |
| JP | 2002049514 A * | 2/2002 |
| JP | 2003-153187 | 5/2003 |
| JP | 2003-169216 | 6/2003 |

* cited by examiner

FIG. 6A

| Tile 0 | Tile 1 | Tile 2 | Tile 3 |
|---|---|---|---|
| Tile 4 | Tile 5 | Tile 6 | Tile 7 |
| Tile 8 | Tile 9 | Tile 10 | Tile 11 |
| Tile 12 | Tile 13 | Tile 14 | Tile 15 |

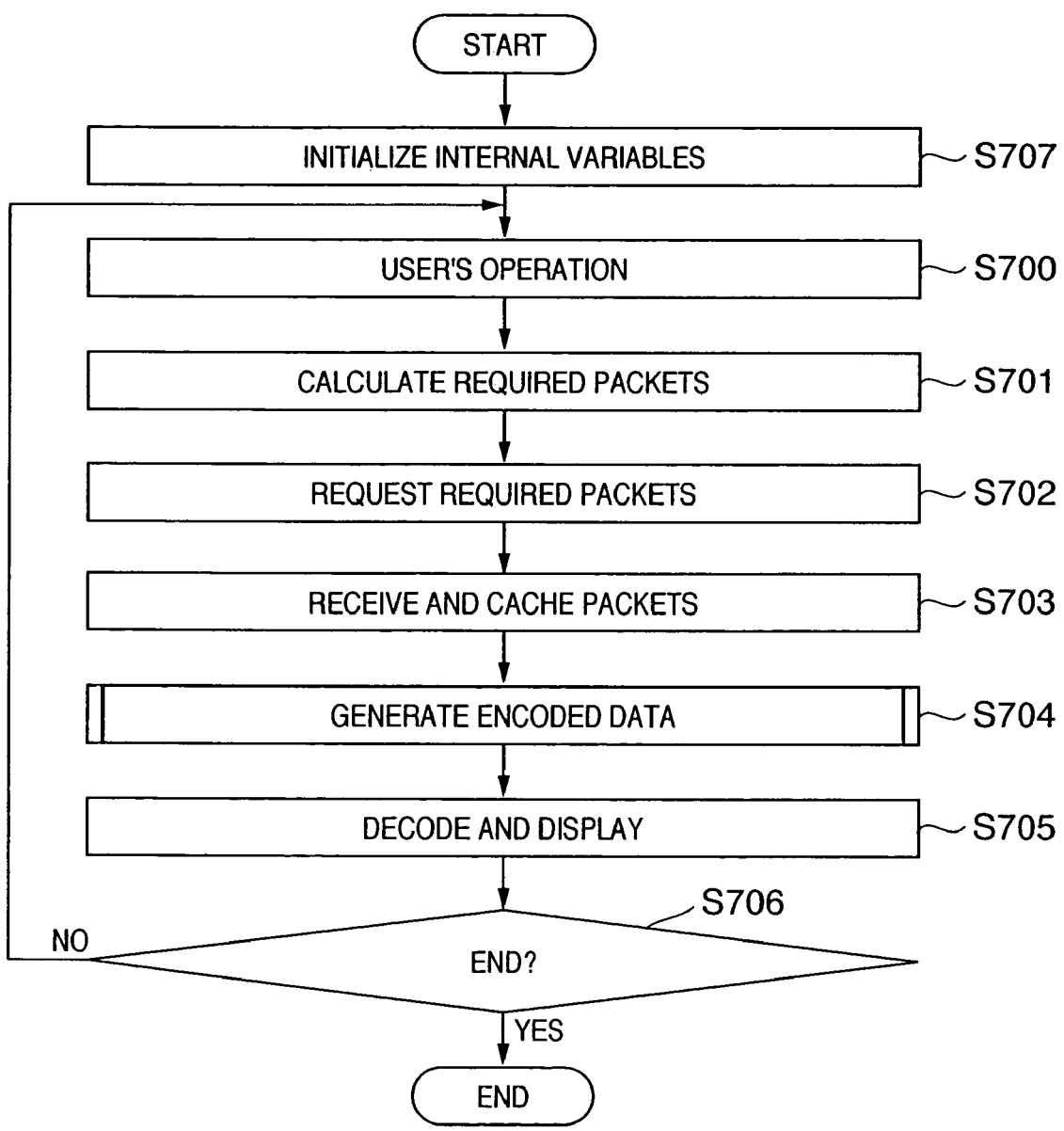

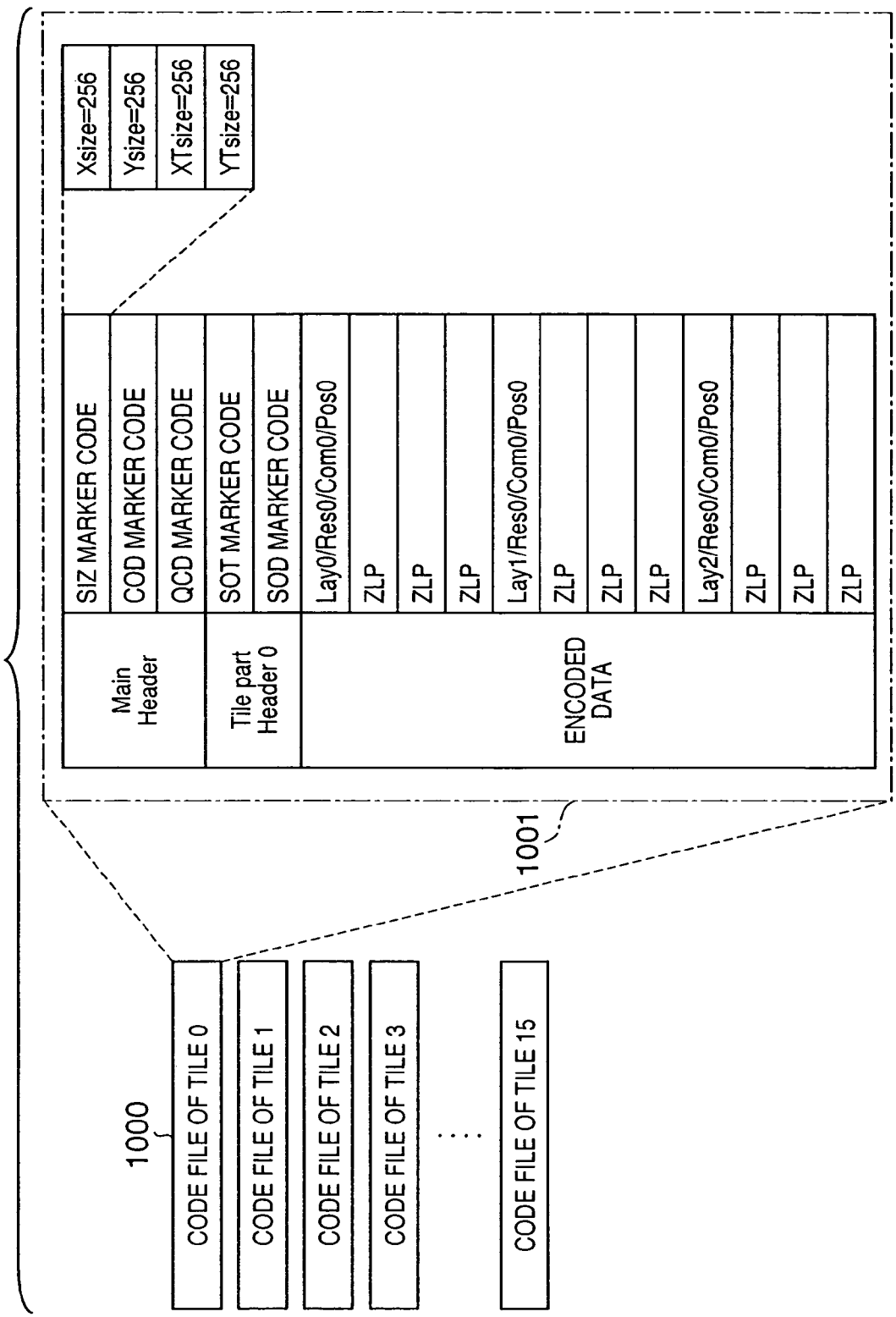

| | |
|---|---|
| Main Header | SIZ MARKER CODE |
| | COD MARKER CODE |
| | QCD MARKER CODE |
| Tile part Header 0 | SOT MARKER CODE |
| | SOD MARKER CODE |
| ENCODED DATA | Lay0/Res0/Com0/Pos0 |
| | ZLP |
| | ZLP |
| | ZLP |
| | Lay1/Res0/Com0/Pos0 |
| | ZLP |
| | ZLP |
| | ZLP |
| | Lay2/Res0/Com0/Pos0 |
| | ZLP |
| | ZLP |
| | ZLP |

1101

| | |
|---|---|
| Main Header | SIZ MARKER CODE |
| | COD MARKER CODE |
| | QCD MARKER CODE |
| Tile part Header 0 | SOT MARKER CODE |
| | SOD MARKER CODE |
| ENCODED DATA | Lay0/Res0/Com0/Pos0 |
| | Lay0/Res1/Com0/Pos0 |
| | Lay0/Res2/Com0/Pos0 |
| | ZLP |
| | Lay1/Res0/Com0/Pos0 |
| | Lay1/Res1/Com0/Pos0 |
| | Lay1/Res2/Com0/Pos0 |
| | ZLP |
| | Lay2/Res0/Com0/Pos0 |
| | Lay2/Res1/Com0/Pos0 |
| | Lay2/Res2/Com0/Pos0 |
| | ZLP |

1102

| | |
|---|---|
| Main Header | SIZ MARKER CODE |
| | COD MARKER CODE |
| | QCD MARKER CODE |
| Tile part Header 0 | SOT MARKER CODE |
| | SOD MARKER CODE |
| ENCODED DATA | Lay0/Res0/Com0/Pos0 |
| | Lay0/Res1/Com0/Pos0 |
| | Lay0/Res2/Com0/Pos0 |
| | Lay0/Res3/Com0/Pos0 |
| | Lay1/Res0/Com0/Pos0 |
| | Lay1/Res1/Com0/Pos0 |
| | Lay1/Res2/Com0/Pos0 |
| | Lay1/Res3/Com0/Pos0 |
| | Lay2/Res0/Com0/Pos0 |
| | Lay2/Res1/Com0/Pos0 |
| | Lay2/Res2/Com0/Pos0 |
| | Lay2/Res3/Com0/Pos0 |

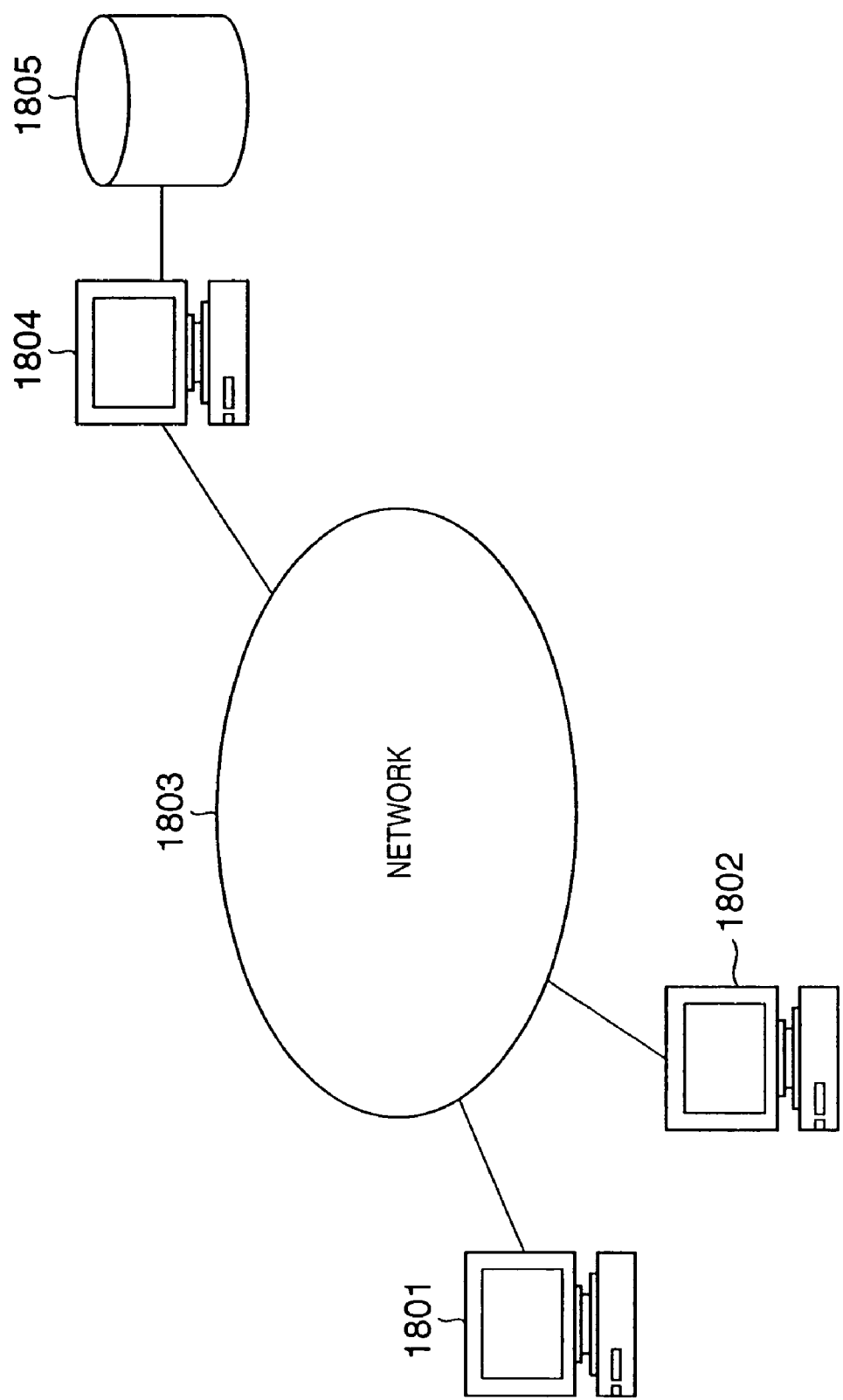

| Packet(tn, rn, cn, pn, 0) | Packet(tn, rn, cn, pn, 1) | ---- | Packet(tn, rn, cn, pn, qmax) |

PRECINCT DATA-BIN ID OF IMAGE WITH 2 RESOLUTION LEVELS, 1 LAYER, 3 COMPONENTS, 4 TILES, AND 1 POSITION/TILE

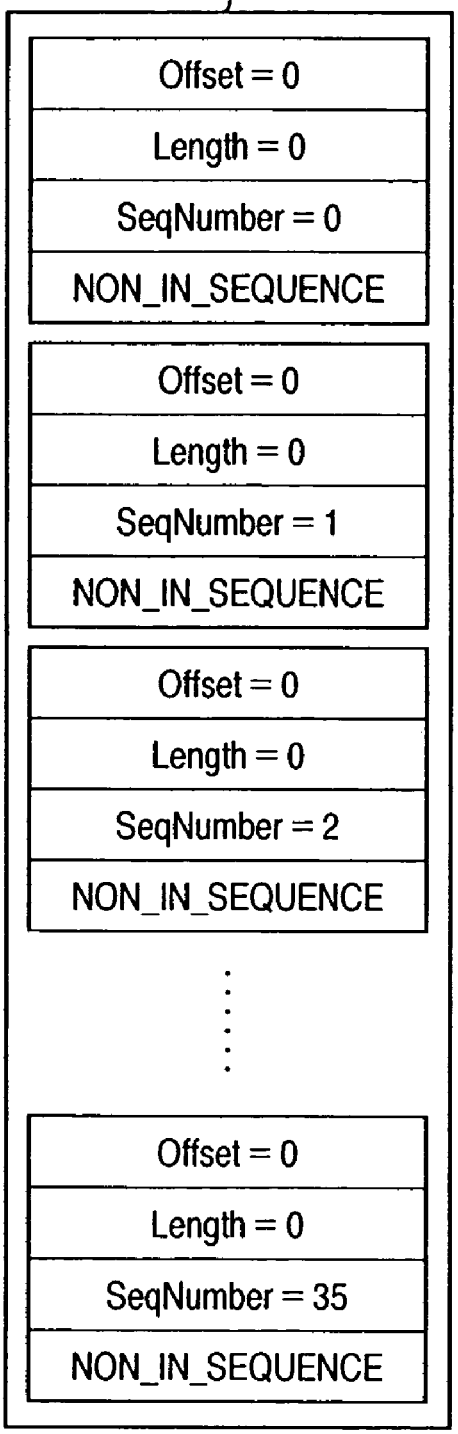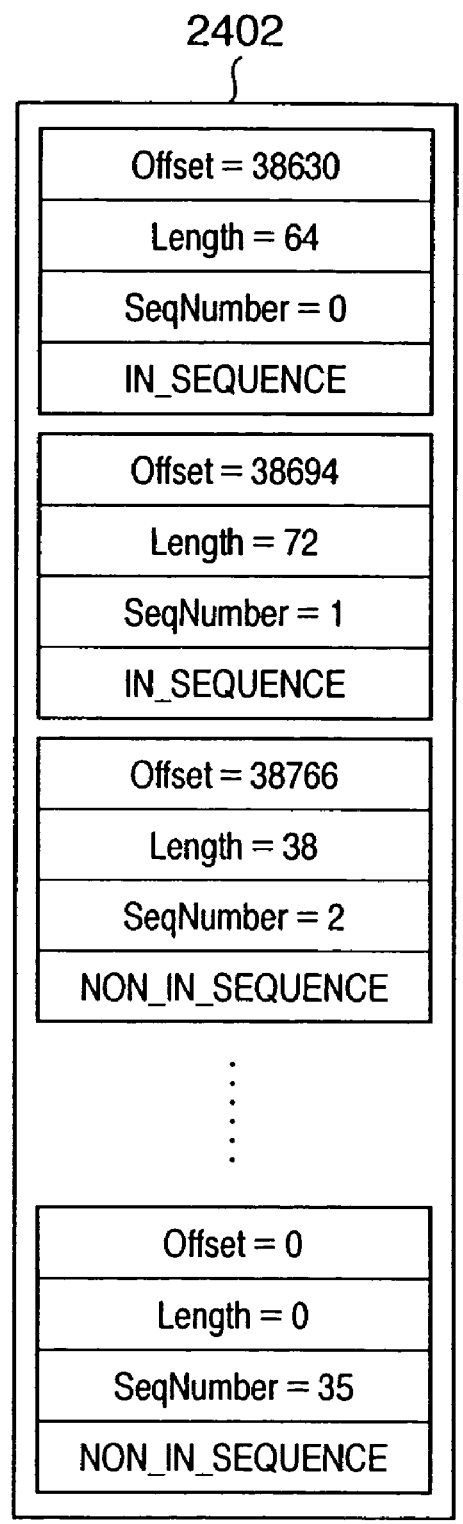
F I G. 24A    F I G. 24B

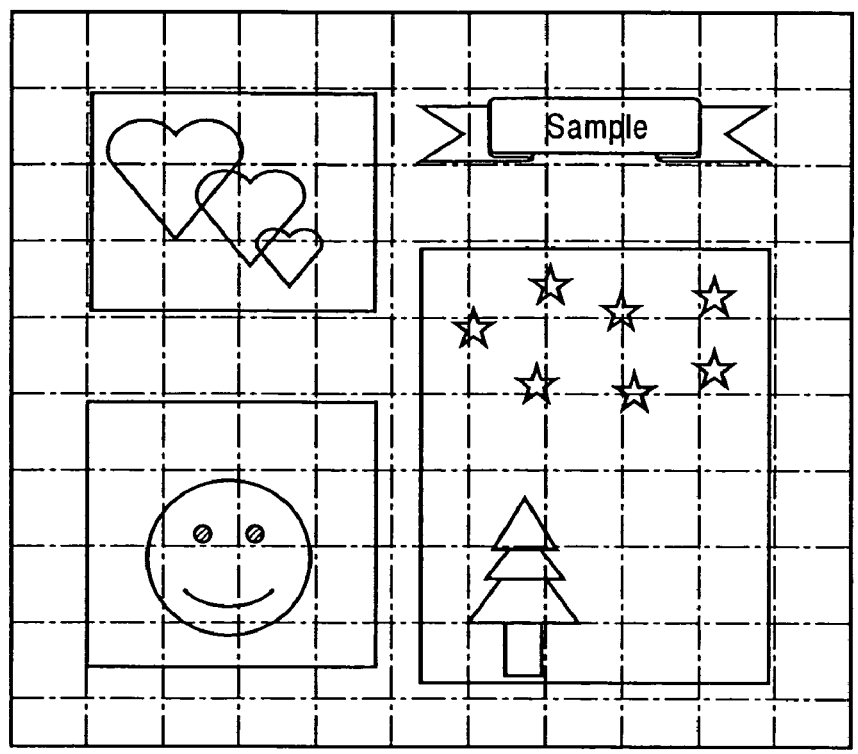
F I G. 34A
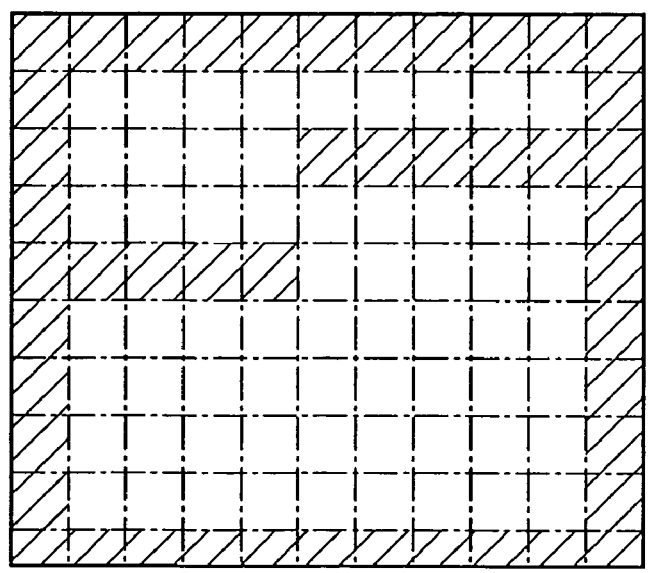
F I G. 34B

METHODS, APPARATUS AND COMPUTER PRODUCTS FOR GENERATING JPEG2000 ENCODED DATA IN A CLIENT

CROSS REFERENCE TO RELATED APPLICATIONS

This application claims priority under 35 U.S.C. § 119 to Japanese Application No. 2002-356738, filed Dec. 9, 2002, Japanese Application No. 2003-176930, filed Jun. 20, 2003, and Japanese Application No. 2003-201162, filed Jul. 24, 2003.

FIELD OF THE INVENTION

The present invention relates to a technique for generating encoded data from fragmentary image data received via a network. The present invention also relates to a technique for receiving a required number of packet data to obtain a desired image for each tile from an apparatus that holds encoded data of an image which is segmented into tiles each consisting of a plurality of packets, and managing the received packet data.

BACKGROUND OF THE INVENTION

On the Internet, users actively access WWW servers from Web browsers to browse information such as document data, image data, and the like. In a system environment which includes WWW servers that disclose information on the Internet, and clients used to browse such information in this way, each client can browse information disclosed by the WWW servers using a Web browser.

Each WWW server saves a document called a home page, which is prepared by describing information to be disclosed in HTML. The Web browser on the client side accesses such home page and displays it on a computer of the client side. Also, the Web browser on the client side can acquire required information by tracing links in displayed pages. Furthermore, as a method of downloading files managed by the WWW server, a method called "File Transfer Protocol" (to be abbreviated as "FTP" hereinafter) is known. The FTP is a scheme for transferring the contents of a file on the WWW server to the client computer at a time via a network.

As a protocol that allows the client to fragmentarily access and display an image file managed by the server, Flashpix/IIP is known. This Internet imaging protocol (IIP) is optimal to the image data file format "Flashpix", and can request partial image data via a network. At this time, access is made for each tile specified by Flashpix. Some conventional techniques that use this IIP protocol have been disclosed (for example, see Japanese Patent Laid-Open No. 2002-49514).

A case will be examined below wherein this Flashpix/IIP is directly applied to JPEG2000. In JPEG2000, encoded data of each scalability is formed of difference data from data of scalability one level lower than that scalability. Hence, a method of cashing fragmentary encoded data received on the client side, and passing all encoded data to a decoder to decode them from the beginning, and a method of stopping a decoder during its process, passing the currently received encoded data to the decoder, and restarting decoding from the subsequent data of the previous process are known.

Of such methods, a method of extracting only required partial data from encoded image data having multi-resolution data and converting it into another encoded data has been conventionally proposed (see, e.g., U.S. Pat. No. 6,041,143).

Image data as a source in the above U.S. patent is encoded data which allows management of multi-resolution data using Wavelet transformation or Wavelet-like transformation. The above U.S. patent describes a method of extracting encoded data required to process data of a spatial region of user's choice from the source encoded data, and converting the extracted data into one independent encoded data. Note that partial encoded data extracted from the source encoded data correspond to code blocks of JPEG2000, and contain encoded data required to process the current request from the user.

With this method, when the client re-decodes encoded data sent from the server from the beginning, these fragmentary encoded data can be rebuilt into one encoded data file complying with JPEG2000 without any scheme like a cache.

However, since fragmentary encoded data are sent from the server side in the request order from the client side, a complicated process is required on the client side to convert the received encoded data into one encoded data complying with JPEG2000.

Also, fragmentary encoded data sent from the server may form a cache file of a unique format, and a JPEG2000 decoder on the client side may directly read this cache file. However, in this case, the JPEG2000 decoder requires a process for reading the unique cache file, resulting in a complicated process. In addition, a versatile JPEG2000 decoder cannot be used.

To avoid such problem, the following method may be used. That is, JPEG2000 encoded data are received for respective packets, and these packet data are cached. Upon passing encoded data to a decoder, zero length packet (to be abbreviated as "ZLP" hereinafter) data are padded in place of non-received packet data to generate one encoded file complying with JPEG2000 together with the already received packet data. In this way, a JPEG2000 file that can be processed by a general JPEG2000 decoder can be generated without any complicated processes such as a rewrite process of a main header, and the like.

However, encoded data generated using all received packet data does not consider any display modes that the user wants in terms of the image size, image quality, image region, and the like requested by the user who uses the application on the client side. For this reason, a decoder that receives such encoded data often generates a display frame using a decode result generated from some of the received data, and generation of one JPEG2000 encoded data file using all cached encoded data often results in a wasteful process of the decoder itself.

Furthermore, as the size of encoded data to be cached increases, more copy processes of data are required upon generating encoded data to be passed to the decoder. This prolongs a time required until display on the client, thus posing a problem, i.e., performance drop. Especially, when the user issues image enlarge command, scroll command, and the like, the size of cache data, which are not directly required for display, increases, and the aforementioned problem occurs frequently.

Furthermore, the above U.S. patent suffers the following problem. That is, when the technique described in the above U.S. patent is directly applied to IIP as a communication via a network, encoded data of all code blocks of all layers are sent in response to each request from the client, and even encoded data that have already been received by the client are transmitted. The contents of the header field of encoded data to be transmitted are rewritten by information (e.g., image size, layer information, etc.) of the currently requested image data, and original information of encoded data managed by the server cannot be acquired.

With either of the aforementioned protocols, data transmitted from the server is independent encoded data. For this reason, the server can return such data regardless of the order of transmission data.

As a protocol for fragmentarily accessing and displaying a file encoded according to JPEG2000, JPEG2000 image coding system—Part 9: Interactivity tools, APIs and Protocols (to be abbreviated as JPIP hereinafter) has been examined. When JPEG2000 image data is fragmentarily transmitted to the client terminal using such protocol, the client terminal must cache received fragmentary encoded data in one or more files so as to decode the transmitted image data. This is because encoded data of each scalability of JPEG2000 is difference data from data one level lower than that scalability.

Upon caching fragmentarily received JPEG2000 data in files, a method of appending data to cache files in the order they are received is known. With this method, cache data can be easily written in. In this case, identification data, offset values, and data lengths of respective data are written so as to manage cached data.

The client that requests data using this JPIP can use the following two different requests in association with a return method of response data.

1) fullwindow: leaves the transmission order of response data to server's discretion, but requests to surely return all request data 2) progressive: allows to delete some request data, but requests to return data in order of scalability in the image quality direction (layer progression order)

Therefore, when the client wants to surely receive all requested data, it issues the fullwindow request. Hence, the server returns data according to the server's implementation policy regardless of the process on the client side.

However, packet data are not always sent from the server in the progression order of an original image in the server. When the client terminal launches a plurality of threads, which acquire packet data at a time from one JPEG2000 file, there is less chance that the packet data are sent in the progression order.

For this reason, when packet data are written in the cache file in the order they are received, access to information used to manage cached data becomes random, and the number of times of seek processes in the cache file becomes large upon writing cache data, thus taking much time.

Furthermore, when the client terminal, which receives such fragmentary JPEG2000 data, decodes and displays the received data, cache data must be rearranged to an order of data that the decoder can process before they are read out. For example, when a versatile JPEG2000 decoder is used, it reads out cache data along the JPEG2000 bitstream syntax to generate one bitstream. Therefore, when data are appended in the order they are received, the number of times of seek processes in the cache file also increases upon reading out cache data, thus taking much time.

SUMMARY OF THE INVENTION

The present invention has been proposed to solve the conventional problems, and has as its objects to provide an encoded data generation method and apparatus. That is, according to the encoded data generation method and apparatus of the present invention, encoded data, which can be used by a versatile JPEG2000 decoder in a client, and can assure a high-speed decode process of the encoded data and a high-speed display process of image data, can be generated using fragmentary encoded data cached in the client, and fragmentary encoded data received as needed from the server.

In order to solve the aforementioned problems, according to the present invention, an encoded data generation method for generating JPEG2000 encoded data in a client which comprises storage means that stores fragmentary first encoded data of encoded data managed by a server, comprises: a calculation step of calculating short second encoded data on the basis of encoded data required in the client, and the first encoded data stored in the storage means; a request step of requesting of the server the calculated second encoded data; an acquisition step of acquiring the second encoded data from the server; a storage step of storing the acquired second encoded data in the storage means; a segmentation step of segmenting the encoded data into a plurality of independent encoded data by interpreting header information of the acquired second encoded data; a determination step of determining for each unit segmented in the segmentation step if all encoded data which form the independent encoded data are stored in the storage means; a dummy storage step of storing, when not all encoded data which form the independent encoded data are stored, dummy encoded data in correspondence with non-stored encoded data; and an output step of outputting the encoded data stored in the storage means as the JPEG2000 encoded data.

The encoded data generation method according to the present invention further comprises a substitution step of substituting, when it is determined in the determination step that all encoded data which form the independent encoded data are stored in the storage means, the encoded data stored in the storage means by the independent encoded data segmented in the segmentation step.

Furthermore, according to the present invention, an encoded data generation apparatus in a second computer which comprises storage means that stores fragmentary first encoded data of encoded data managed by a first computer, comprises: first storage means for storing the fragmentary first encoded data of the encoded data managed by the first computer; calculation means for calculating short second encoded data on the basis of encoded data required to generate JPEG2000 encoded data in the second computer, and the first encoded data stored in the storage means; request means for requesting of the first computer the calculated second encoded data; acquisition means for acquiring the second encoded data from the first computer; second storage means for storing the acquired second encoded data; segmentation means for segmenting the encoded data into a plurality of independent encoded data by interpreting header information of the acquired second encoded data; determination means for determining for each unit segmented by the segmentation means if all encoded data which form the independent encoded data are stored in the first or second storage means; third storage means for, when not all encoded data which form the independent encoded data are stored, storing dummy encoded data in correspondence with non-stored encoded data; and generation means for generating JPEG2000 encoded data using the encoded data stored in the first, second, and third storage means.

The present invention has been proposed to solve the conventional problems, and has as its objects to provide an image processing method and apparatus, which receive and cache encoded data so as to reduce the time required to access cached data and the number of times of access.

In order to achieve the object of the present invention, for example, an image processing method according to the present invention comprises the following arrangement.

That is, an image processing method to be executed by an image processing apparatus, which receives, from an apparatus that holds encoded data of an image which is segmented into tiles each consisting of a plurality of logical units and a format of which allows a plurality of different orders of logical units, data of an arbitrary number of logical units required to obtain a desired image for each tile, comprises: a management information generation step of generating management information used to manage respective logical units to be received; a sorting step of sorting the received logical units in accordance with numbers of tiles to which the respective logical units belong, and also sorting the respective logical units which belong to an identical tile in accordance with an order in that tile; and a registration step of sequentially appending data of the logical units sorted in the sorting step to the management information, and registering, in the management information, information allocated with locations of data of the respective logical units in the cache data that contains the appended data of the logical units and the management information.

In order to achieve the object of the present invention, for example, an image processing apparatus according to the present invention comprises the following arrangement.

That is, an image processing apparatus, which receives, from an apparatus that holds encoded data of an image which is segmented into tiles each consisting of a plurality of logical units and a format of which allows a plurality of different orders of logical units, data of an arbitrary number of logical units required to obtain a desired image for each tile, comprises: management information generation means for generating management information used to manage respective logical units to be received; sorting means for sorting the received logical units in accordance with numbers of tiles to which the respective logical units belong, and also sorting the respective logical units which belong to an identical tile in accordance with an order in that tile; and registration means for sequentially appending data of the logical units sorted by the sorting means to the management information, and registering, in the management information, information allocated with locations of data of the respective logical units in the cache data that contains the appended data of the logical units and the management information.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6A shows an example of tiles obtained by segmenting original image data stored in the server computer;

FIG. 7 is a flow chart for explaining an outline of the processing sequence by an application which runs on the client computer in the first embodiment;

FIG. 10 shows the configuration of code files of tiles after the code file process on a default window in the first embodiment of the present invention;

FIG. 11 is a view for explaining the states of code files for respective tiles of encoded data in the first embodiment;

FIG. 17 is a block diagram showing the basic arrangement of an image processing apparatus according to the first embodiment of the present invention, which comprises a PC (personal computer), workstation, or the like;

FIG. 18 is a diagram showing an overview of a system including the image processing apparatus shown in FIG. 17;

FIG. 24A shows initialized management information, and FIG. 24B shows updated management information;

FIG. 34A shows an image segmented into tiles according to the eighth embodiment of the present invention, and FIG. 34B shows tiles associated with only a background and those containing objects, which are distinguished using different colors in the image according to the eighth embodiment of the present invention.

DETAILED DESCRIPTION OF THE PREFERRED EMBODIMENTS

Preferred embodiments of the present invention will be described in detail hereinafter with reference to the accompanying drawings.

First Embodiment

Figure 1:
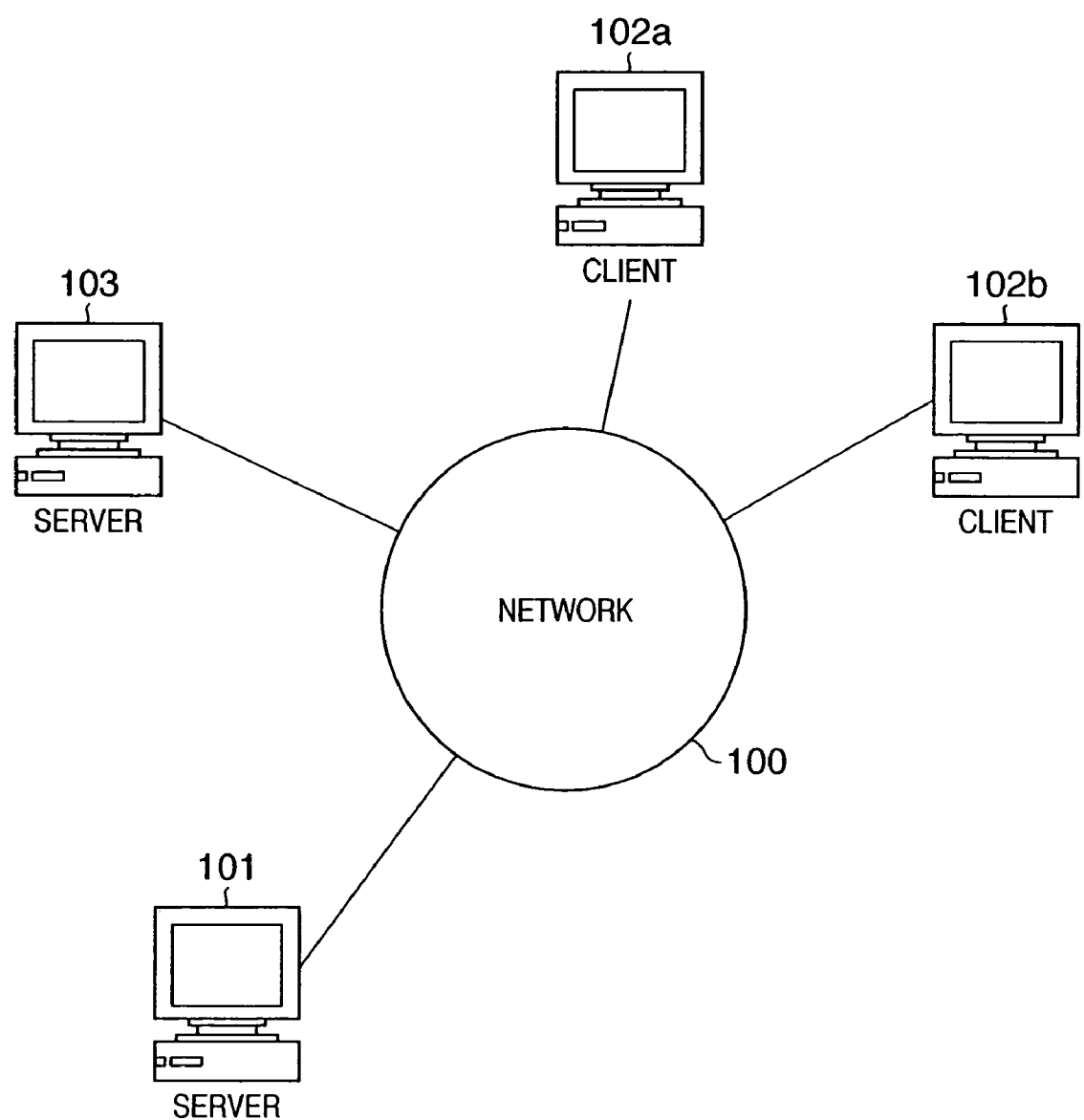
FIG. 1 is a schematic diagram showing the arrangement of a network system including servers and clients according to the first embodiment of the present invention.

FIG. 1 shows the connection state of a plurality of computers on a network, i.e., is a schematic diagram showing the arrangement of a network system including servers and clients according to the first embodiment of the present invention.

Referring to FIG. 1, reference numeral 100 denotes a network represented by the Internet. Reference numerals 101 and 103 denote server computers which are connected to the network 100, and on which software programs required for WWW server functions such as a JPEG2000 JPIP server for transmitting image data and the like run. Also, these server computers store image data in large quantities. Reference numerals 102a and 102b denote client computers on which software programs required for the client side such as a Web browser, JPEG2000 decoder, and the like run.

Figure 2:
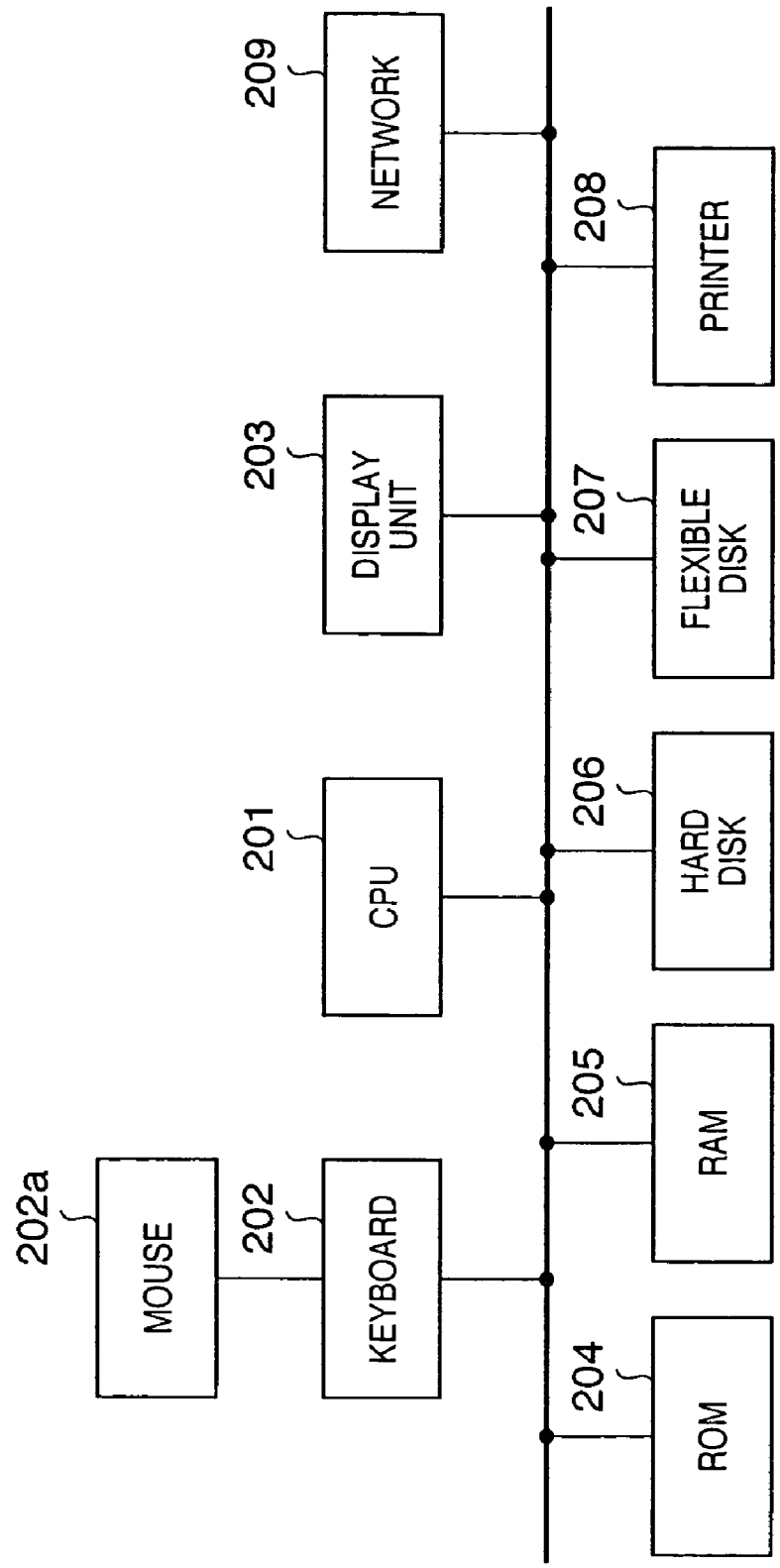
FIG. 2 is a block diagram showing an example of a computer system of a server computer 101 or 103, or a client computer 102a or 102b shown in FIG. 1.

FIG. 2 shows an example of the hardware arrangement of a computer system as the server computer 101 or 103 or the client computer 102a or 102b in FIG. 1. Referring to FIG. 2, reference numeral 201 denotes a CPU which controls the overall system. Reference numeral 202 denotes a keyboard which is used to input information and the like to this system together with a mouse 202a. Reference numeral 203 denotes a display unit, which comprises a CRT, liquid crystal display, or the like.

Reference numeral 204 denotes a ROM; and 205, a RAM. These ROM 204 and RAM 205 form a storage device in this system, and store programs to be executed by the system, data used by the system, and the like. Reference numeral 206 denotes a hard disk; and 207, a flexible disk, which form an external storage device used as a file system of this system. Furthermore, reference numeral 208 denotes a printer. Moreover, reference numeral 209 denotes a network control unit, which is used to access resources on the network such as the server computers and the like connected on the network 100 (e.g., the Internet or the like).

In this embodiment, each server computer manages already generated JPEG2000 files. On the other hand, each client computer accesses the server computer using JPIP to fragmentarily receive encoded data of only a required part of a JPEG2000 file of user's choice using an image display application or the like, and caches the received fragmentary encoded data on, e.g., the hard disk 206 or the like on it.

A process for converting fragmentary JPEG2000 encoded data cached on the hard disk 206 or the like into encoded data complying with JPEG2000 to be passed to a JPEG2000 decoder will be described below.

Also, the following case will be assumed. That is, the user opens a home page using a Windows® machine or the like and clicks a link to a JPEG2000 image described there, thus acquiring and caching fragmentary data required to display the JPEG2000 image with the image size and resolution suited to the user's purpose. One bitstream is generated from these cache data, and it is decoded to display an image.

Figure 3:
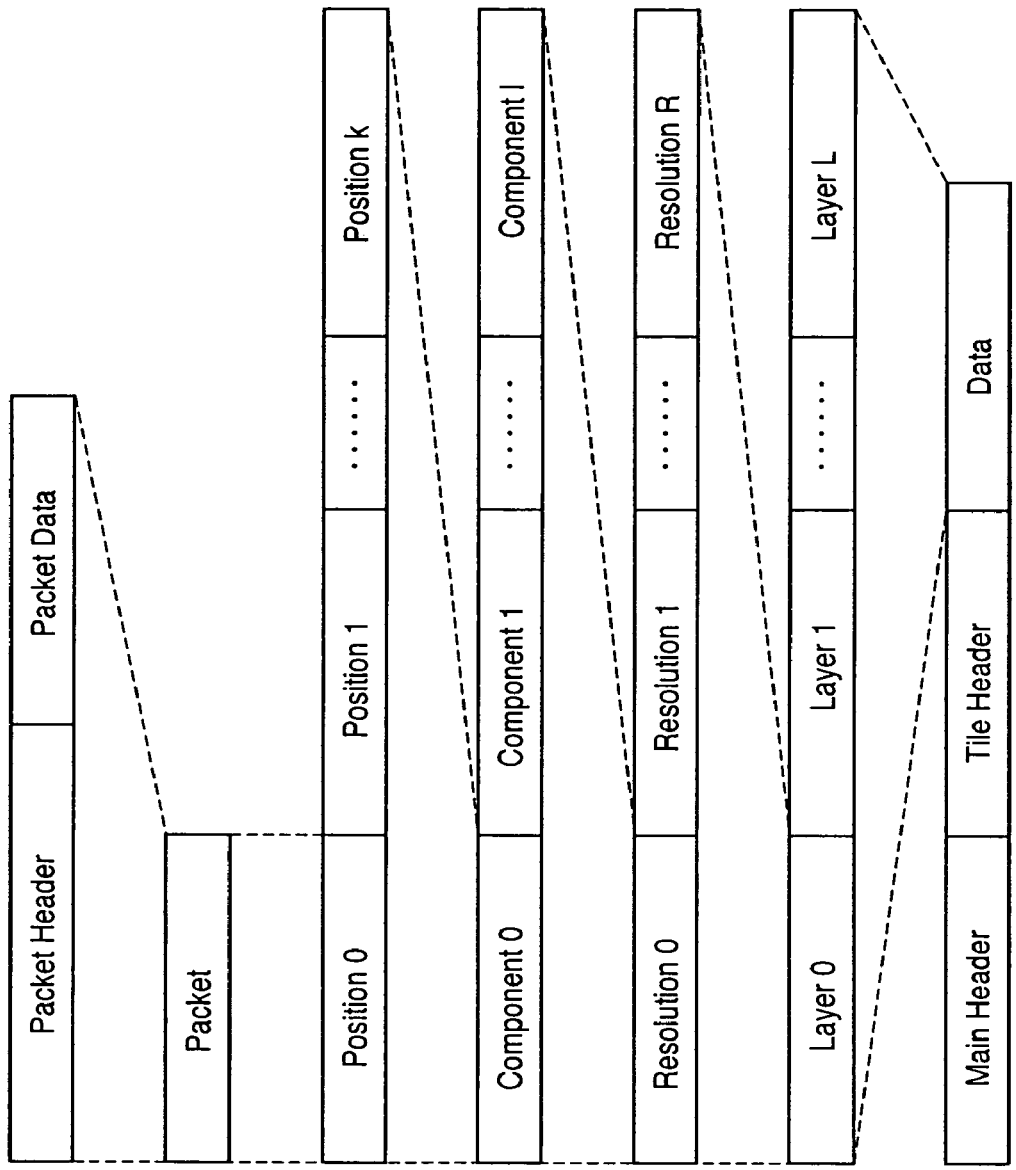
FIG. 3 shows the format of a JPEG2000 file recorded according to Layer-resolution level-component-position progression (SNR Progression)

General JPEG2000 encoded data will be explained below. FIG. 3 shows the configuration of a JPEG2000 file recorded according to Layer-resolution level-component-position progression (to be referred to as "SNR Progression" hereinafter). According to the SNR Progression, data are recorded in the order of layer/resolution/component/position. Specifying such arrangement of data is called "progression order".

Figure 4:
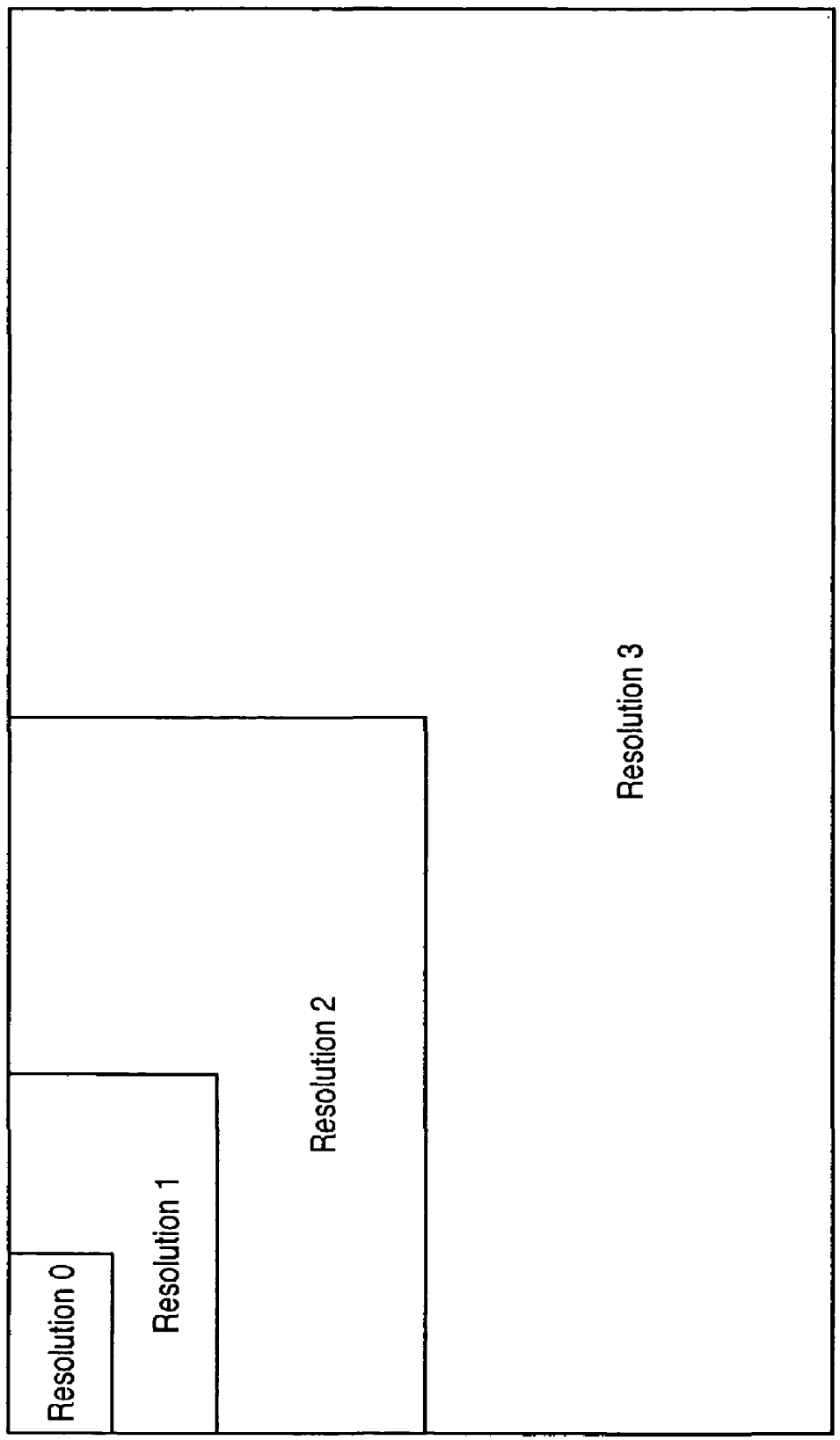
FIG. 4 is a view for explaining the resolution scalability of JPEG2000.

FIG. 4 is a view for explaining the resolution scalability of JPEG2000. That is, FIG. 4 shows the relationship between the resolutions (image sizes) and resolution numbers. As shown in FIG. 4, the resolution number of an image with the lowest resolution is set to be "0", and the width and height of the image size are doubled as the resolution number increases by 1. Also, each layer stores data in ascending order of resolution number. The layer number corresponds to the S/N ratio of an image to be reconstructed to its original image, and the S/N ratio impairs as an image has a smaller layer number.

In one JPEG2000 file, the maximum values of the resolution number, layer number, and component number are set in advance by an encoder, they are encoded according to these parameters, and the encoded information is stored in encoded data. Each packet is made up of a packet header field that manages information of code-blocks stored in that packet, and encoded data of code-blocks.

Using such JPEG2000 encoded data, the user can receive only encoded data of his or her required part from the server without acquiring full image data stored in the server. Note that a data unit that the user can receive may be a JPEG2000 packet or a code-block as an encoding unit smaller than the packet. In this embodiment, a packet is assumed as a data unit that the user receives from the server.

Figure 5:
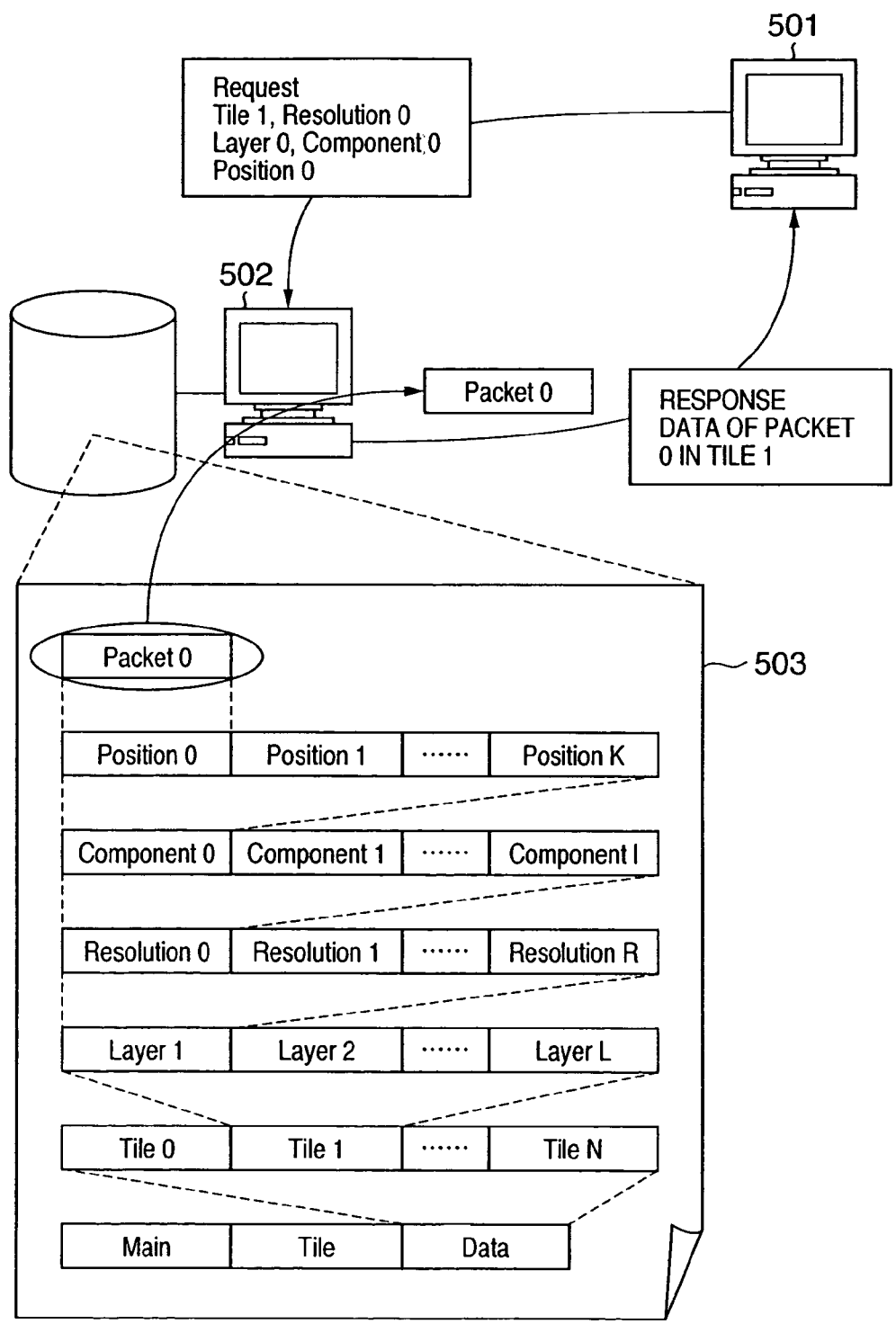
FIG. 5 is a schematic view for explaining a request and response of data for respective packets between the server and client in the first embodiment.

FIG. 5 is a schematic view for explaining a request and response of data for respective packets between the server and client in the first embodiment.

Referring to FIG. 5, a client 501 requests a server 502 of required data by designating a tile number, resolution level, layer, component, and position number of an image. The server 502 interprets the code stream of an image 503, extracts packet data corresponding to the tile number, resolution level, layer, component, and position number of the designated image, and sends back the extracted packet data to the client 501.

Figure 6B:
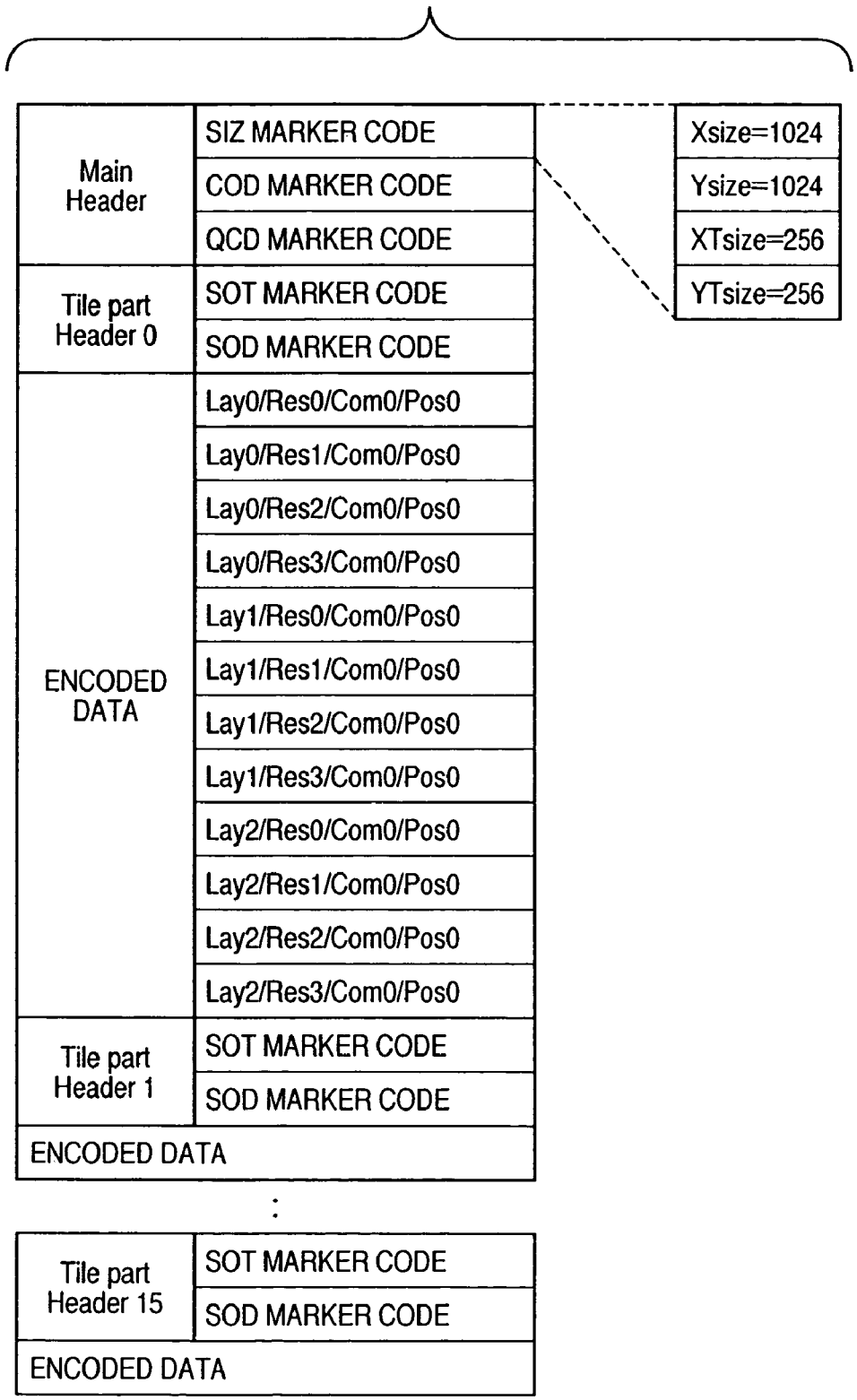
FIG. 6B shows the data structure of JPEG2000 encoded data associated with tile-segmented image data shown in FIG. 6A.

An example of a JPEG2000 file managed by the server computer used in this embodiment will be described below using FIGS. 6A and 6B. FIG. 6A shows an example of tiles obtained by segmenting original image data stored in the server computer. FIG. 6A shows an example wherein the original image data is segmented into 4×4 tiles in the vertical and horizontal directions, i.e., into a total of 16 tiles as a whole.

FIG. 6B shows the data structure of JPEG2000 encoded data associated with the tile-segmented image data shown in FIG. 6A (i.e., data obtained by encoding that image data by "SNR Progression"). FIG. 6B shows the configuration example of encoded data obtained upon encoding an image when three different layers 0 to 2 (Lay0, Lay1, and Lay2), four different resolution levels 0 to 3 (Res0, Res1, Res2, and Res3), and one each component and position (Com0, Pos0) are used.

For example, when the image size of the maximum resolution of JPEG2000 is 1024×1024 pixels, the image size of each tile is 256×256 pixels. When each tile has four different resolution levels, the image sizes of the respective resolutions are 256×256 pixels, 128×128 pixels, 64×64 pixels, and 32×32 pixels.

Furthermore, in the main header field of JPEG2000 encoded data, both parameters Xsiz (Xsize) and Ysiz (Ysize) which indicate the image size are 1024, thus indicating the image size of the whole image, as shown in FIG. 6B. On the other hand, XTsiz (XTsize) and YTsiz (YTsize) indicating the tile size assume values "256" as the aforementioned tile size. With these parameters, this JPEG2000 encoded data has encoded data segmented into 16 tiles. The encoded data of these tiles are stored while being delimited by "Tile part Header", as shown in FIG. 6B.

FIG. 7 is a flow chart for explaining an outline of the processing sequence of an application that runs on the client computer in the first embodiment. In this embodiment, a JPEG2000 image display application runs on the client side, and the flow chart shown in FIG. 7 corresponds to the processing flow executed upon displaying an image after a JPEG2000 file to be displayed is designated by another means such as a Web browser or the like.

Figure 13:
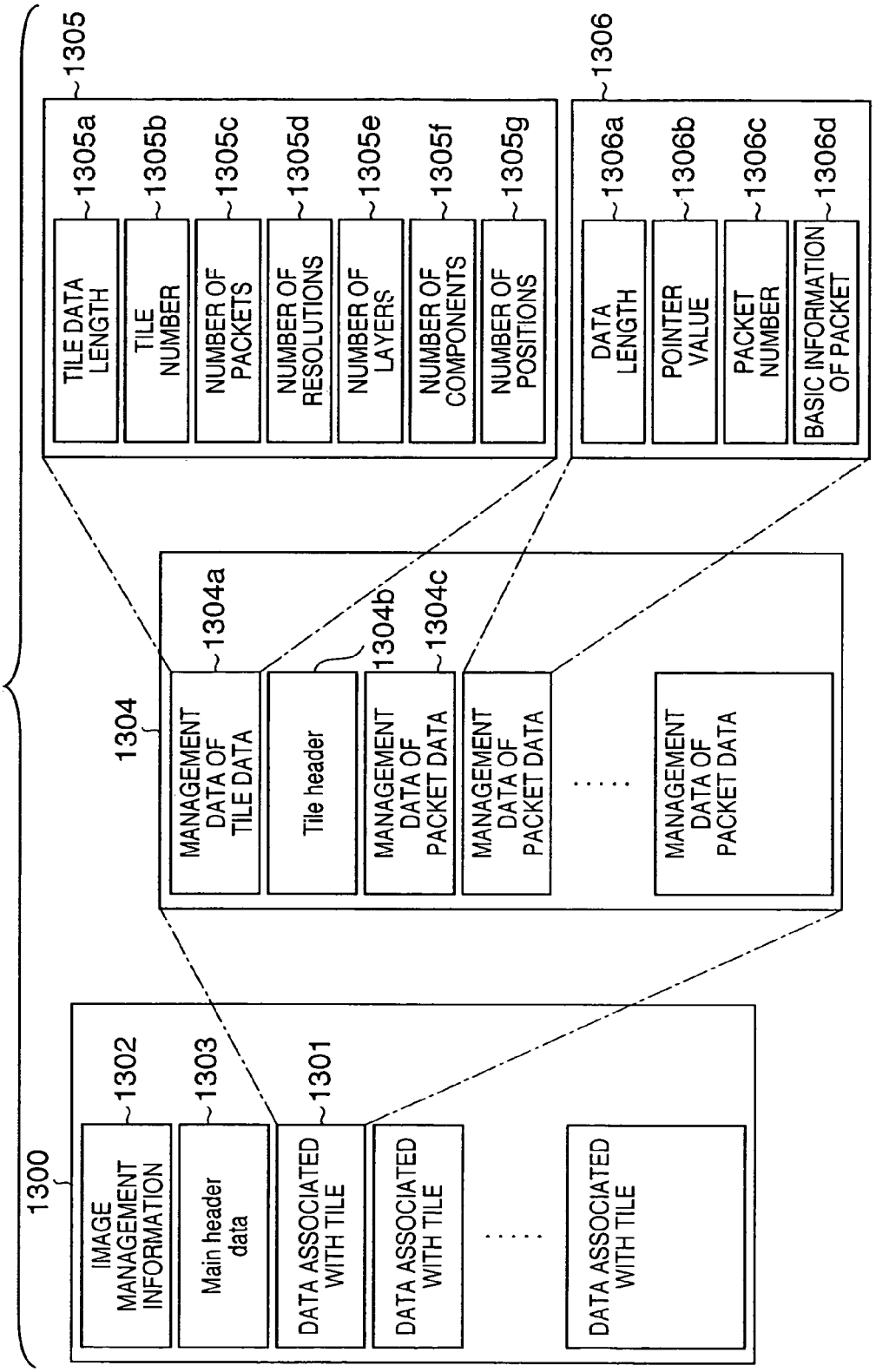
FIG. 13 is a view for explaining the logical structure of an encoded data cache controlled on the client side.

Internal variables (parameters) required to control subsequent processes are initialized (step S707). More specifically, the client inquires the server as to information such as the image size of the designated JPEG2000 file, encode parameters, and the like, generates information used to manage cache of encoded data to be displayed (FIG. 13) on a memory or file, and initializes these variables (parameters) and the like. That is, FIG. 13 is a view for explaining the logical structure of an encoded data cache controlled on the client side. Referring to FIG. 13, reference numeral 1300 denotes the logical structure of the whole cache file. As shown in FIG. 13, the cache file can be divided into an image management information field 1302 associated with the entire cache, a main header data field 1303, and data fields 1301 associated with respective tiles.

There are the data fields 1301 associated with tiles as many as the number of tiles upon segmenting this image data into tiles. Reference numeral 1304 denotes details of each data field 1301 associated with a tile. The data field 1301 is divided into a tile data management data field 1304a, tile header field 1304b, and packet data management data field 1304c. Note that there are packet data management data fields 1304c as many as the number of packets present in that tile.

Reference numeral 1305 denotes details of the tile data management data field 1304a. As indicated by 1305, the tile data management data field 1304a consists of parameters, i.e., a tile data length 1305a, a tile number 1305b, the number of packets 1305c, the number of resolutions 1305d, the number of layers 1305e, the number of components 1305f, and the number of positions 1305g.

Furthermore, reference numeral 1306 denotes details of each packet data management data 1304c. As indicated by 1306, the packet data management data 1304c consists of a packet data length 1306a, pointer value 1306b, packet number 1306c, and packet basic function 1306d. Actual packet data received from the server is saved at a pointer position designated by the pointer value 1306b.

As can be seen from FIG. 13, when packet data are fully loaded, there are many pieces of information required to manage tables and the like, and the byte size of cache data becomes larger than that of original encoded data managed by the server. That is, since the client side generates this cache information and one encoded data from the cache information, the byte size associated with encoded data managed on the client side is maximum when all tiles are fully loaded. The size at that time becomes twice or more as large as the size of original encoded data managed by the server. Note that these data 1304 associated with respective tiles are stored in a file, and each field 1301 in the cache file 1300 stores that file name to associate with the corresponding data.

After the internal variables are initialized in step S707, the user makes operation for display (step S700). For example, when the designated file is displayed for the first time upon launching the application, an image size that can fall within the opened window size is calculated, and the file is displayed with the image size that matches the window size. After that, the user's operation may be accepted in this step S700.

Next, all new packets required by the user's operation in step S700 are calculated (step S701). After that, a request of the new required packet data calculated in step S701 is issued to the server (step S702). The all requested packet data are received from the server and are cached on the client computer (step S703).

Furthermore, encoded data is generated by converting the encoded data managed in the cache format into a plurality of JPEG2000 encoded data formats so as to allow high-speed read access (step S704). Details of the encoded data generation process will be described later. After that, the JPEG2000 encoded data generated in step S704 is decoded and displayed (step S705). It is checked if the user issues an end request (step S706). As a result, if the user issues an end request (Yes in step S706), the application ends. On the other hand, if the user issues another display request in place of the end request (No in step S706), the flow returns to step S701 to repeat the above processes.

The detailed processing contents of the processing sequence of the application which runs on the client computer will be described below.

A case will be examined below wherein the client application has been launched a while ago, the default image display size of this application is 128×128 pixels, and image data that can fall within this size is to be displayed. In such case, the required packets calculated in step S702 are 3×16 packets indicated by "Lay0/Res0/Com0/Pos0", "Lay1/Res0/Com0/Pos0", and "Lay2/Res0/Com0/Pos0" in a total of 16 tiles (tiles 0 to 15) in FIG. 6B, since data having the image size of the lowest resolution and maximum SNR is to be displayed.

Hence, the client program requests a server program of these packets. On the other hand, the server program extracts 3×16 packets of all the tiles. After that, the client program receives these packets and decodes them to display an image.

Figure 8A:
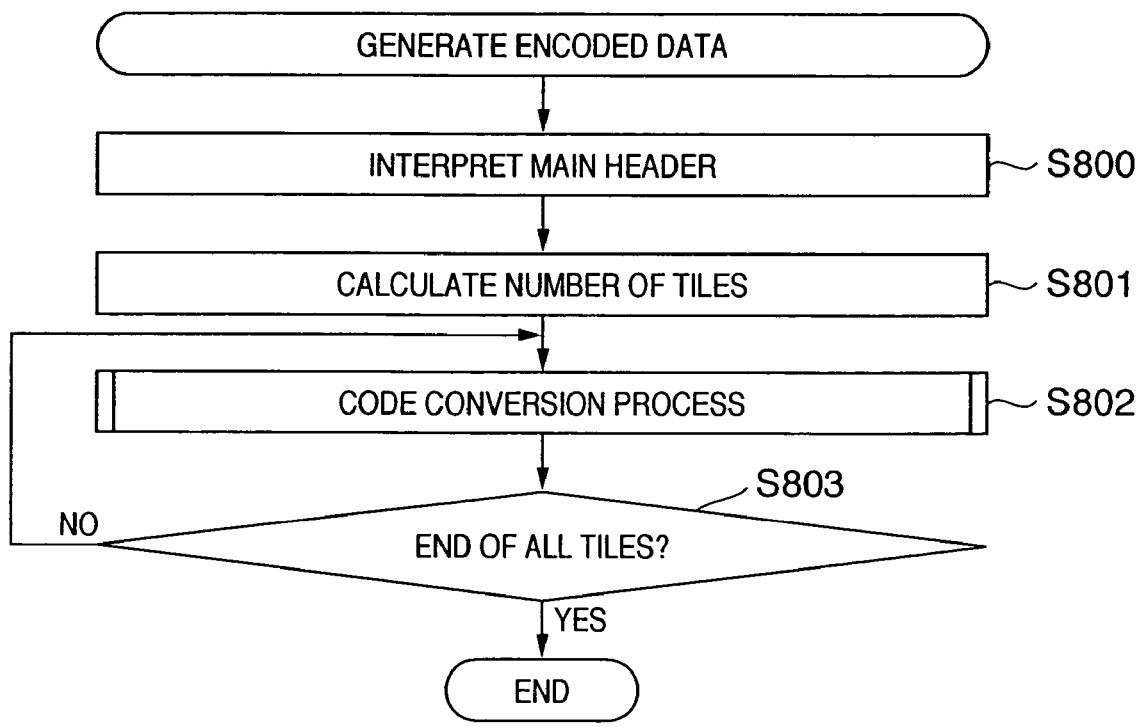
FIG. 8A is a flow chart for explaining an outline of an encoded data generation process in step S704 in FIG. 7.

Details of the encoded data generation process in step S704 in FIG. 7 will be described using FIGS. 8A to 10. FIG. 8A is a flow chart for explaining an outline of the encoded data generation process in step S704 in FIG. 7. The main header of JPEG2000 encoded data associated with the required packets received from the server is interpreted (step S800). The number of tiles in the encoded data is calculated based on the interpretation result of the main header in step S800 (step S801). In this case, the number of tiles is calculated by:

Xtiles=(Xsiz+XTsiz−1)/XTsiz

Ytiles=(Ysiz+YTsiz−1)/YTsiz

Tiles=Xtiles×Ytiles                                              (1)

The processes in steps S802 and S803 are repeated in correspondence with the number of tiles calculated using equations (1).

Step S802 executes a code conversion process of each tile. Details of this process will be described later. It is checked if the code conversion processes are complete for all the tiles (step S803). If tiles to be processed still remain (No in step S803), the flow returns to step S802. On the other hand, if the code conversion processes are complete for all the tiles (Yes in step S803), this process ends, and the flow advances to step S705.

Figure 8B:
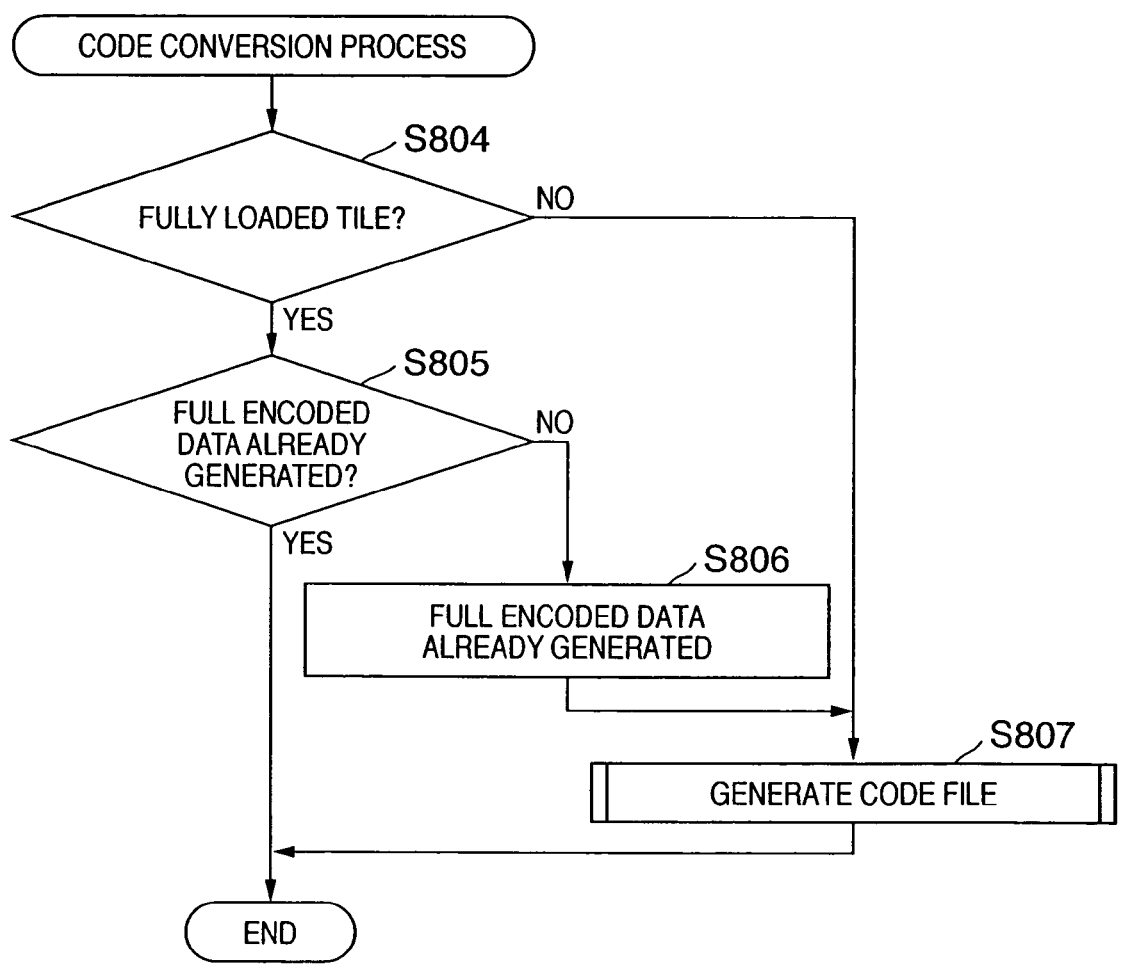
FIG. 8B is a flow chart for explaining details of a code conversion process in step S802.

FIG. 8B is a flow chart for explaining the code conversion process in step S802 in detail. It is checked if the tile to be currently processed is fully loaded, i.e., if all packet data have been cached (step S804). More specifically, this step can be attained by checking the packet data length 1306a or the pointer value 1306b to packet data shown in FIG. 13. These values assume "0" if corresponding packet data is not received, and store values such as the byte size, actually stored address, file name, and the like of packet data, if packet data is received. In this manner, the data lengths 1306a or pointer values 1306b are checked for all packets in this tile, and if respective values are not "0", it is determined that the tile is fully loaded. Conversely, if at least one value "0" is found, it is determined that the tile is not fully loaded yet. As a result, if the tile is fully loaded (Yes in step S804), the flow advances to step S805; otherwise (No in step S804), the flow advances to step S807.

It is checked in step S805 if encoded data in the fully loaded state is generated. As a result, if such encoded data is not generated yet (No in step S805), the flow advances to step S806; otherwise (Yes in step S805), this code conversion process ends. In step S806, a flag indicating that full encoded data is generated is set. Details of the process associated with setting of this flag will be described later.

Figure 14:
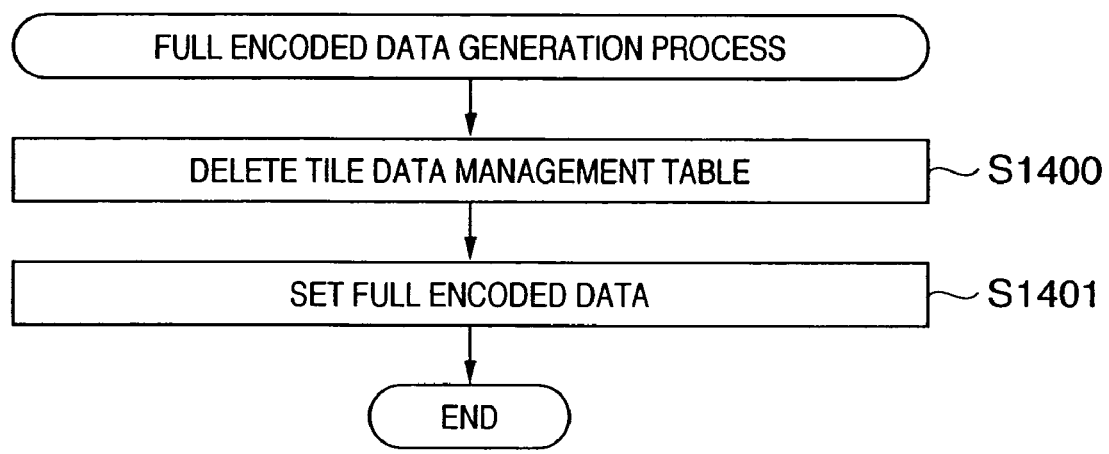
FIG. 14 is a flow chart for explaining details of the process for setting a flag which indicates that full encoded data has been generated in step S806 in FIG. 8B.

The detailed process contents in step S806 in FIG. 8B will be described below. FIG. 14 is a flow chart showing details of the process for setting the flag indicating that full encoded data has been generated in step S806 in FIG. 8B. This process is relatively simple. The file of the tile data management data 1304 of the fully loaded tile is deleted (step S1400). As a result, the fields of the data 1304 associated with the tile, tile data management data 1305, and packet data management data 1306 shown in FIG. 13 are deleted. Next, full encoded data is set in place of the encoded data files for respective tiles shown in FIG. 11 and the like (step S1401). That is, setting the flag indicating that the full encoded data has been generated is to change the values of the data 1301 associated with the tile in the file 1300 shown in FIG. 13.

With the above process, when the client application requires data of this tile after the above process, the file name stored in the field 1301 need only be passed to the application without any processes such as data conversion and the like, thus assuring high-speed processes. The data size to be haled as a cache can be reduced compared to a case wherein data are held in the form of management tables, since encoded data are directly held.

Whether or not the tile is fully loaded can be determined by confirming the tile data length field 1305a held as a cache.

Figure 15:
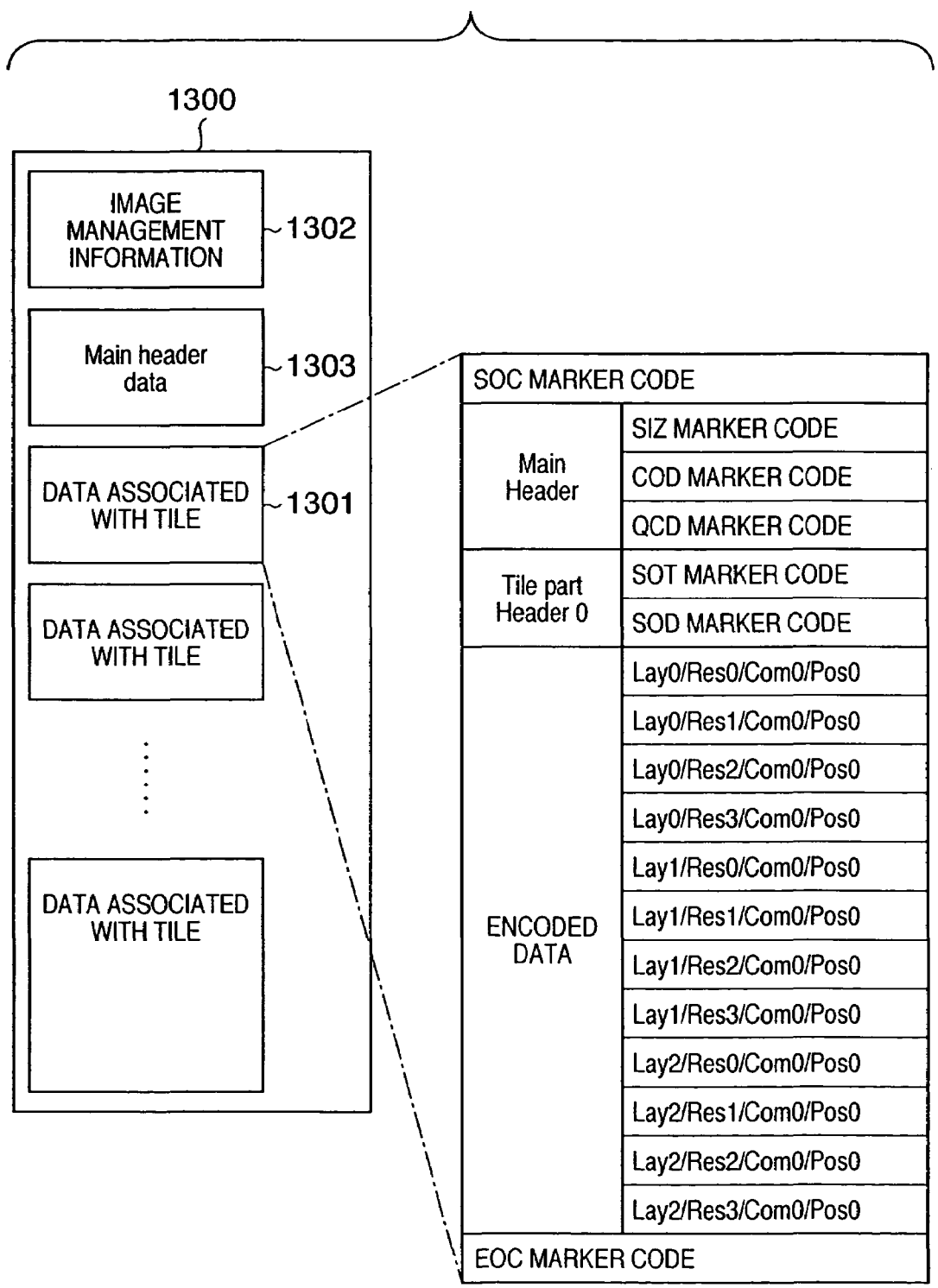
FIG. 15 shows a state wherein a tile is fully loaded and is substituted by full encoded data.

FIG. 15 shows a state wherein a tile is fully loaded and is substituted by full encoded data. In a practical confirmation method, when the fields shown in FIG. 15 are 16-bit long integer fields, if the tile is fully loaded and is replaced by full encoded data, the first 16 bits of the encoded data are to be confirmed. In this case, the head of the encoded data corresponds to a SOC marker code (0xFF4F). When this value is read as an integer, it is a negative value since the first bit (15th bit) is "1". The same applies to a case wherein a 32-bit long integer is to be read. That is, since an SOC marker code and SIZ marker code are to be read, (0xFF4FFF51) is to be read. That is, when the head of tile data management data is read as an integer of a required number of bits, if a positive integer appears, loading is in progress. However, if a negative integer appears, it is easily determined that the tile is fully loaded and has been converted into encoded data.

As described above, once a code file is generated from fully loaded cache data, the control is made to inhibit the code file generation process (step S807) from being executed again. Hence, as the cache is loaded, the file generation process can be attained at higher speed.

Figure 9:
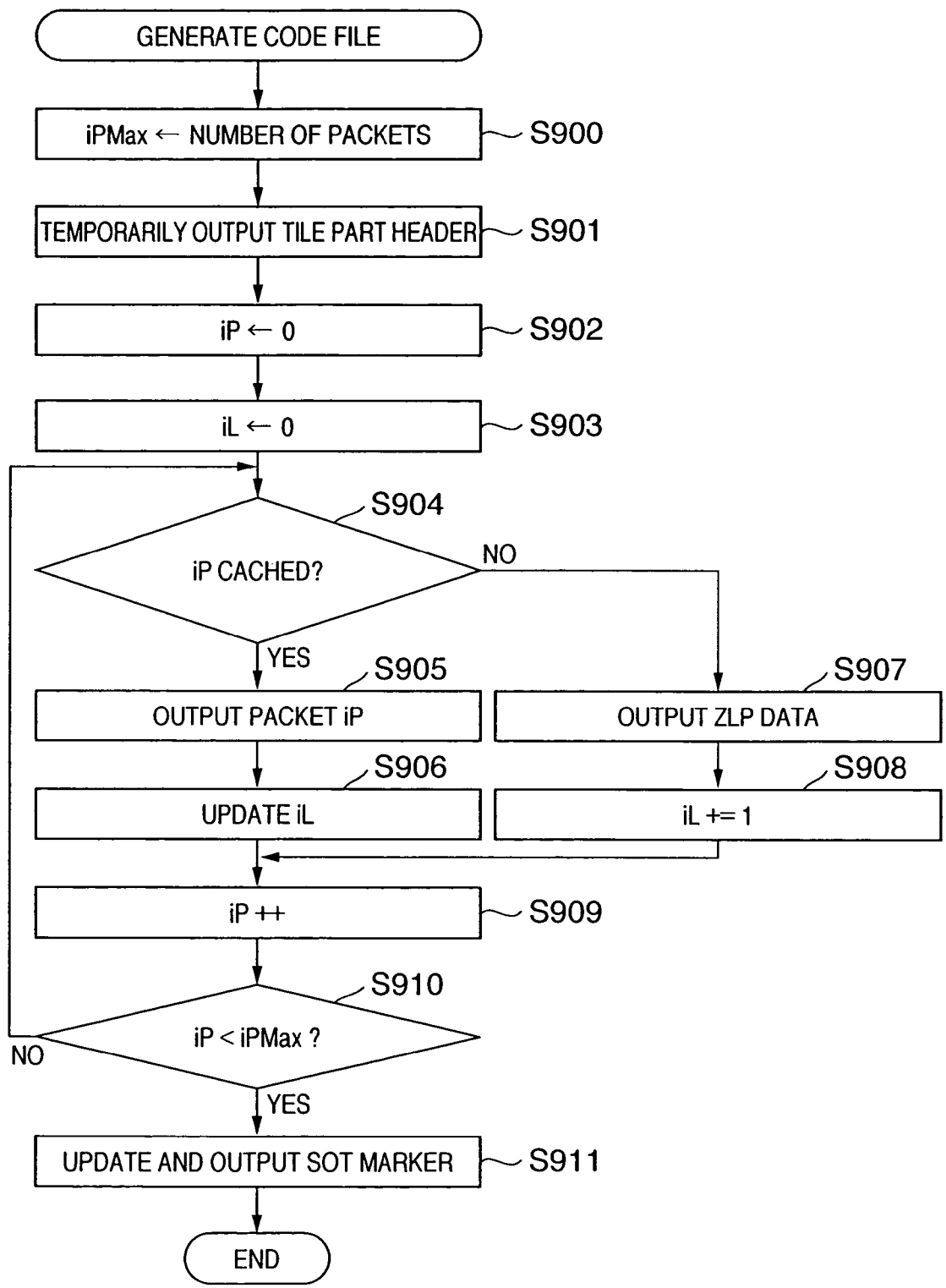
FIG. 9 is a flow chart for explaining details of a code file generation process in step S807 shown in FIG. 8B.

FIG. 9 is a flow chart for explaining the code file generation process in step S807 in FIG. 8B in detail. The number of packets contained in the tile is set in iPMax (step S900). Next, "Tile part Header" is temporarily output (step S901). The reason why "Tile part Header" is temporarily output is that this "Tile part Header" includes a field for storing the tile code length, which can be calculated upon completion of the subsequent processes.

Then, "0" is set in variables iP and iL as an initial value (steps S902 and S903). Note that variable iP indicates the packet ID, and variable iL indicates the tile code length. It is checked if a packet designated by variable iP has been cached (step S904). If the packet designated by variable iP has been cached (Yes in step S904), the flow advances to step S905; otherwise (No in step S904), the flow advances to step S907.

In step S907, a "Zero Length Packet" code (to be abbreviated as "ZLP" code hereinafter) indicating that the corresponding packet data is not cached is output. Then, "1" as the byte size of this ZLP code is added to variable iL (step S908). On the other hand, the corresponding packet data is output in step S905. The byte size of this packet is added to variable iL to update it (step S906).

After the process in step S906 or S908, variable iP is incremented (step S909). It is checked if all packets have been processed (step S910). If packets to be processed still remain (No in step S910), the flow returns to step S904 to repeat the above processes. On the other hand, if all packets have been processed (Yes in step S910), "SOT marker" as "Tile part Header" is updated and output on the basis of variable iL (step S911), thus ending the code file generation process. After that, as described above, this code file is decoded by a versatile JPEG2000 decoder, and decoded image data is displayed (step S705).

That is, as described above, the client according to this embodiment comprises storage means (e.g., hard disk 206) that stores fragmentary first encoded data of encoded data managed by the server, and serves as an encoded data generation apparatus that generates JPEG2000 encoded data. The client according to this embodiment has the following characteristic feature. That is, the client calculates short second encoded data (which is encoded data of image data required to display an image on the display unit 203 in an enlarged scale, and is not contained in the first encoded data) on the basis of encoded data required to generate JPEG2000 encoded data in that client, and the first encoded data (e.g., encoded data of image data which is currently displayed on the display unit 203) stored in advance in the storage means such as the hard disk 206 or the like. The client requests the server of the calculated second encoded data, acquires the second encoded data from the server, and stores the acquired second encoded data in the storage means such as the hard disk 206 or the like. The client interprets header information of the acquired second encoded data and segments target encoded data into a plurality of independent encoded data. The client checks for each segment if all encoded data which form the independent encoded data are stored in the storage means such as the hard disk 206 or the like. If all encoded data which form the independent encoded data are not stored, the client stores dummy encoded data in correspondence with non-stored data, and outputs the stored encoded data as JPEG2000 encoded data.

Also, the client (encoded data generation apparatus) is characterized in that encoded data is handled for respective packets. Furthermore, the client (encoded data generation apparatus) is characterized in that the dummy encoded data is zero length packet data specified by JPEG2000. Moreover, the server and client are characterized in that they can communicate with each other via a network.

The client (encoded data generation apparatus) further comprises display means for displaying image data. The first encoded data is encoded data of the image data of interest, and encoded data required to calculate the second encoded data is set in accordance with movement or enlargement display of a display area of image data displayed on the display means such as the display unit 203 or the like. The client (encoded data generation apparatus) is characterized by decoding the output JPEG2000 encoded data and displaying the decoded image data on the screen of the display means such as the display unit 203 or the like.

The code file generation process shown in the above flow chart will be explained using a practical example. FIG. 10 shows the configuration of code files of tiles after the code file process on a default window in the first embodiment of the present invention. Note that packets requested from the client computer are "Lay0/Res0/Com0/Pos0", "Lay1/Res0/Com0/Pos0", and "Lay2/Res0/Com0/Pos0" of all tiles, as described above.

Therefore, as shown in FIG. 10, encoded data in each of which ZLP codes are stored in correspondence with packets other than the above three packets, as denoted by reference numeral 1001, are generated for all 16 tiles. In the main header field of encoded data generated for each tile, the values in the Xsiz and Ysiz fields in a SIZ marker code are changed to "256" as the tile size. In this way, an independent code file can be generated for each tile.

That is, the client (encoded data generation apparatus) according to this embodiment is characterized in that encoded data (image data) is segmented into tiles each having a predetermined size (which is calculated by the method described by, e.g., equations (1)). The client is characterized in that the header information of each independent encoded data is changed to indicate the size of each segmented tile.

A case will be explained below wherein the user instructs enlargement display in step S701. In this enlargement display, the default window is enlarged to 2×. In this case, if the display window size is 128×128 pixels, four tiles can be displayed. For example, data of Resolutionl (image size: 64×64 pixels) of four tiles, i.e., Tile5, Tile6, Tile9, and Tile10 shown in FIG. 6A are to be displayed. In this case, the client computer requests the server of "Lay0/Res1/Com0/Pos0", "Lay1/Res1/Com0/Pos0", and "Lay2/Res1/Com0/Pos0" of four tiles, i.e., Tile5, Tile6, Tile9, and Tile10 in step S702.

Furthermore, when the user issues a 2× enlargement instruction, if the display window size is changed from 128× 128 pixels to 256×256 pixels, "Lay0/Res2/Com0/Pos0", "Lay1/Res2/Com0/Pos0", and "Lay2/Res2/Com0/Pos0" of the above four tiles are further requested.

After that, assume that the user issues a 2× enlargement request. In this case, if the window size of the display area remains unchanged, only one tile can be displayed. Hence, if only Tile5 is to be displayed, the client requests the server of "Lay0/Res3/Com0/Pos0", "Lay1/Res3/Com0/Pos0", and "Lay2/Res3/Com0/Pos0" of Tile5, and displays the requested image. As a result, Tile5 is fully loaded in the cache. FIG. 11 is a view for explaining an example of the states of code files for respective tiles of encoded data in the first embodiment.

As shown in FIG. 11, code files of Tile0, Tile1, Tile2, Tile3, Tile4, Tile7, Tile8, Tile11, Tile12, Tile13, Tile14, and Tile15 have the same state as the state 1001 in FIG. 10. Also, Tile6, Tile9, and Tile10 have a state 1101, and Tile5 has a state 1102. Before this state, when it is checked in step S805 if the full encoded data has been generated, the flow advances to step S806. However, after the code conversion process of Tile5, the flow does not advance to step S806 after the checking process in step S805, and the process ends. As a result, no more code conversion process need be executed for Tile5. Hence, the code file generation process can be executed faster as the cache is loaded. That is, according to this embodiment, when a region to be decoded/displayed is processed for each tile, the process can be done for only the tile required for decode/display.

Conventionally, when one JPEG2000 encoded data file is generated from a cache file, it is difficult to execute multi-thread processes for respective tiles to be displayed. This is because the processes must be serialized at that time to generate one encoded data file. However, since encoded data files for respective tiles are generated as in this embodiment, multithread processes can be attained by defining, as threads for each tile, a process from a packet request required for each tile to be displayed until generation of a cache file, a generation process of encoded data from the cache file, and a process until decoding and displaying encoded data. Therefore, such multithread processes can assure higher processing speed compared to a single thread process used so far.

Furthermore, in a system that requires a long processing time of file I/O, since a plurality of small code files are generated in place of one, large encoded data file, a time loss due to file I/O can be minimized.

Second Embodiment

In the first embodiment described above, all cached tiles undergo the code conversion process. However, in this embodiment, only a tile required for display undergoes the code conversion process, thus achieving faster code conversion process than in the first embodiment.

Figure 12:
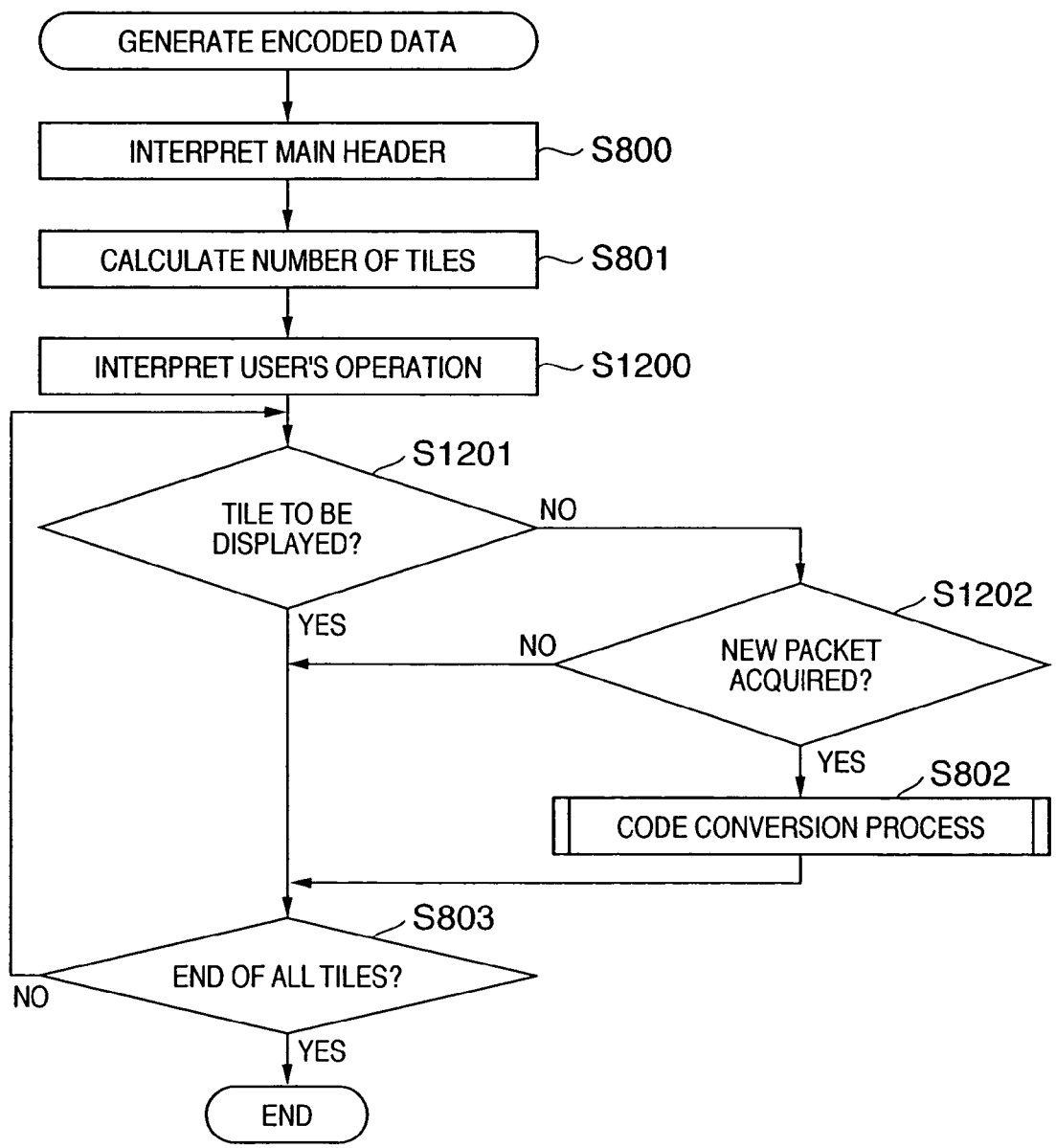
FIG. 12 is a flow chart for explaining an outline of an encoded data generation process according to the second embodiment of the present invention.

FIG. 12 is a flow chart for explaining an outline of an encoded data generation process according to the second embodiment of the present invention. Note that the same step numbers denote the same processes as those in the flow chart of FIG. 8A in the first embodiment. Only the differences from the first embodiment will be described below.

After the number of tiles is calculated in step S801, a command issued by the user's operation in step S701 is interpreted (step S1200). It is checked using this interpretation result if the tile to be processed is a tile to be currently displayed (step S1201). As a result, if it is determined that the tile to be processed is not used in the current display process (No in step S1201), the flow advances to step S803. On the other hand, if it is determined that the tile to be processed is used in the current display process (Yes in step S1201), the flow advances to step S1202.

When new packets are requested in step S703, it is checked in step S1202 if packets of the tile to be currently processed are acquired. As a result, if new packets are acquired (Yes in step S1202), the flow advances to step S802; otherwise (No in step S1202), the flow advances to step S803. Note that the subsequent processing sequence is the same as that described in the first embodiment. With these processes, since only a tile which is required for display and is not fully loaded yet can undergo the code conversion process, the encoding process can be executed faster than the first embodiment.

Third Embodiment

An image data transmission apparatus according to the third embodiment of the present invention will be described in detail below with reference to the accompanying drawings. This embodiment will explain a method of generating one encoded data stream from a cache. Note that the arrangement of a network system including servers and clients according to this embodiment is the same as that in FIG. 1, and the hardware arrangement of each computer system is also the same as that in FIG. 2. Furthermore, the processing sequence of the application which runs on the client computer is the same as that in the flow chart shown in FIG. 7.

Figure 16:
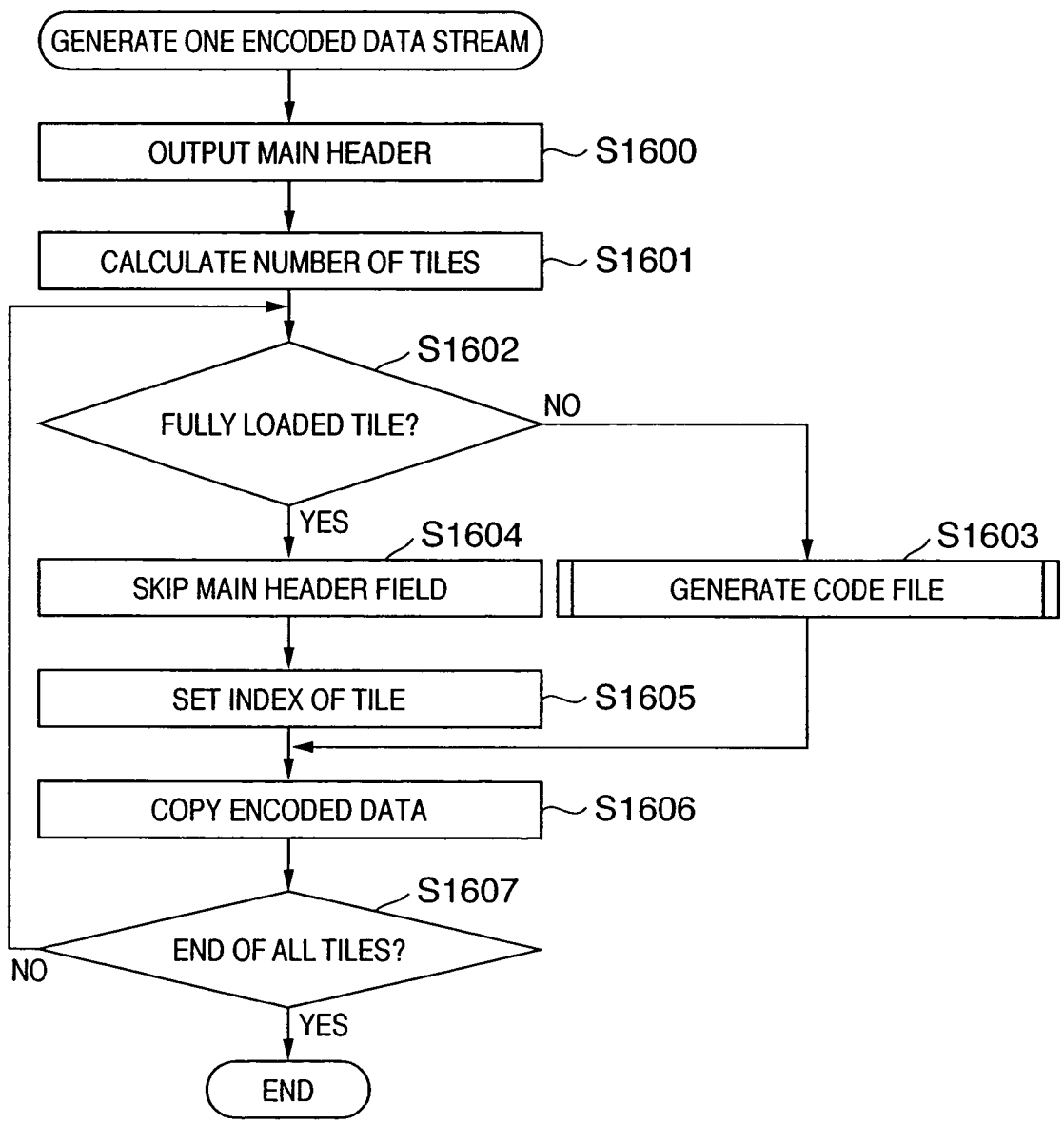
FIG. 16 is a flow chart for explaining the processing sequence upon generating one encoded data file from a cache.

FIG. 16 is a flow chart for explaining the processing sequence upon generating one encoded data file from a cache. As shown in FIG. 16, information held in the field 1303 in the cache is converted into a format according to the JPEG2000 encoded data format, and a main header is output to an output file (step S1600). The number of tiles in encoded data is calculated based on the interpretation result of the main header (step S1601). Note that the calculation formulas used in this case are the same as those in step S801 in FIG. 8A. The processes in step S1602 and subsequent steps are repeated in correspondence with the number of tiles calculated using equations (1) above.

It is checked for each tile if the tile of interest is fully loaded, and full encoded data of that tile is available (step S1602). Note that this checking method is as described above. As a result, if it is determined that the tile of interest is fully loaded (Yes in step S1602), the flow advances to step S1604; otherwise (No in step S1602), the flow advances to step S1603.

In step S1603, a code file is generated in the same manner as in the code file generation processing sequence shown in FIG. 9. After this process, the flow advances to step S1606 to output encoded data. On the other hand, in step S1604 and subsequent steps conversion from the full encoded data of the tile is made. To attain this conversion, a process for skipping the main header field is done (step S1604). As a practical example of this process, for example, the contents from the head of the encoded data to an SOT marker code shown in FIG. 15 can be skipped. Then, a tile index value in a tile part header is substituted by the index number of the tile of interest (step S1605). Furthermore, the contents from the tile part header to an EOC marker code (exclusive) are copied (step S1606). It is then checked if all tiles have been processed (step S1607). If tiles to be processed still remain (No in step S1607), the flow returns to step S1602 to repeat the aforementioned processes. On the other hand, if all tiles have been processed (Yes in step S1607), the process ends.

With the aforementioned process, one encoded data stream can be easily generated at high speed from a cache file in a format according to this embodiment since no processes such as data conversion and the like are required.

Fourth Embodiment

Normally, when one JPEG2000 encoded data file is generated from a cache file, it is difficult to execute multithread processes for respective tiles to be displayed. This is because the processes must be serialized at that time to generate one encoded data file. However, since encoded data files for respective tiles are generated as described above, multithread processes can be attained by defining, as threads for each tile, a process from a packet request required for each tile to be displayed until generation of a cache file, a generation process of encoded data from the cache file, and a process until decoding and displaying encoded data. Therefore, such multithread processes can assure higher processing speed compared to a single thread process used so far.

With the file generation method described in each of the embodiments according to the present invention, when fragmentary data of JPEG2000 encoded data, which are sent JPIP, are cached, and JPEG2000 encoded data that can be processed by a normal JPEG2000 decoder is generated from this cache file, independent JPEG2000 encoded data files for respective tiles required for the current decode and display processes are generated, thereby attaining high-speed processes up to the decode/display process.

Also, the data size or file size required to form the cache or to generate encoded data from the cache can be minimized. Upon generating encoded data from the cache, since the need for processes such as data conversion and the like can be obviated, high-speed generation is assured.

Upon determining an area to be decoded/displayed, only tiles required for decode/display can undergo processes. Furthermore, a high processing speed can be attained by multithread processes. Moreover, in a system that requires a long processing time of file I/O, since a plurality of small code files are generated in place of one, large encoded data file, a time loss due to file I/O can be minimized. Also, upon generating one encoded data, conversion can be easily made.

Fifth Embodiment

Figure 17:
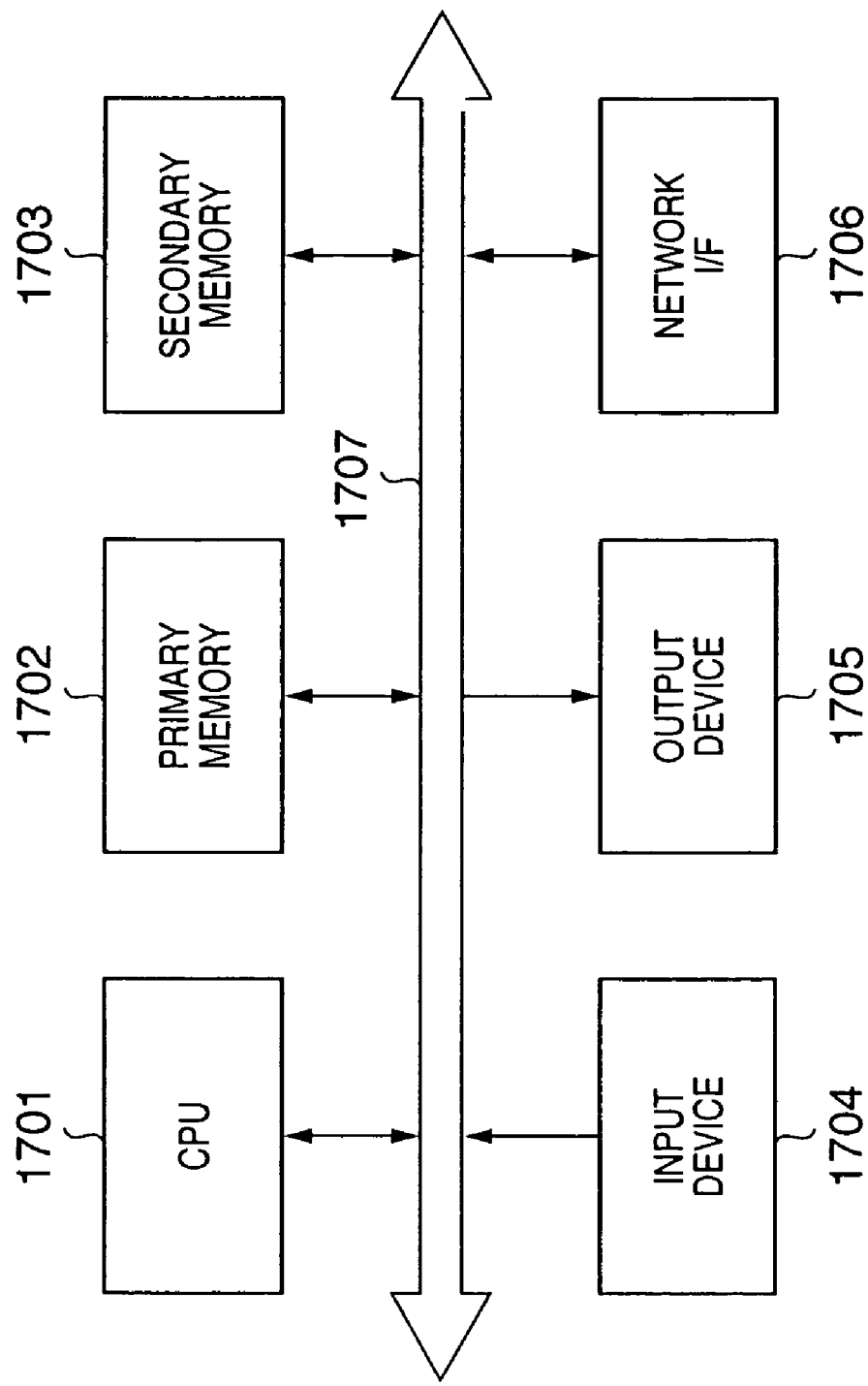

FIG. 17 is a block diagram showing the basic arrangement of an image processing apparatus according to this embodiment, which comprises a PC (personal computer), workstation, or the like.

A CPU 1701 controls the overall apparatus and respective units to be described later using programs and data loaded on a primary memory 1702.

The primary memory 1702 is a main storage device represented by a RAM. The primary memory 1702 has an area for temporarily storing programs and data loaded from a secondary memory 1703, and also an area used by the CPU 1701 to execute various processes.

The secondary memory 1703 is an information storage device having a large storage capacity (e.g., a hard disk drive). The secondary memory 1703 can save an OS (operating system), and programs and data required to execute processes to be described later by the CPU 1701, and outputs (loads) requested programs and data onto the primary memory 1702 under the control of the CPU 1701.

An input device 1704 is an instruction input device represented by, e.g., a mouse, keyboard, and the like, and the user of this apparatus can input various instructions to the CPU 1701 using this input device 1704.

An output device 1705 is a device represented by, e.g., a display, printer, and the like, and can output an image processed by this apparatus in various forms such as screen display, printouts, and the like.

A network interface 1706 allows this apparatus to receive information such as images, text, and the like transmitted from another apparatus via a network such as the Internet, LAN, or the like.

Reference numeral 1707 denotes a bus which interconnects the aforementioned units. The image processing apparatus according to this embodiment adopts the basic arrangement shown in FIG. 17 for the sake of simplicity in the following description, but can adopt other arrangement. That is, the present invention is not limited to the arrangement shown in FIG. 17.

FIG. 18 shows an overview of a system including the image processing apparatus. Reference numerals 1801 and 1802 denote client terminals to each of which the aforementioned image processing apparatus is applied, and which can make various data communications with a server 1804 (to be described later) via a network 1803.

The network 1803 includes wired networks such as the Internet, LAN, and the like, and wireless networks.

The server 1804 can make data communications with the client terminals 1801 and 1802 via the network 1803, as described above. For example, upon reception of a request of a desired image from the client terminal 1801 or 1802, the server 1804 sends back data designated by the request from a storage device 1805 which saves encoded data of images in large quantities via the network 1803. The storage device 1805 corresponds to, e.g., a hard disk drive device and a device that reads programs and data from storage media such as a CD-ROM, DVD-ROM, and the like.

In this embodiment, this storage device 1805 (equivalent to one of storage means in the server 101 in FIG. 1) saves a plurality of data of images encoded by the encoding method according to JPEG2000. Hence, the client terminal 1801 (equivalent to 103, 102$a$, and 102$b$ in FIG. 1) or 1802 issues a request for a desired one of image data saved by the server 1804 (equivalent to the server 101 in FIG. 1).

The method of caching image data received from the server 1804 in the client terminal will be described below. In order to download an image saved in the storage device 1805, the client terminal must access the server 1804 using a Web browser. In response to this access, the server 1804 presents some or all images saved in the storage device 1805 to the client terminal in, e.g., a thumbnail format. As a result, the Web browser displays these images.

When the user of the client terminal designates a desired one of the images displayed on the Web browser using the input device 1704, the client terminal transmits a transmission request of fragmentary data of the desired image data to the server 1804 in accordance with the image size and resolution under given conditions (the window size, display mode, and the like). Since the server 1804 transmits fragmentary data to the client terminal in response to this request, the client terminal receives these data and caches them on a buffer.

Upon displaying the received image, the client terminal generates a bitstream complying with the JPEG2000 syntax from these cache data, and decodes the bitstream to display an image.

The request and response of data for respective packets between the server and client in this embodiment are as has been explained previously using FIGS. 3, 4, and 5. Note that this embodiment adopts JPIP to exchange image data between the server and client terminal, and the server transmits encoded image data to the client terminal for respective packets.

Figure 19A:
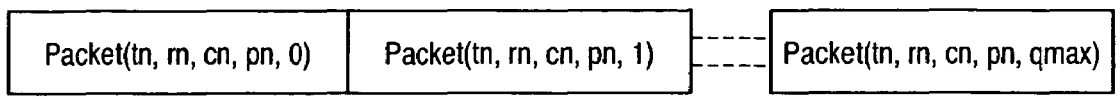
FIGS. 19A and 19B are views for explaining precinct data-bin.
Figure 19B:
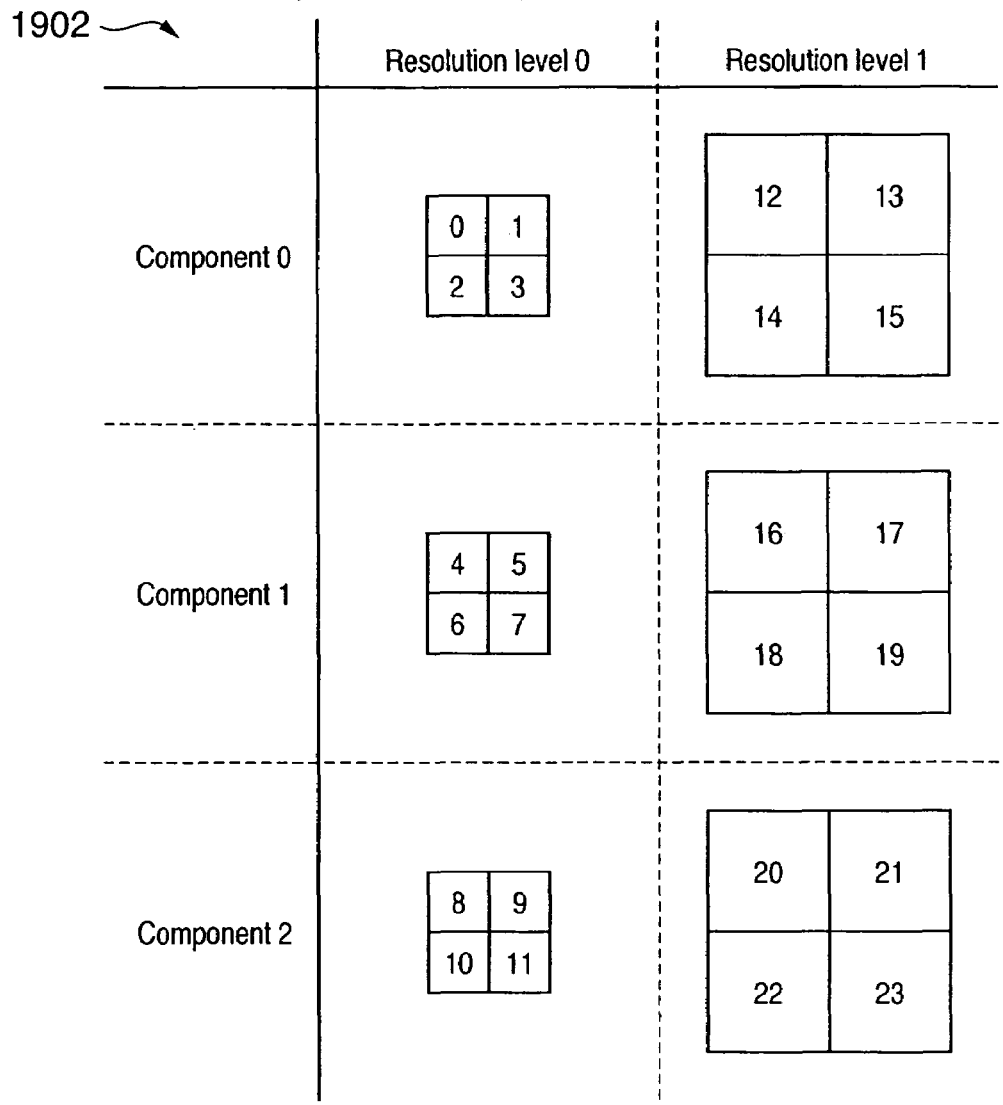

In this case, the server returns packets in the order of precinct data-bin IDs. This precinct-data bin will be briefly explained below using FIGS. 19A and 19B. FIGS. 19A and 19B are views for explaining the precinct-data bin.

The precinct data-bin is a collection of data formed by lining up packets of all layers, which form resolution level rn and component number cn of precinct pn in Tile Tn, in ascending order of layer number. Response data (of JPIP) from the server to the client terminal is generated based on this precinct data-bin, and each data can be identified by the precinct data-bin ID (expressed by PrID(tn, rn, cn, pn)) described in the response data. PrID(tn, rn, cn, pn) is given by:

$$PrID(tn, rn, cn, pn) = tn + (cn + s \times (\text{number of components}) \times \text{number of tiles}$$

for s=pn+tn×(number of precincts per tile in resolution level rn)+(sum total of numbers of precincts of tile tr from resolution levels 0 to (rn−1)

Therefore, in case of an image which has two resolution levels, each of which has three components, four tiles, and one position per tile, PrID(tn, rn, cn, pn) is given by:

$$PrID(tn, rn, cn, pn) = tr + (c + 3s) \times 4$$

Tile data in each component of each resolution level are assigned numbers shown in FIG. 19B. In this way, since PrID as a unique number is assigned to each tile data in each component of each resolution level in the precinct data-bin, each individual tile data can be identified.

Also, assume that encoded data of each image held in the storage device 1805 is generated under the following encode conditions.

Figure 20:
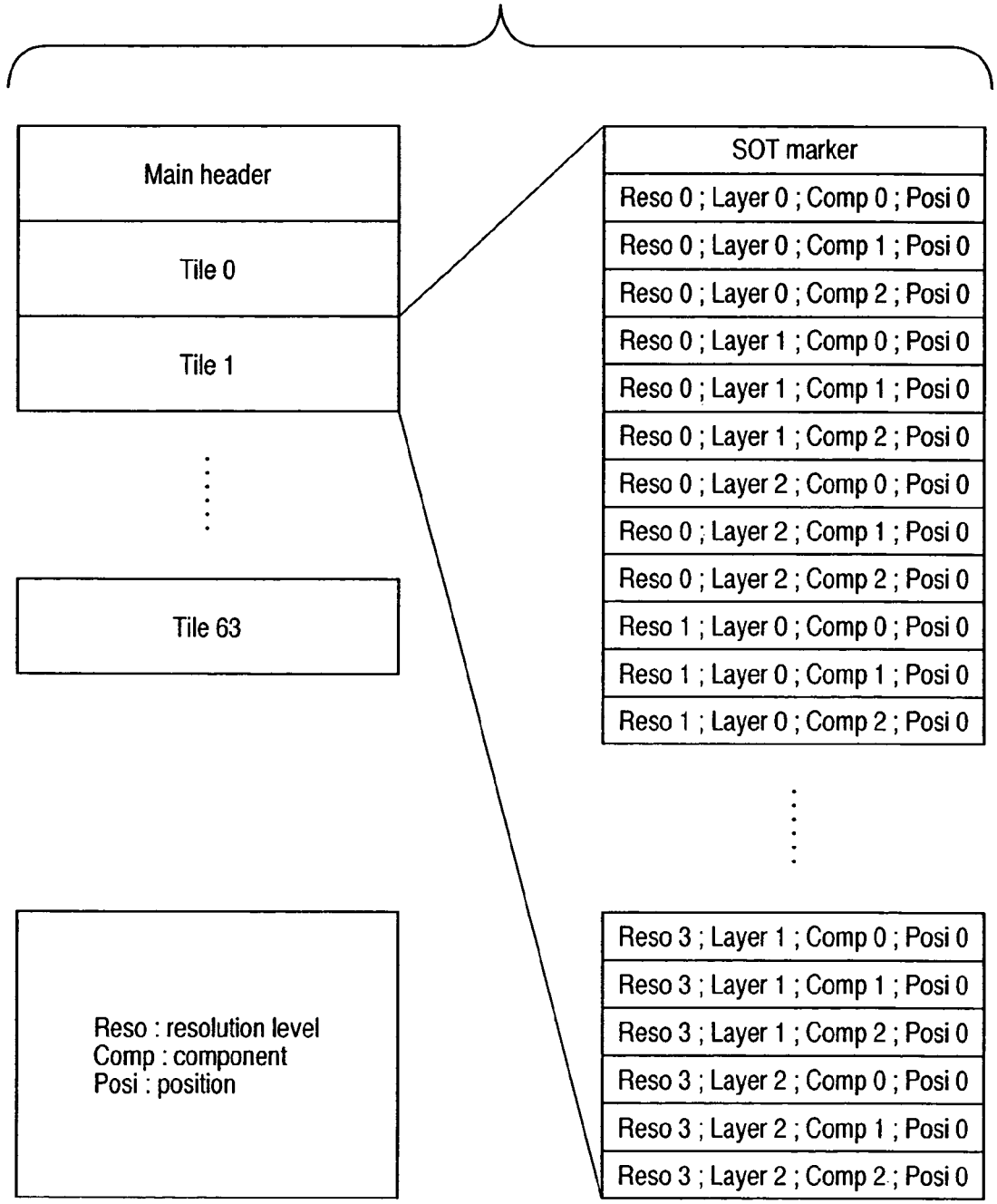
FIG. 20 shows the configuration of encoded data of an image, i.e., a JPEG2000 bitstream, which is encoded under the encode conditions according to the fifth embodiment of the present invention.
Figure 21:
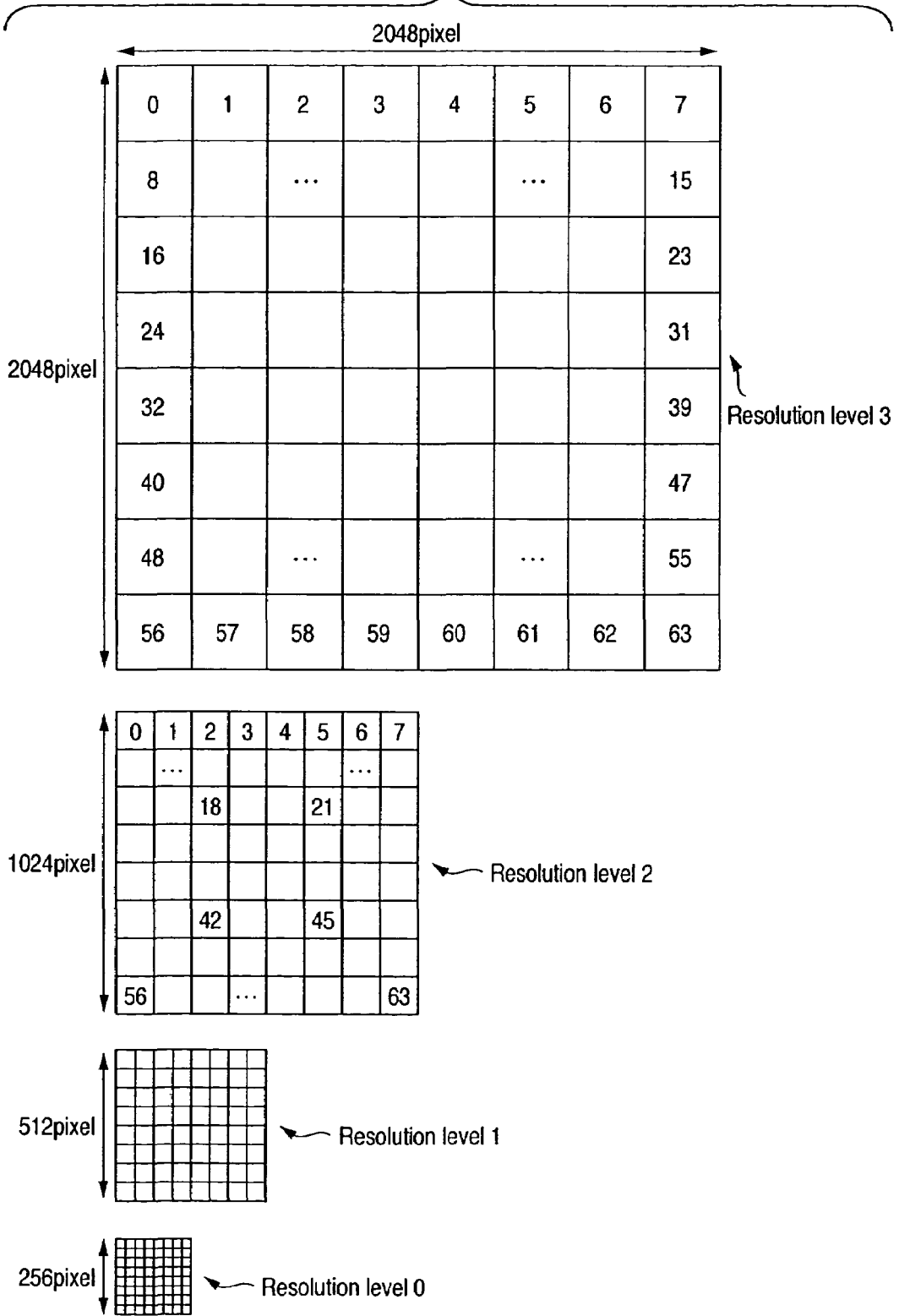
FIG. 21 is a view for explaining numbers assigned to respective tiles.

Image size at maximum resolution: 2048×2048 [pixels]
  Tile segmentation: segment into 8×8=64 tiles
  Number of resolution levels: 4 (i.e., resolution levels 0 to 3)
  Number of layers: 3 (i.e., layers 0 to 2)
  Number of positions: 1 position/tile
  Number of components: 3 (i.e., components 0 to 2)
  Progression order:
Resolution-Layer-Component-Position FIG. 20 shows the configuration of encoded data of an image, i.e., a JPEG2000 bitstream, which is encoded under such encode conditions. Numbers given to respective tiles in FIG. 20 are assigned in turn from the upper left position of a source image to be encoded, as shown in FIG. 21.

The processes executed by the client terminal 1801 (or 1802) in FIG. 18 upon receiving encoded data of a desired image from the server 1804 and caching them will be described below.

Figure 22:
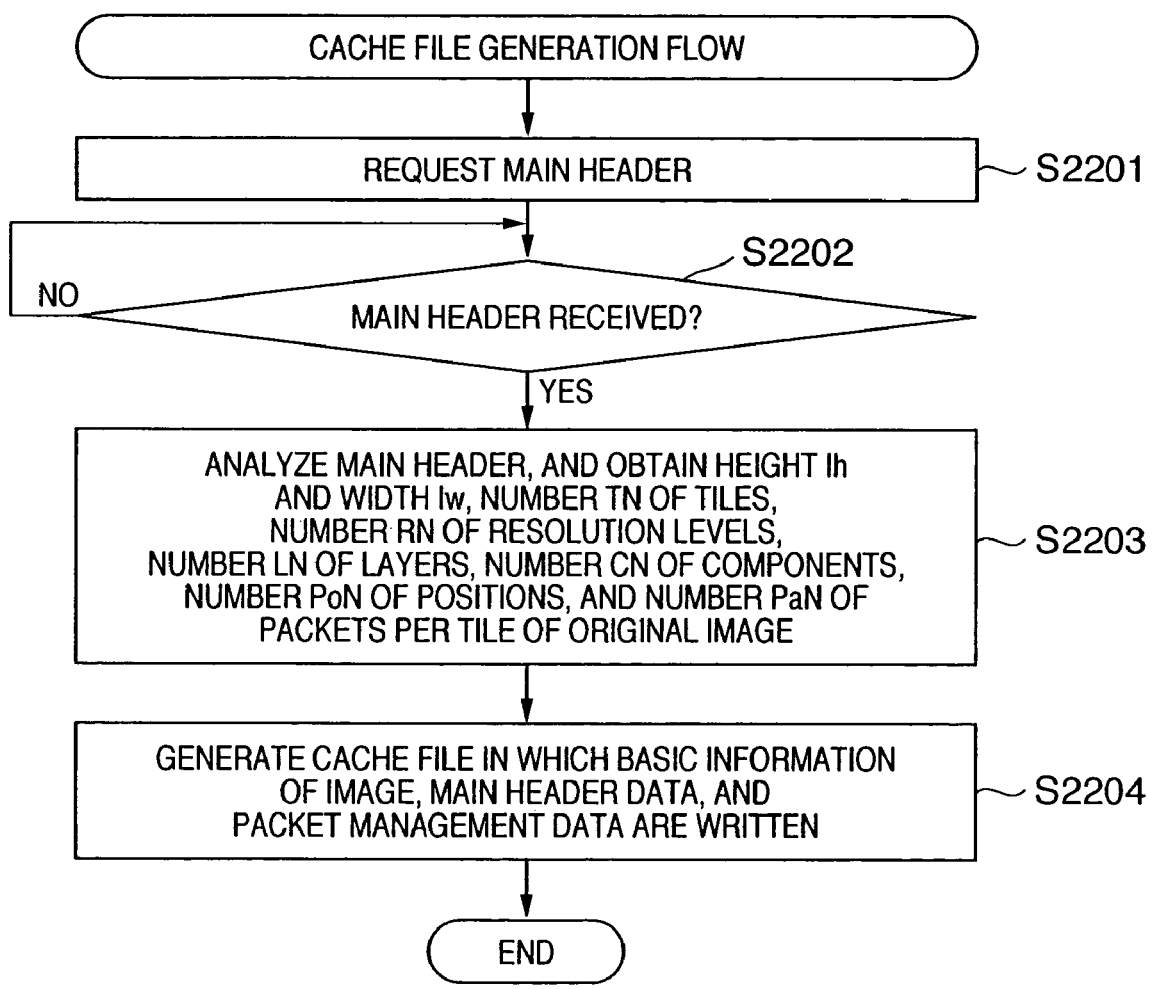
FIG. 22 is a flow chart of a process for generating a cache file according to the fifth embodiment of the present invention.

FIG. 22 is a flow chart of the process for generating a cache file (to be described later). Note that the program according to the flow chart of FIG. 22 is saved in the secondary memory 1703, is loaded onto the primary memory 1702 under the control of the CPU 1701, and is executed by the CPU 1701, so as to allow the client terminal 1801 (or 1802) to implement the process to be described below.

The client terminal 1801 requests the server 1804 to transmit a main header in a bitstream which contains encoded data of an image to be displayed (step S2201).

The received main header is stored in the primary memory 1702. Upon detection of the reception of the main header (step S2202), the CPU 1701 interprets this main header to obtain basic information of the image to be displayed, i.e., height Ih and width Iw, the number TN of tiles, the number RN of resolution levels, the number LN of layers, the number CN of components, and the number PoN(r) of positions per tile in each resolution level r, and the number PaN of packets contained per tile (step S2203). These values can be easily obtained by interpreting SIZ and COD markers in the main header. Assume that this embodiment obtains the following basic information of the image:

Ih=Iw=2048
TN=64
RN=4
LN=3
CN=3
PoN(0)=PoN(1)=PoN(2)=PoN(3)=1
PaN=36

However, the gist of the following description is not limited to these specific values.

Next, data of a cache file in which the basic information of the image obtained in step S2203, data used to manage packet data to be received, and the main header received in step S2202 are written is generated on the primary memory 1702 (step S2204).

Figure 23:
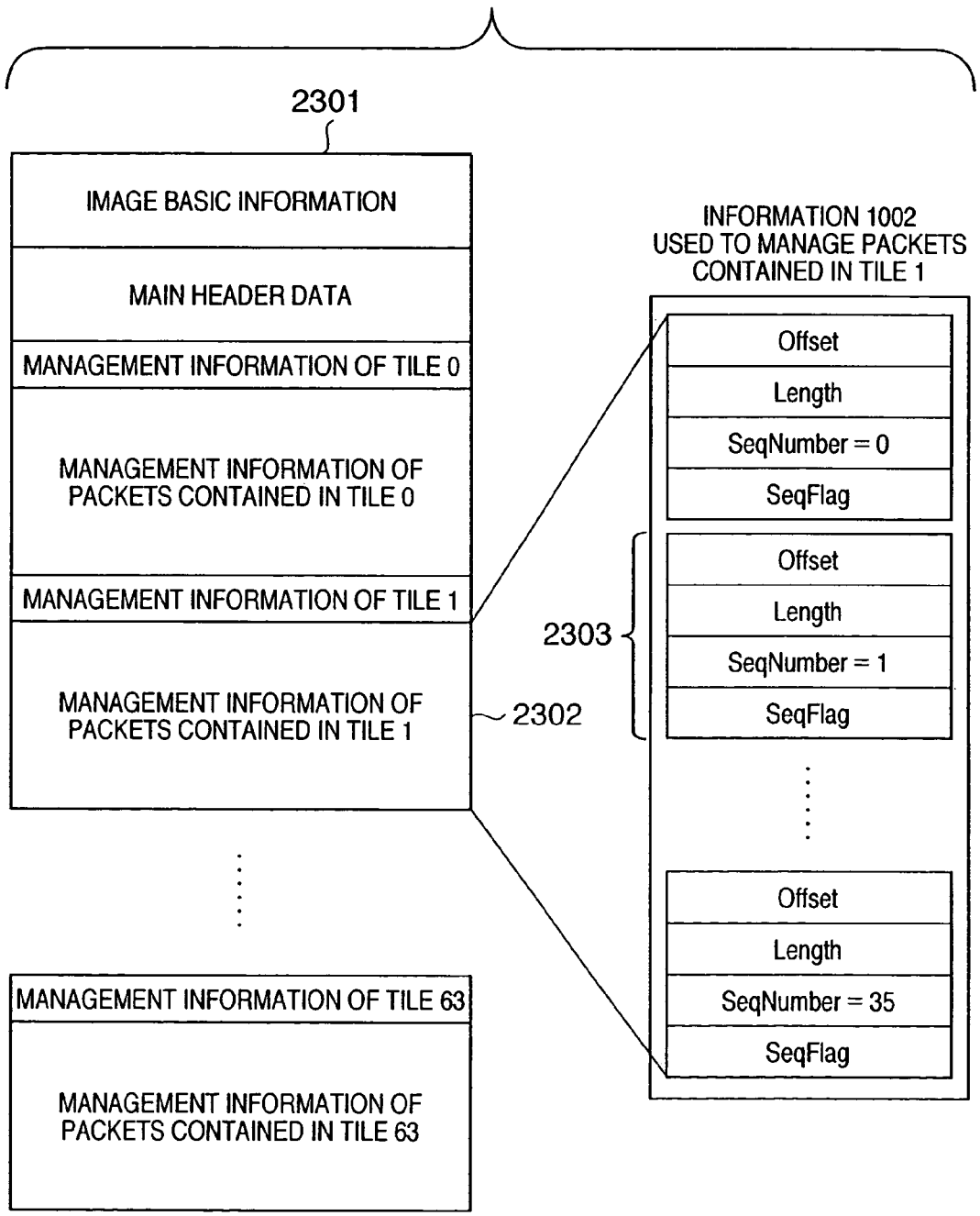
FIG. 23 shows the schematic configuration of the cache file according to the fifth embodiment of the present invention.

FIG. 23 shows the schematic configuration of the cache file according to this embodiment. Reference numeral 2301 denotes a cache file main body, which contains the basic information of the image, main header, and information (management information) used to register and manage information associated with packets to be received, as described above. The right side of FIG. 23 shows details of information 2302 used to manage packets contained in, e.g., tile 1.

As information used to manage packets contained in tile 1, the following four pieces of information are managed for each packet.

an offset value (Offset) from the head of the cache file to data of each packet to be appended (cached) to this cache file
a packet data length (Length)
a number "packet sequence number" (SeqNumber) indicating the order of each packet in the tile
a flag (SeqFlag) indicating continuity of data of each packet That is, the information 2302 is registered with sets of information each including these four pieces of information in correspondence with packets contained in tile 1. Details of the four pieces of information will be explained later.

Also, Offset, Length, and SeqFlag above are initialized to Offset=0, Length=0, and SeqFlag=NON_IN_SEQUENCE upon generation of the cache file in step S2204. As for SeqNumber, serial numbers 0 to 35 are assigned in turn from the first packet since PaN=36. FIG. 24A shows such initialized management information.

With the above process, the management information can be initialized, and the four pieces of information associated with each packet to be received can be registered in the initialized management information.

Figure 25:
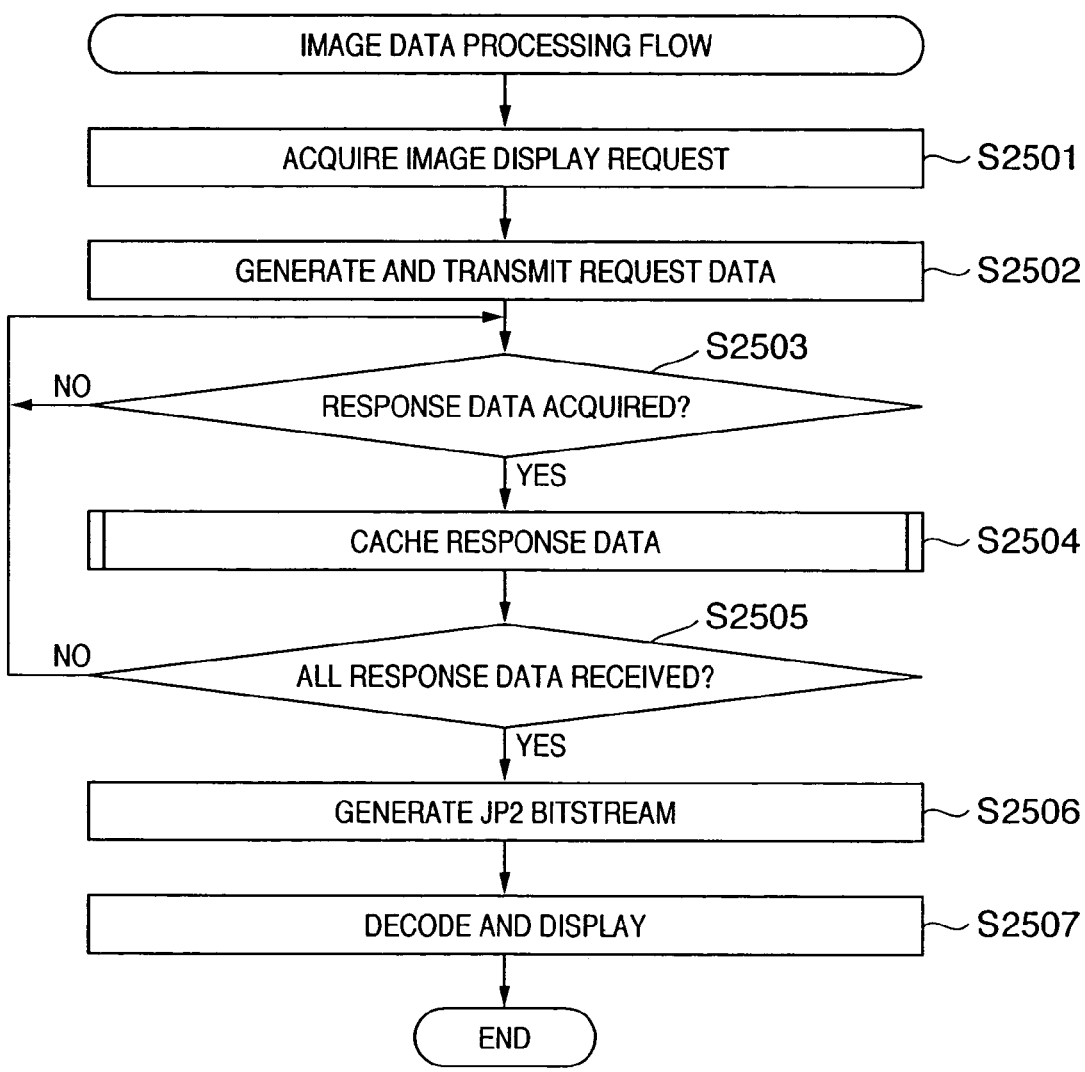
FIG. 25 is a flow chart showing processes until a client terminal 1801 requests a server 1804 of encoded data of an image, receives the encoded data of the image transmitted for respective packets from the server 1804 in response to the request, decodes the received encoded data of the image, and displays the decoded data on an output device 1805 as a display device.

Details of the process executed when the client terminal 1801 requests the server 1804 of encoded data of an image, receives the encoded data of an image transmitted from the server 1804 for respective packets in response to the request, decodes the received encoded data of the image, and displays the decoded image on the output device 1705 as the display device will be described below with reference to FIG. 25 which is the flow chart of that process. Note that the program according to the flow chart of FIG. 25 is saved in the secondary memory 1703, is loaded onto the primary memory 1702 under the control of the CPU 1701, and is executed by the CPU 1701, so as to allow the client terminal 1801 to implement the process to be described below.

A display request of an image designated by the user using the input device 1704 such as a keyboard or the like is acquired (step S2501). The CPU 1701 generates data (request data) indicating the resolution and the like used upon displaying the entire image on the basis of this request, and transmits it to the server 1804 (step S2502). In this embodiment, since the entire image is displayed using data of resolution level 1 and layer 0, the request data is used to request the server 1804 to transmit packet data of resolution levels 0 and 1, layer 0, and components 0 to 2.

Therefore, the server 1804 transmits packet data of resolution levels 0 and 1, layer 0, and components 0 to 2 for all tiles to the client terminal 1801 in response to this request. Hence, upon receiving packet data (response data) from the server 1804 (step S2503), the client terminal 1801 caches them by a method to be described later (step S2504). Assume that the received packet data are stored in a reception buffer on the primary memory 1702. Note that the process in step S2504 will be described in detail later.

Upon reception of all requested packet data (step S2505), the client terminal generates a JP2 bitstream from the cache file (step S2506), decodes the JP2 bitstream, and displays the decoded data on the output device 1705 (step S2507).

Figure 26:
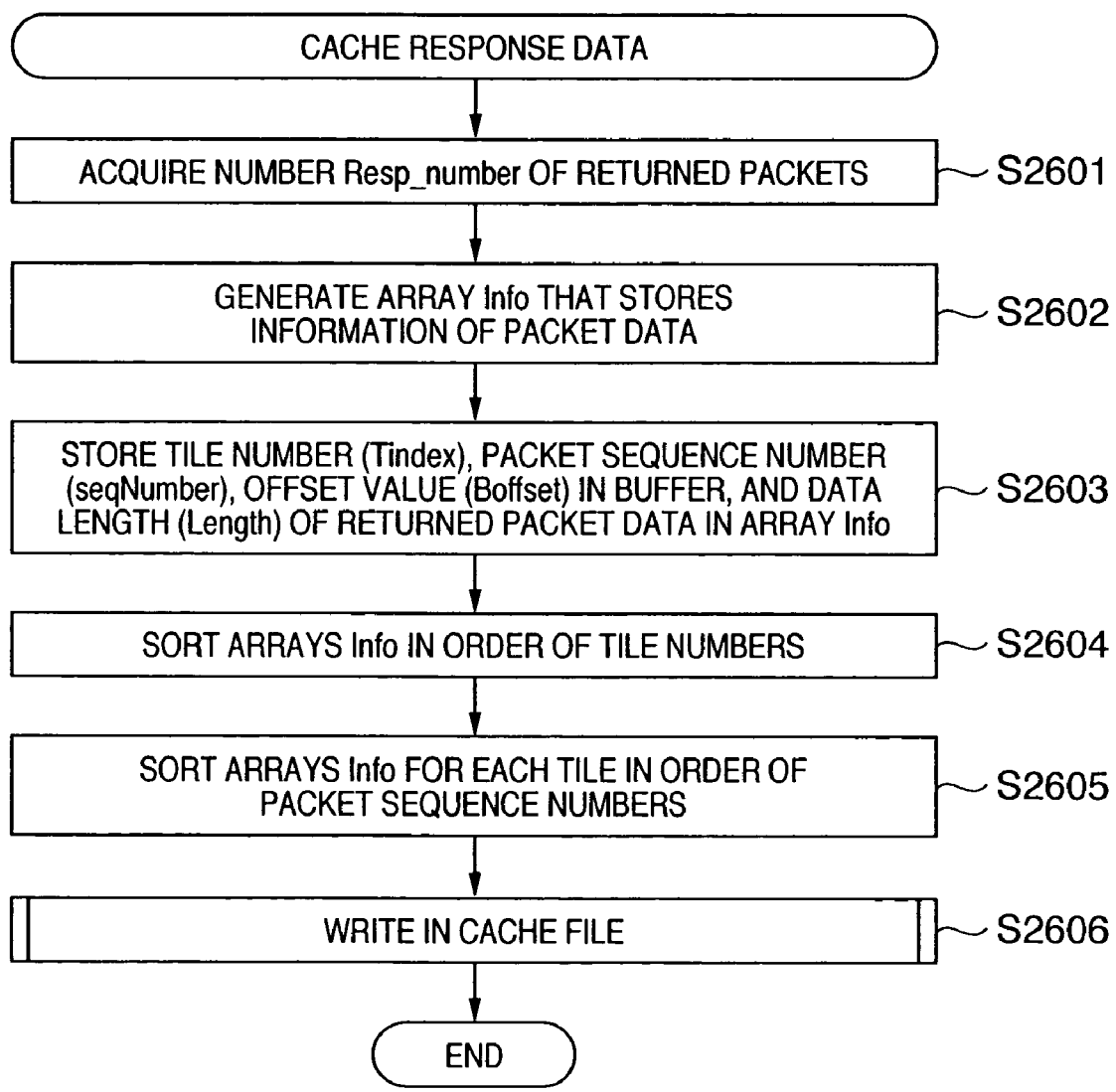
FIG. 26 is a flow chart showing details of a process for caching encoded data of an image received for respective packets from the server 1804.

Details of the process in step S2504, i.e., the process for caching encoded data of an image received from the server 1804 for respective packets, will be described below with reference to FIG. 26. FIG. 26 is a flow chart showing the process for caching encoded data of an image received from the server 1804 for respective packets.

Initially, the total number Resp_number of packets to be received is acquired (step S2601). As the acquisition method, the total number of packets may be calculated based on the contents indicated by the request data (the number of packets of resolution levels 0 and 1, layer 0, and components 0 to 2 is calculated), or the number of actually received packet may be counted.

In this embodiment, since the server 1804 transmits packets that form resolution levels 0 and 1, layer 0, and components 0 to 2 per tile, i.e., six packets, the total number of packets to be received is 6 (number of packets per tile)×64 (total number of tiles)=384.

Next, array Info used to temporarily store information associated with each packet transmitted from the server 1804 is generated (step S2602). The "information associated with each packet" to be stored in array Info includes the following four items.

a number (Tindex) of a tile to which that packet belongs
a number "Packet sequence number" (seqNumber) indicating the order of the packet in the tile to which that packet belongs
an offset value (Boffset) from the head of the reception buffer to data of that packet
a packet data length (Length)

Figure 27:
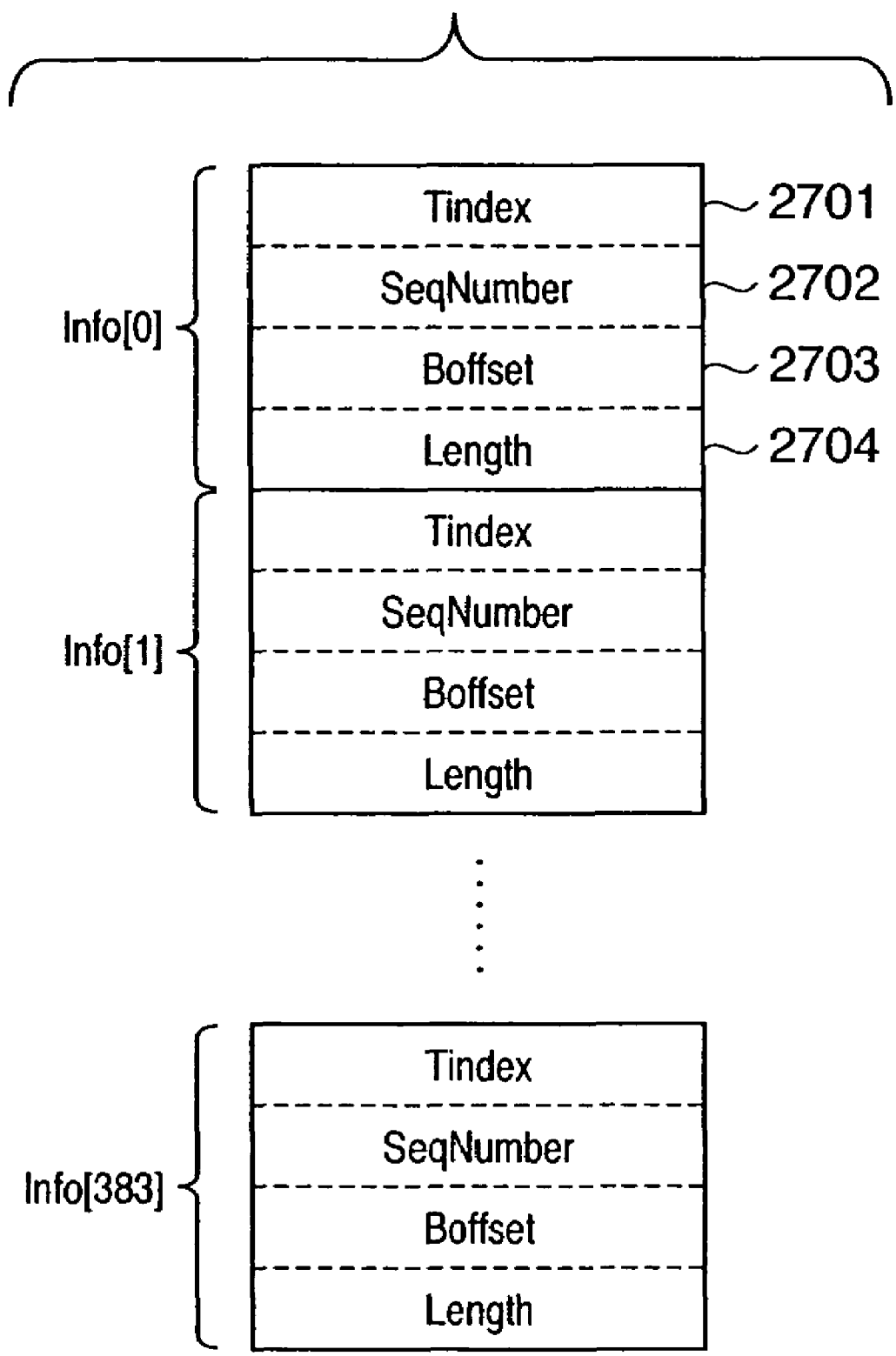
FIG. 27 shows the configuration of array Info.

FIG. 27 shows the configuration of array Info. As shown in FIG. 27, array Info is used to store one set of the above four pieces of information for each packet. As described above, since the total number of packets to be transmitted is 384, 384 arrays Info are prepared.

In FIG. 27, Info[0] is a field for storing the above four pieces of information associated with the first packet in a tile with the smallest tile number (0 in this embodiment). Also, fields 2701, 2703, 2703, and 2704 are used to store Tindex, seqNumber, Boffset, and Length for the first packet in the tile with the smallest tile number, as shown in FIG. 27.

These four pieces of information for each packet can be obtained by interpreting data of each packet stored in the reception buffer or using the equation for calculating PrID above.

Hence, the client terminal 1801 stores the four pieces of information associated with each packet in array Info in accordance with the reception order of packets (step S2603).

In this embodiment, since the server 1804 transmits response data in the precinct data-bin order, Tindex and seqNumber in arrays info line up as follows.

Info[0].Tindex=0, Info[0].seqnumber=0
Info[1].Tindex=1, Info[1].seqnumber=0
Info[2].Tindex=2, Info[2].seqnumber=0
. . .
Info[64].Tindex=0, Info[64].seqnumber=1
Info[65].Tindex=1, Info[65].seqnumber=1
Info[66].Tindex=2, Info[66].seqnumber=1
. . .
Info[128].Tindex=0, Info[128].seqnumber=2
Info[129].Tindex=1, Info[129].seqnumber=2
Info[130].Tindex=2, Info[130].seqnumber=2
. . .

Arrays info are sorted in the order of tile numbers (step S2604). The Tindex values of arrays Info[x] (x=0, 1, 2, . . . , 383) are referred to, and arrays Info[x] are sorted in ascending order of value. As a sort method, a quick sort method or the like may be used, but the sort method is not particularly limited.

Assume that arrays Info are sorted as follows by the sort process in step S2604.

Info[0].Tindex=0, Info[0].seqNumber=0
Info[1].Tindex=0, Info[1].seqNumber=1
Info[2].Tindex=0, Info[2].seqNumber=2
Info[3].Tindex=0, Info[3].seqNumber=9
Info[4].Tindex=0, Info[4].seqNumber=10
Info[5].Tindex=0, Info[5].seqNumber=11
Info[6].Tindex=1, Info[6].seqNumber=0
Info[7].Tindex=1, Info[7].seqNumber=1
. . .

Next, arrays Info with the same tile number are sorted in the order of numbers indicated by seqNumber values (step S2605). For example, since the above line of arrays Info includes six arrays with Tindex=0, these six arrays are sorted in ascending order of seqNumber value. The same process applies to arrays with Tindex=1 or more. As the sort method in this case as well, a quick sort method or the like may be used, but the sort method is not particularly limited.

As a result of the processes in steps S2604 and S2605, since arrays Info line up in the order of packet sequence numbers in each tile, the line of arrays Info before and after the process in step S2605 is the same as the above one.

Although not shown, packet data stored in the reception buffer are similarly sorted in steps S2604 and S2605. That is, the packet data stored in the reception buffer are sorted in the order of the numbers of tiles to which they belong, and are then sorted in the order in each tile to which they belong.

The sorted packet data are appended to the cache file in that order, and the information associated with each packet appended to the management information as information used to manage each packet is registered (step S2606).

Figure 28:
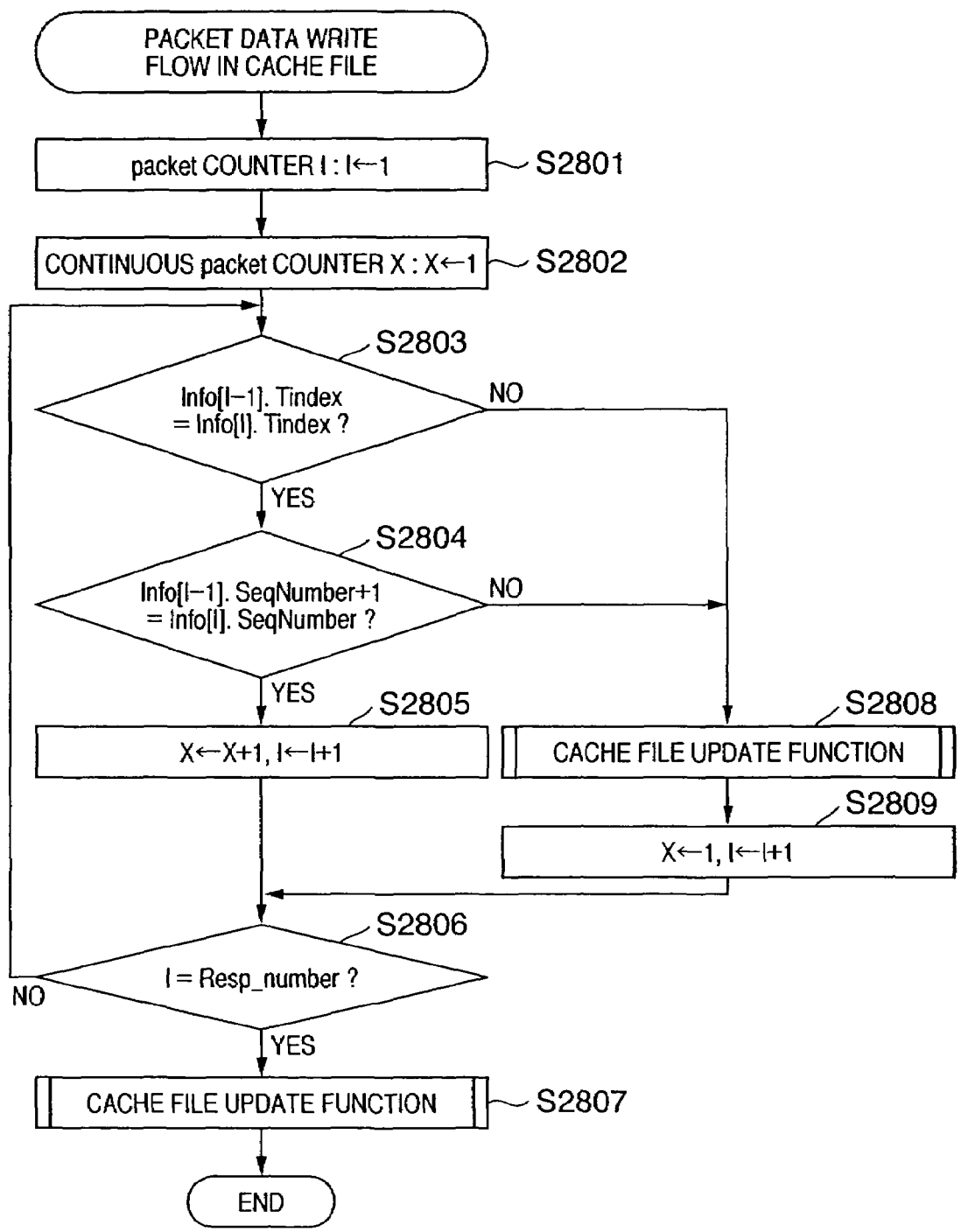
FIG. 28 is a flow chart showing details of the process in step S2606.

Details of the process in step S2606 will be described below with reference to the flow chart shown in FIG. 28. FIG. 28 is a flow chart showing details of the process in step S2606.

"1" is substituted in variable I used to count received packets to initialize it (step S2801). Next, "1" is substituted in variable X to initialize it (step S2802). This variable X is used to count the number of arrays Info which have the same Tindex value and serial seqNumber values.

Tile number Tindex of (I-1)-th array Info is compared with that of I-th array Info to check if these values are equal to each other, in other words, if (I-1)-th and I-th arrays Info store information associated with packets contained in the identical tile (step S2803).

If Tile number Tindex of (I-1)-th array Info is equal to that of I-th array Info, i.e., if (I-1)-th and I-th arrays Info store information associated with packets contained in the identical tile, the flow advances to step S2804. In step S2804, a value obtained by adding "1" to the value of seqNumber of (I-1)-th array Info is compared with the value of seqNumber of I-th array Info to check if these values are equal to each other, in other words, if (I-1)-th and I-th arrays Info store information associated with packets with serial order values (neighboring order values) (step S2804).

If the value obtained by adding "1" to the value of seqNumber of (I-1)-th array Info is equal to the value of seqNumber of I-th array Info, i.e., (I-1)-th and I-th arrays Info store information associated with packets with serial order values (neighboring order values), the flow advances to step S2805 to update variables X and I by adding "1" to them (step S2805).

On the other hand, if it is determined in step S2803 that tile number Tindex of (I-1)-th array Info is different from that of I-th array Info, i.e., (I-1)-th and I-th arrays Info store information associated with packets which are contained in different tiles, or if it is determined in step S2804 that the value obtained by adding "1" to the value of seqNumber of (I-1)-th array Info is different from the value of seqNumber of I-th array Info, i.e., (I-1)-th and I-th arrays Info store information associated with packets with non-serial order values (non-neighboring order values), the flow advances to step S2808 to execute a cache file update process to be described later (step S2808). Details of the process in step S2808 will be described later.

After the cache file update process, "1" is substituted in variable X to initialize it, and "1" is added to variable I to update it (step S2809). After the process in step S2805 or S2809, it is checked if the value indicated by variable I is equal to the total number Resp_number of packets to be received (step S2806). If I is not equal to Resp_number, the flow returns to step S2803 to repeat the above processes.

On the other hand, if I is equal to Resp_number, the flow advances to step S2807 to execute the same cache file update process as in step S2808. Since the process in step S2807 is the same as that in step S2808, they will be described together below.

Figure 29:
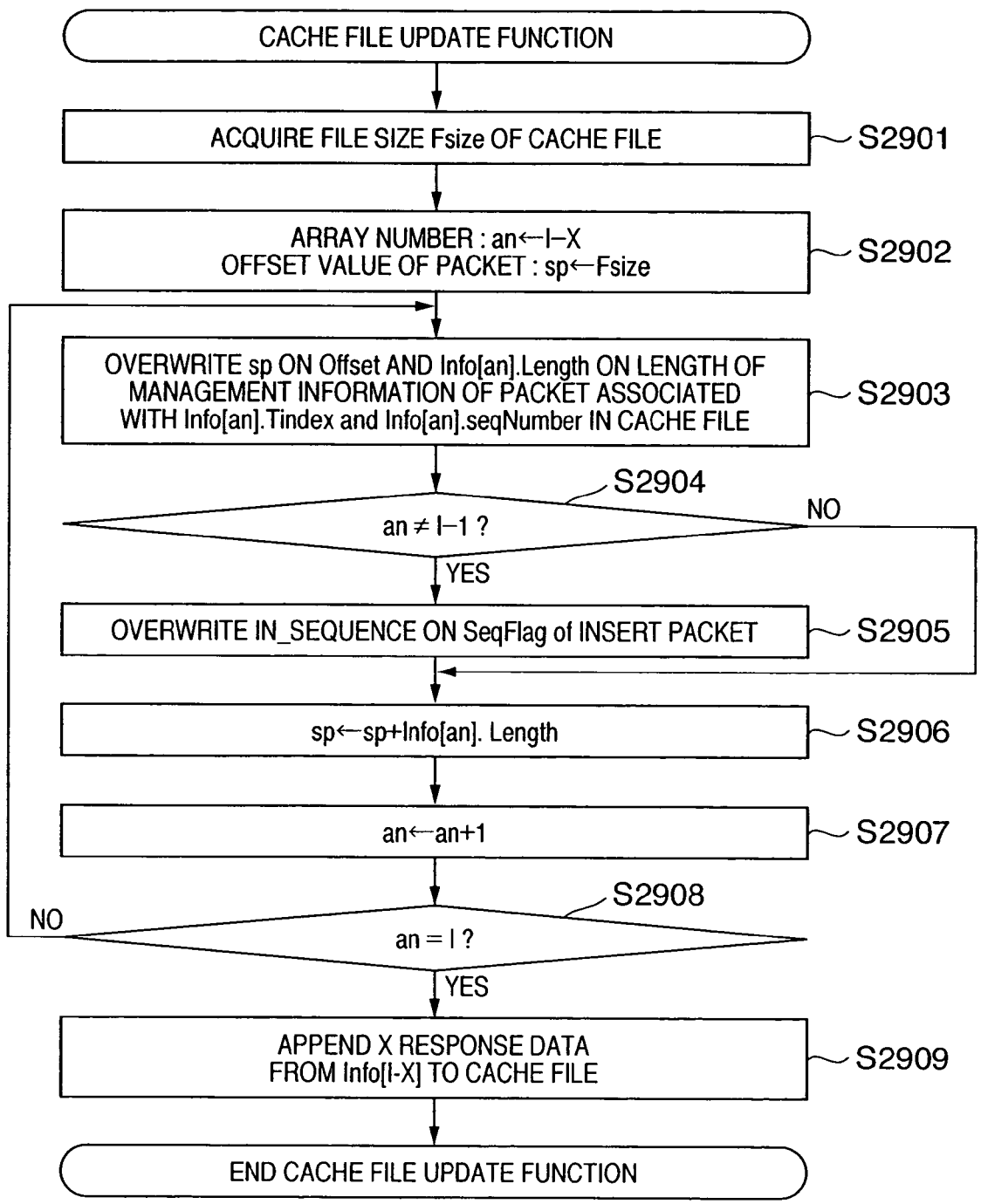
FIG. 29 is a flow chart showing details of a cache file update process in steps S2807 and S2808.

FIG. 29 is a flow chart showing details of the cache file update process in steps S2807 and S2808. The cache file update process is a process for sequentially appending (caching) data of packets which are contained in an identical tile and appear sequentially in that tile to the cache file, and registering the information associated with these packets in management information contained in the cache file, as described above. Information to be registered in the management information is stored in each of arrays Info[I-X] to Info[I-1].

In this embodiment, arrays Info[0], Info[1], and Info[2] of arrays Info are to undergo this cache file update process first, and Tindex and SeqNumber, and Length values in these arrays are as follows.

Info[0].Tindex=0,  Info[0].seqNumber=0,  Info[0].Length=64
Info[1].Tindex=0,  Info[1].seqNumber=1,  Info[1].Length=72
Info[2].Tindex=0,  Info[2].seqNumber=2,  Info[2].Length=38

The values of variables X and I at the time of executing the cache file update process for these arrays are both 3.

In the cache file update process, file size Fsize of the cache file is acquired first (step S2901). In this embodiment, assume that Fsize=38630 [bytes].

The value indicated by (I-X) is substituted in variable an, which is used to count the number of array Info, so as to initialize it, and the value indicated by file size Fsize acquired in step S2901 is substituted in variable sp, which is used to substitute an offset value to the head of data of each packet to be appended (cached) to this cache file, so as to initialize it (step S2902).

In this embodiment, at this time,
an=0
sp=38630

The processes in steps S2903 to S2908 to be described below are applied to all objective packets (the (I-X)-th to (I-1)-th packets of the sorted packets), thus registering information associated with all the objective packets in the management information, and sequentially appending (caching) the data of all the objective packets to the cache file. The processes in steps S2903 to S2908 will be explained below.

The value indicated by variable sp above is substituted in Offset in information (Offset, Length, SeqNumber, SeqFlag) used to manage a packet (to be referred to as packet an hereinafter) in an order indicated by Info[an].seqNumber in a tile with tile number Info[an].Tindex in the management information, and the value indicated by Info[an].Length is substituted in Length (step S2903).

In this embodiment, information used to manage a packet with tile number=0 and seqNumber=0 is updated first, the value "38630" indicated by variable sp is substituted in Offset of information associated with this packet, and the value "64" indicated by Info[0].Length is substituted in Length.

In this way, the fact that data of a packet with tile number=0 and seqNumber=0 is appended (cached) for 64 bytes after the 38630th byte position from the head of the cache file, i.e., location information of data of the packet with tile number=0 and seqNumber=0 in the cache file, can be registered.

Next, SeqFlag of packet an in the management information is updated. Needless to say, arrays Info[I-X] to Info[I-1] store information associated with packets with serial order values. Therefore, information used to manage a packet (a packet with tile number=0 and seqNumber=1 in this embodiment) is successively registered after the information used to manage packet an in the management information unless an=(I-1). Thus, a value "IN_SEQUENCE" (NON_IN_SEQUENCE if information used to manage a packet is not successively registered after packet an) indicating this is substituted in SeqFlag of packet an.

In the flow chart shown in FIG. 29, it is checked if the value indicated by variable an is equal to the value indicated by (I-1), i.e., the last packet to be processed has been reached (step S2904). If the last packet has not been reached yet (an=0 or 1 in this embodiment), the flow advances to step S2905; if the last packet has been reached (an=2 in this embodiment), the flow advances to step S2906 while skipping step S2905.

As described above, if the last packet has not been reached yet (an=0 or 1 in this embodiment), the value "IN_SEQUENCE" is substituted in SeqFlag of packet an (step S2905). In this embodiment, the value "IN_SEQUENCE" is substituted in SeqFlag of packets with tile number=0 and seqNumber=0 and 1.

Next, variable Info[an].Length indicating the length of packet an is added to variable sp to calculate an offset value from the head of the cache file to that of packet (an+1), and that offset is substituted in sp again (step S2906). In this embodiment, when an=0, sp=38630+Info[0].Length=38630+64=38694, which indicates the offset value from the head of the cache file to that of data of a packet with tile number=0 and seqNumber=1 (corresponding to packet (an+1)).

Then, "1" is added to variable an to select information associated with packet (an+1) as the next packet as information to be registered in the management information (step S2907). It is checked if the value indicated by variable an is equal to the value indicated by variable I, i.e., if all pieces of information associated with packets, which are stored in arrays Info [I-X] to Info[I-1], have been registered in the management information (step S2908). If information to be registered still remains, the flow returns to step S2903 to repeat the subsequent processes.

On the other hand, if all pieces of information have been registered, the flow advances to step S2909 to append (cache) data of X packets (the (I-X)-th to (I-1)-th packets) of the sorted packet data stored in the reception buffer to the cache file in turn (step S2909).

Upon specifying data of packets to be appended (cached) to the cache file of those of the sorted packets stored in the reception buffer, data for Info[z].Length bytes from the (Info[z].Boffset)-th byte position from the head of the reception buffer are read out, and are appended to the cache file (note that z is a value ranging from (I-X) to (I-1)).

With the above process, the management information shown in FIG. 24A is updated to that shown in FIG. 24B. As shown in FIG. 24B, the locations of data of respective packets appended to the end of the cache file are registered as values Offset and Length in the management information. In this embodiment, data of the 0-th to second packets, i.e., those of packets with tile number=0 and packet sequence number=0, 1, and 2 are appended to the cache file in the order named.

As described above, according to this embodiment, since received packet data can be successively cached in turn, these packets can be read out at the same time. Hence, the number of times of access to the cache file upon reading out packets can be reduced.

Upon reading out packets, since the locations of data of respective packets in the cache file are registered in the management information, the data positions of respective packets in the cache file.can be easily specified, thus achieving the process for reading out packet at higher speed.

Sixth Embodiment

In this embodiment, a process for generating a JPEG2000 bitstream from the cache file generated in the fifth embodiment will be explained. In the following description, assume that a main header in the cache file is that acquired in the fifth embodiment, and packet data are those which form resolution level 1, layer 0, and three components. However, the gist of the present invention to be described below is not limited to them. Note that zero length packets are used as dummy data in correspondence with non-received packet data.

Figure 30:
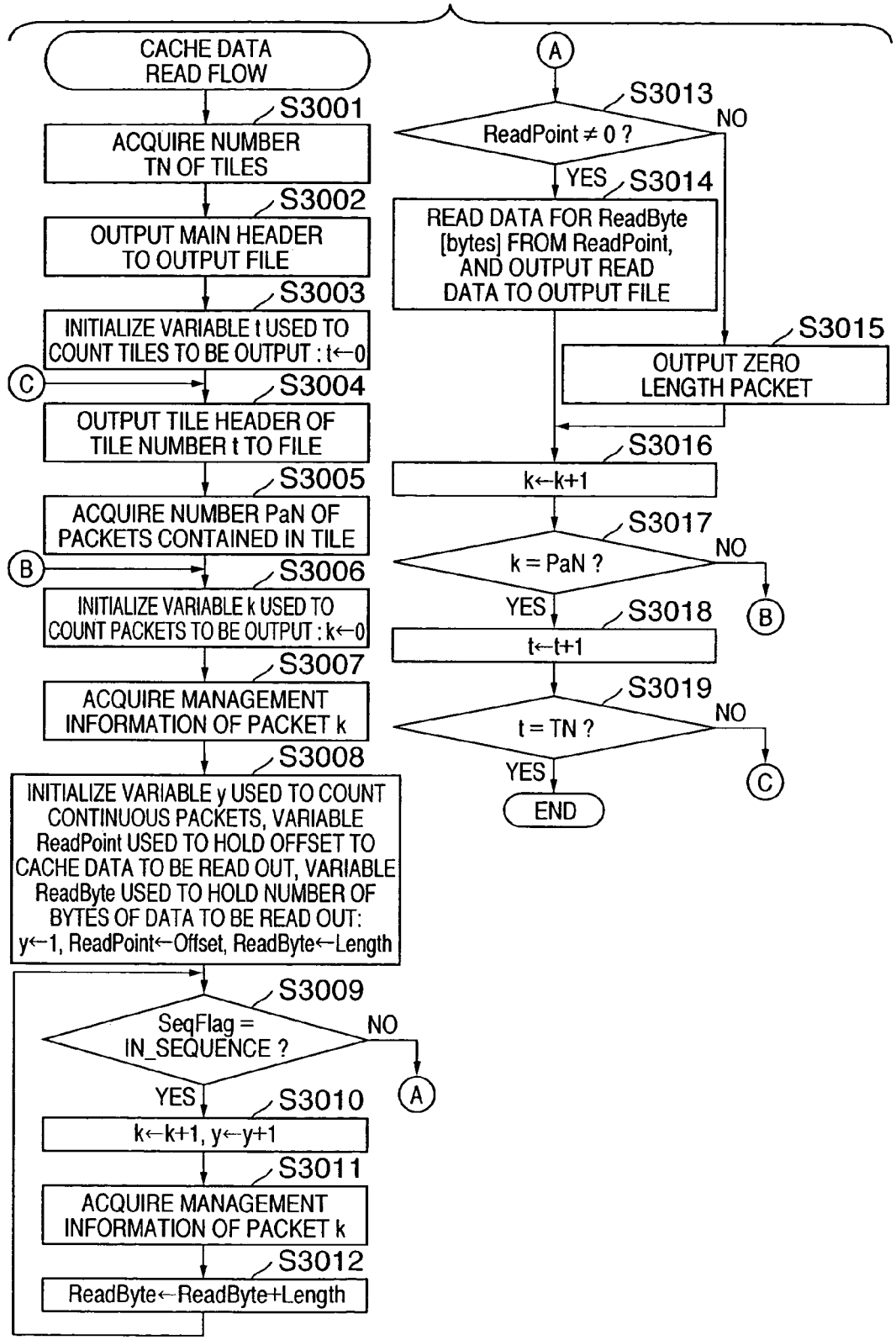
FIG. 30 is a flow chart of the process for reading out packet data of respective tiles from a cache file to an output file.

FIG. 30 is a flow chart of the process for reading out packet data of respective tiles to an output file. Note that the program according to the flow chart of FIG. 30 is saved in the secondary memory 1703, is loaded onto the primary memory 1702 under the control of the CPU 1701, and is executed by the CPU 1701, so as to allow the client terminal 1801 (or 1802) to implement the process to be described below.

Basic information of an image is read out from the cache file to acquire the number TN of tiles (step S3001). In this embodiment, TN=64 since the cache file generated in the fifth embodiment is used and, hence, the basic information of the image is the same as that described in the fifth embodiment.

Main header data is read out from the cache file and is output to an output file (step S3002). Note that the output file is generated on the primary memory 1702. Since packet data are output to this output file for each tile by a process to be described later, a variable used to count tile numbers is required. Therefore, this variable is t, and variable t is initialized to zero (step S3003).

A tile header of tile number t is acquired, and is written in the output file (step S3004). In this embodiment, since all tiles are encoded under equal encode conditions, the tile header can be easily generated/acquired by acquiring the tile number and data length of the tile to be generated from the cache from the tile management information.

The total number PaN of packets contained in the tile of tile number t is acquired with reference to the basic information of the image (step S3005). Since the basic information of the image is the same as that described in the fifth embodiment, PaN=36. Then, variable k used to count data of packets to be read out from the cache file is initialized to zero (step S3006).

Next, information (Offset, Length, SeqNumber, SeqFlag) of a packet corresponding to SeqNumber equal to the value indicated by variable k of those in the tile of tile number t is acquired from the information (management information) used to manage respective packets in the cache file (step S3007).

Since both variables t and k are initialized to zero, the following data is acquired in this embodiment (in the management information shown in FIG. 24B, information of the first packet, i.e., information of a packet with seqNumber=0 in the tile with tile number=0).

Offset=38630
Length=64
SeqNumber=0
SeqFlag=IN_SEQUENCE

Subsequently, variables to be described below are initialized (step S3008). "1" is substituted in variable y to initialize it. This variable y is used to count the number of packets which are contained in an identical tile and appear sequentially in that tile, of the data of the packets appended to the cache file.

The value indicated by Offset acquired in step S3007 is substituted in variable ReadPoint. This variable ReadPoint is used to hold an offset value from the head of the cache file to that of packet data to be read out, i.e., the read position of the packet data to be read out in the cache file.

The value indicated by Length acquired in step S3007 is substituted in variable ReadByte. This variable ReadByte is used to hold the data length of a packet group to be read out (a packet group with serial seqNumber values). In this embodiment, when t=0 and k=0, the values indicated by these three variables are:

y=1
ReadPoint=38630
ReadByte=64

It is checked if the value indicated by SeqFlag obtained in step S3007 is IN_SEQUENCE (in other words, if data of a packet with.seqNumber=k in the tile of tile number t and data of a packet with seqNumber=(k+1) in the tile of tile number t are successively appended to the cache file) (step S3009).

If SeqFlag=IN_SEQUENCE, the flow advances to step S3010; otherwise, the flow jumps to step S3013. For example, when t=0 and k=0, since SeqFlag=IN_SEQUENCE in this embodiment, as shown in FIGS. 24A and 24B, the flow advances to step S3010. The values held by variables k and y are incremented by one (step S3010), and information (Offset, Length, SeqNumber, SeqFlag) of the next packet (a packet corresponding to seqNumber equal to the value indicated by incremented variable k (=1) of those in the tile of tile number=0) is acquired from the cache file (step S3011).

Since variables t=0 and k=1, the following data is acquired in this embodiment (in the management information shown in FIG. 24B, information of the next packet, i.e., information of a packet with seqNumber=0 in the tile with tile number=0).

Offset=38694
Length=72
SeqNumber=1
SeqFlag=IN_SEQUENCE

Next, the value indicated by Length contained in the information acquired in step S3011 is added to variable ReadByte used to hold the data length of a packet group to be read out (a packet group with serial seqNumber values) (step S3012). The processes in steps S3010 to S3012 are repeated as long as SeqFlag in the information acquired in step S3011 is IN_SEQUENCE, i.e., seqNumber values assume serial numbers.

With these repetitive processes, variable ReadByte stores the data length of the packet group to be read out with tile number=t (packet group with serial seqNumber values).

In this embodiment, when t=0 and k=2, the flow advances to step S3013. The values indicated by respective variables when the flow advances to step S3013 in this embodiment are:

t=0, k=2
Offset=38768
SeqNumber=2
SeqFlag=NON_IN_SEQUENCE
y=3
ReadPoint=38768
ReadByte=174

It is then determined whether or not variable ReadPoint=0 (step S3013). If ReadPoint≠0, the flow advances to step S3014. In step S3014, data for ReadByte Bytes from the (ReadPoint)-th byte position from the head of the cache file are read out, and are written in the output file (step S3014). In this embodiment, data for 174 bytes from the 38768th byte position from the head of the cache file, i.e., data of packets with tile number=0 and seqNumber=0, 1, and 2, are read out from the cache file, and are written in the output file.

On the other hand, if ReadPoint=0, the flow advances to step S3015. In step S3015, it is determined that data of the corresponding packet is not cached, and zero length packet data is written in the output file (step S3015). The value of variable k used to count the next packet to be read out is incremented by one (step S3016). It is then checked whether or not the value of incremented variable k has reached the total number PaN of packets contained in the tile of tile number t (step S3017).

If k=PaN, it is determined that data of all packets contained in the tile of tile number t have been output to the output file, and the value of variable t indicating the tile number is incremented by one to select the next tile as an object to be processed (step S3018). In this embodiment, when k=PaN=36, it is determined that data of the 36 packets in the tile of tile number=0 have been written in the output file.

On the other hand, if k<PaN, it is determined that data of all packets contained in the tile of tile number t have not been output to the output file yet. Hence, the flow returns to step S3006 to repeat the subsequent processes.

If k=PaN, it is checked if the value of incremented variable t has reached the number TN of tiles (step S3019). If t=TN, it is determined that data of packets of all the tiles have been written in the output file, thus ending this process. On the other hand, if t<TN, it is determined that data of packets of all the tiles have not been written in the output file yet. Hence, the flow returns to step S3004 to repeat the subsequent process, so as to execute the process for writing packet data for the next tile in the output file.

With the above process, the output file, in other words, the JPEG2000 bitstream, is generated.

As described above, according to this embodiment, data of packets which are successively cached can be acquired by one file read access. In this way, the number of times of file seek can be reduced, and the process for generating the JPEG2000 bitstream from the cache file can be speeded up.

Seventh Embodiment

In this embodiment, an image process for achieving the same objective as in the fifth and sixth embodiments without using SeqFlag will be explained.

Figure 31:
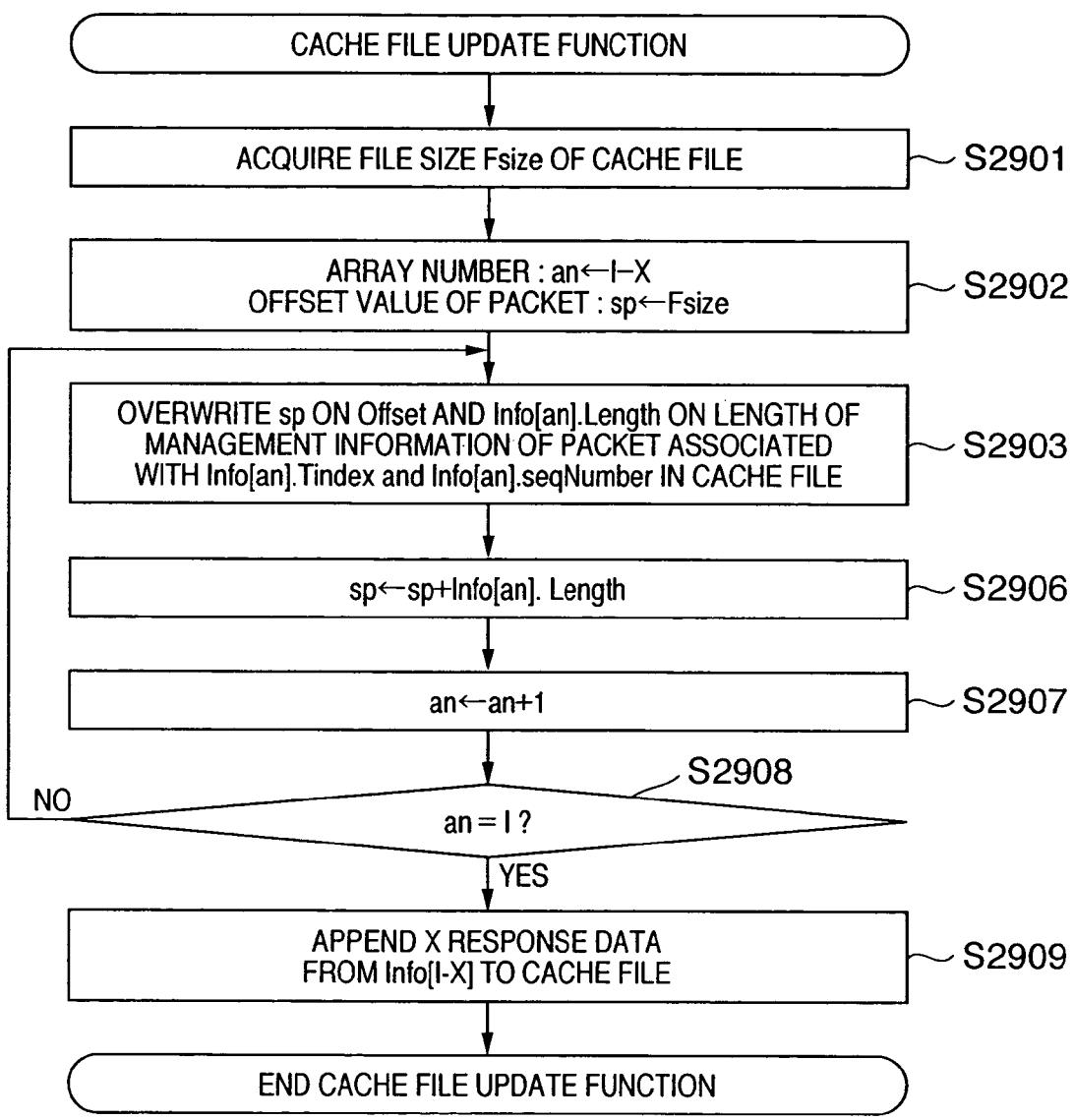
FIG. 31 is a flow chart of a cache file update process according to the seventh embodiment of the present invention.

The cache file generation process will be described first. This embodiment does not use any SeqFlag. Hence, in the flow chart of the cache file generation process according to this embodiment, step S2204 in the flow chart shown in FIG. 22 is modified such that only three pieces of information except for SeqFlag are contained in the management information for each packet. Accordingly, in the flow chart of the cache file update process according to this embodiment, the processes associated with SeqFlag, i.e., steps S2904 and S2905 are omitted from the flow chart shown in FIG. 29, as shown in FIG. 31. Other processes are the same as those in FIG. 29.

Figures 32A, 32B:
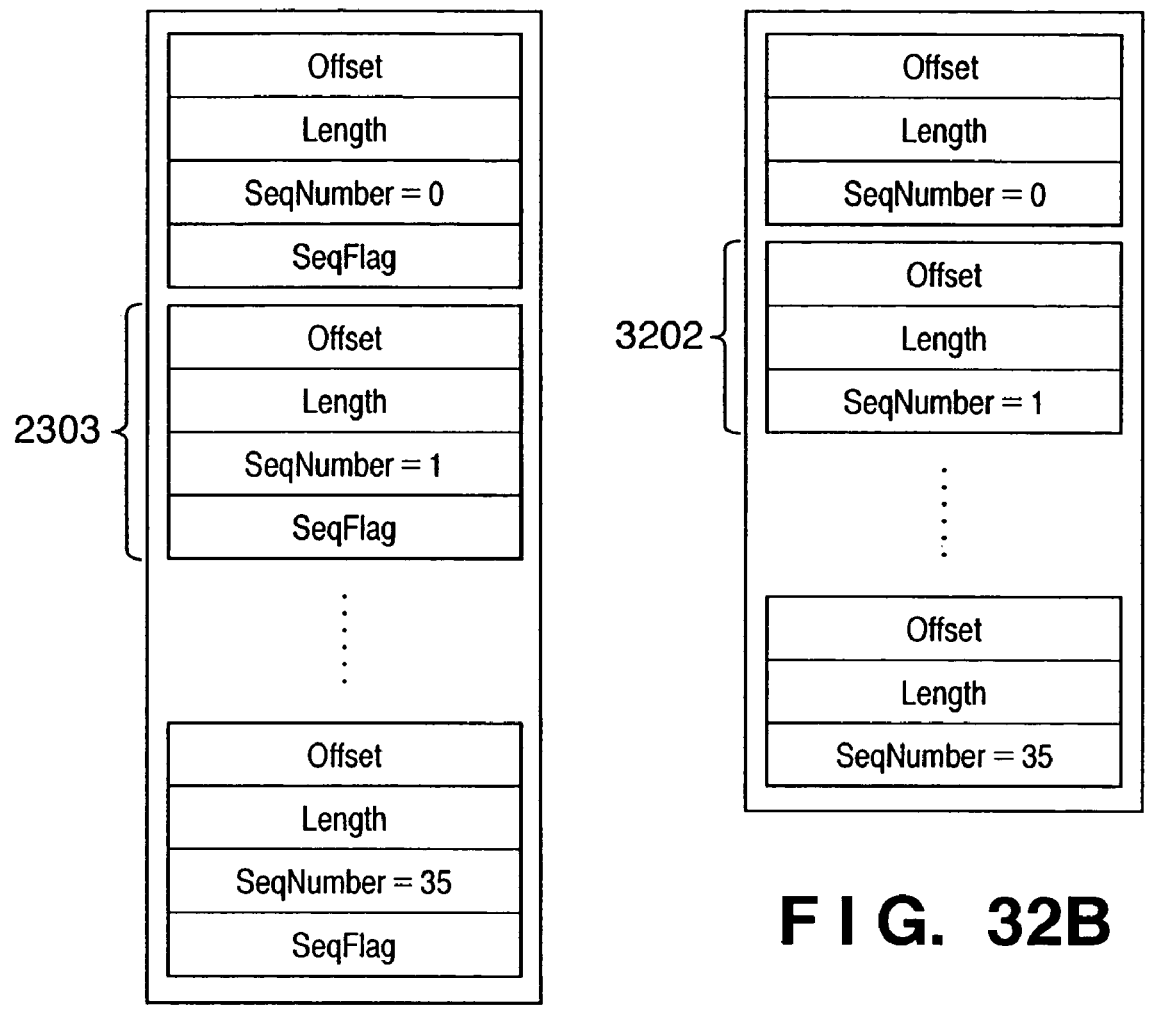
FIG. 32A shows the configuration of a cache file generated by the cache file generation process according to the fifth embodiment of the present invention.
FIG. 32B shows the configuration of a cache file generated by the cache file generation process according to the seventh embodiment of the present invention.

Therefore, the configuration of a cache file generated by such process is as shown in FIG. 32B. FIG. 32B shows the configuration of the cache file generated by the cache file generation process according to this embodiment, and FIG. 32A shows that of the cache file generated by the cache file generation process according to the fifth embodiment. As can be seen from comparison between the two files, e.g., between two pieces of management information of the first packets of corresponding tiles, management information 2303 contains SeqFlag, but management information 3202 does not contain any SeqFlag, and is substantially the same as the management information 2302 except for this flag.

Figure 33:
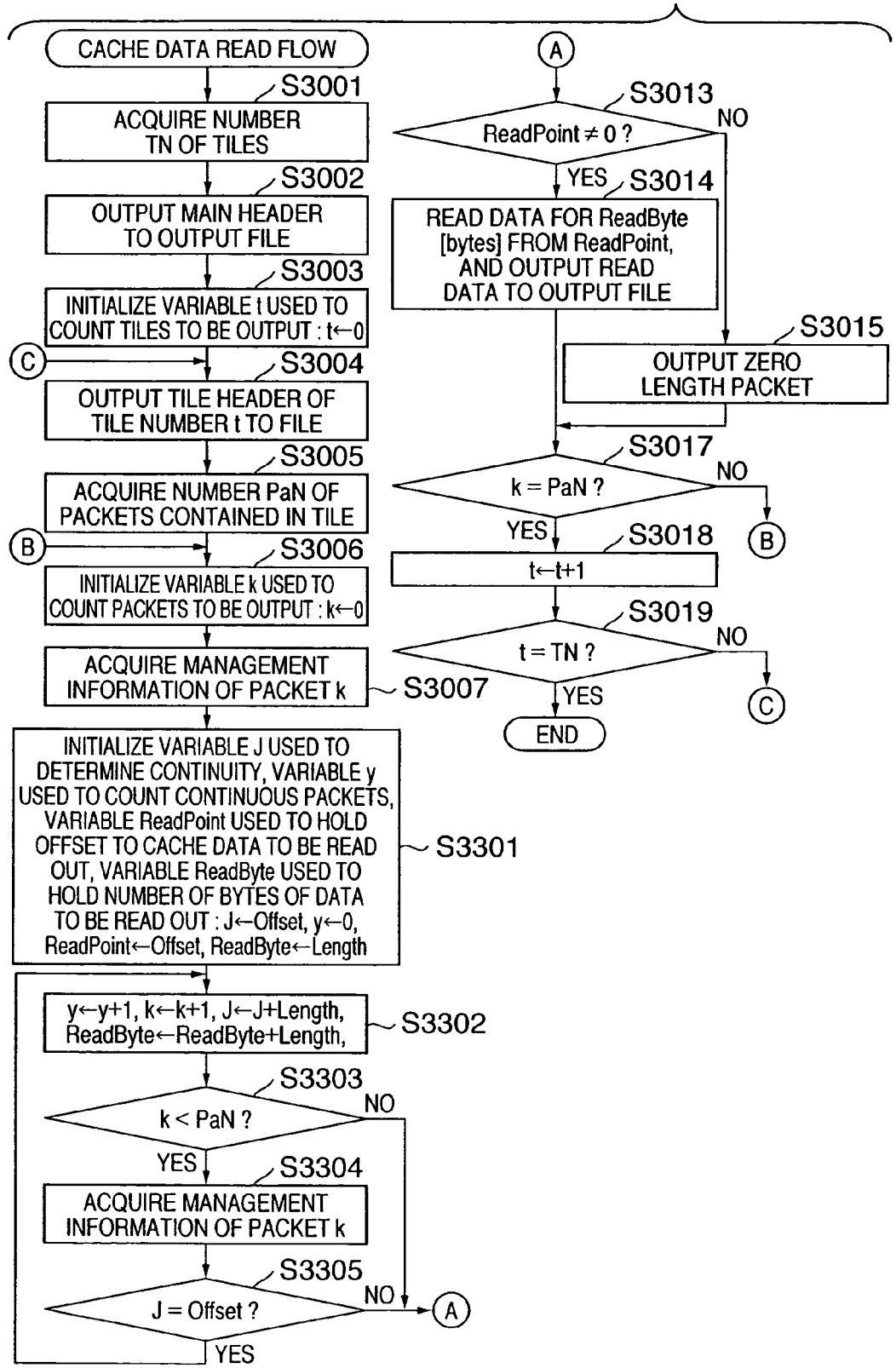
FIG. 33 is a flow chart of the process for reading out packet data of respective tiles from a cache file to an output file.

A process for generating a JPEG2000 bitstream from the cache file according to this embodiment will be described below. FIG. 33 is a flow chart showing the process for reading out data of packets of respective tiles from the cache file to an output file. Note that the program according to the flow chart of FIG. 33 is saved in the secondary memory 1703, is loaded onto the primary memory 1702 under the control of the CPU 1701, and is executed by the CPU 1701, so as to allow the client terminal 1801 (or 1802) to implement the process to be described below. Note that the same step numbers in FIG. 33 denote the same processes as those in steps shown in FIG. 30, and a description thereof will be omitted since they have already been explained.

In steps S3001 to S3007, the same processes as in the sixth embodiment are executed. Next, variables to be described below are initialized (step S3301).

The value of Offset acquired in step S3007 is substituted in variable J to initialize it. This variable J is used to determine if packets are included in an identical tile and continuously appear in that tile in data of respective packets appended to the cache file.

Zero is substituted in variable y to initialize it. This variable y is used to count the number of packets which are included in an identical tile and continuously appear in that tile in data of respective packets appended to the cache file.

The value indicated by Offset acquired in step S3007 is substituted in variable ReadPoint. This variable ReadPoint holds an offset value from the head of the cache file to that of packet data to be read out, i.e., the read position of the packet data to be read out in the cache file.

Zero is substituted in variable ReadByte to initialize it. This variable ReadByte holds the data length of a packet group to be read out (a packet group which has serial seqNumber values).

Upon completion of the initialization process, the values of variable y used to count continuous packets, and variable k used to count packets are respectively incremented by one, and the value of Length is added to the values of variable J used to determine continuity, and variable ReadByte used to hold the data length of a packet group to be read out (a packet group which has serial seqNumber values) (step S3302).

Since the value of Length is added to that of variable J, variable J stores the offset value from the head of the cache file to that of a packet (to be referred to as packet (k+1) hereinafter), which is appended to the cache file immediately after a packet (to be referred to as packet k hereinafter) corresponding to seqNumber as the same value as the value indicated by variable k in the packet group of tile with tile number t.

It is then checked if the value of variable k has reached the total number PaN of packets contained in the tile of tile number t (step S3303).

If k=PaN, it is determined that data of all packets contained in the tile of tile number t have been output to the output file, and the flow advances to step S3013.

On the other hand, if k<PaN, it is determined that data of packets, which are contained in tile of tile number t and are to be output to the output file, still remain, and the flow advances to step S3304 to acquire management information of packet (k+1) (step S3304). That is, the management information of the packet (packet (k+1)) next to that of the packet (packet k) acquired in step S3007 is acquired.

It is checked if the value of variable J is equal to that of Offset (step S3305). If J=Offset, this means that packets k and (k+1) are continuously appended to the cache file. Therefore, the flow returns to step S3302 to check if data of another packet is continuously appended.

On the other hand, if J≠Offset, this means that packets k and (k+1) are not continuously appended to the cache file. Therefore, the flow advances to step S3013.

In this embodiment, the processes in step S3013 and subsequent steps are substantially the same as those in FIG. 30, except that step S3016 is not present.

As described above, according to this embodiment, since no SeqFlag is used, the cache file size can be reduced compared to the above embodiments. Since this SeqFlag is present for each packet in the fifth and sixth embodiments, the number of this flag increases as the number of packets increases. However, since this embodiment does not use any SeqFlag, the effect of this embodiment becomes larger as the number of packets increases.

As described above, when encoded data is received and cached according to the present invention, the time required to access the cached data and the number of times of access can be reduced.

Eighth Embodiment

Note that the features of the present invention have been separately described in the respective embodiments for the sake of simplicity. However, upon putting such product into the market in practice, it is very effective to combine the first and second embodiments, and the fifth to seventh embodiments. For example, the cache method described in the fifth or seventh embodiment can be applied to the cache method for respective tiles in the first and second embodiments. More specifically, upon generating a file that caches received packets for each tile, the client controls the sequence of cache data for each tile. For each fully loaded tile, a JPEG2000 code stream is generated from the cache file using the method explained in the sixth or seventh embodiment.

In this embodiment, assume that the client accesses an image which is segmented into 11 tiles in the horizontal direction and 10 tiles in the vertical direction, as shown in FIG. 34A. The image contains four. small images.

Figure 35:
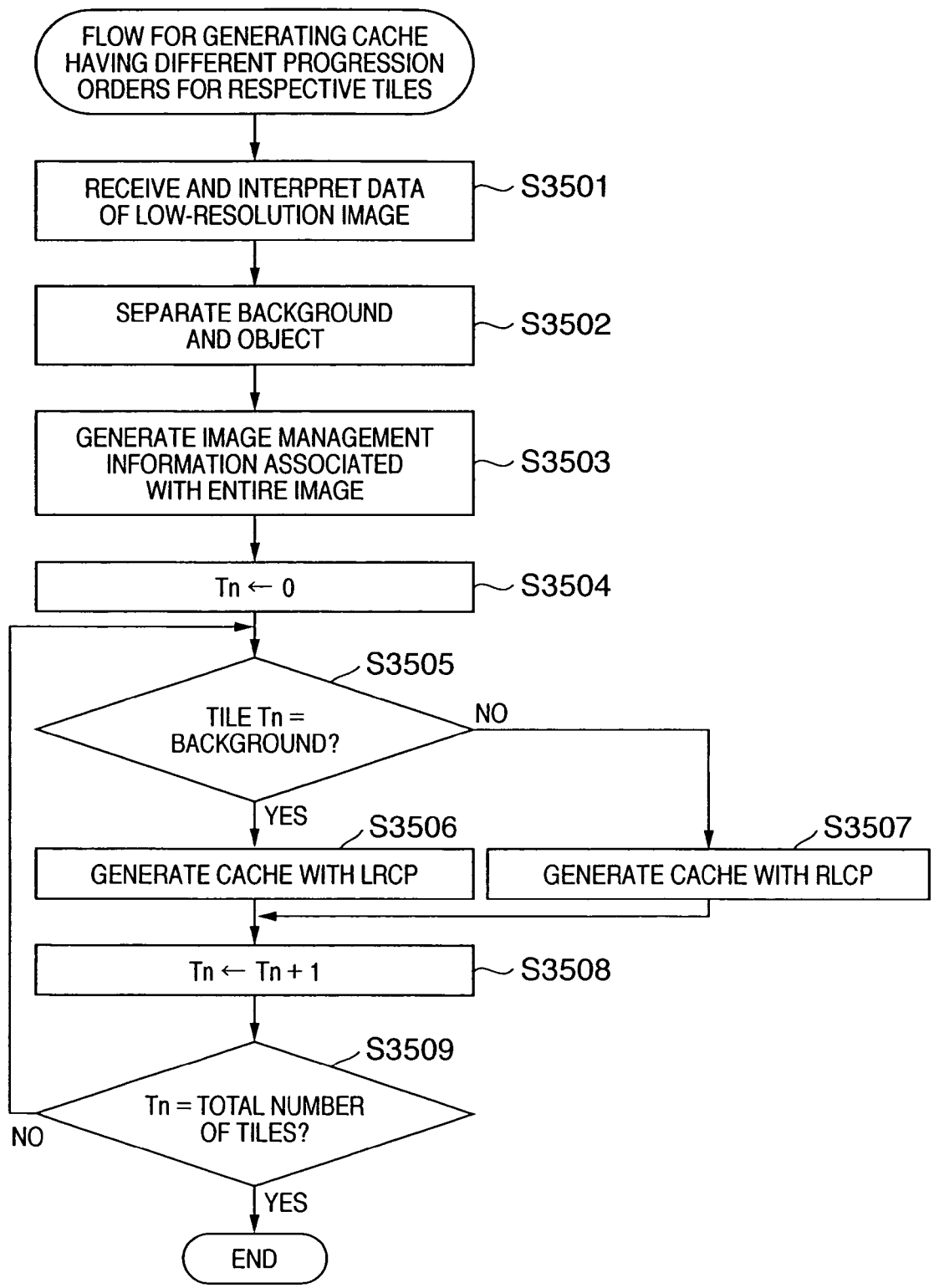
FIG. 35 is a flow chart showing a cache file generation process according to the eighth embodiment of the present invention.

The cache method of this image (FIG. 34A) on the client side will be described below using the flow chart of FIG. 35. In step S3501, the client receives the main header and data of resolution level 0 and layer 0 so as to display the entire image at a low resolution. After that, the client interprets the main header to obtain the total number of tiles. In this embodiment, the total number of tiles is 110.

In step S3502, the client makes region segmentation using the low-resolution image to segment that image into tiles Tbg which belong to only a background, and tiles Tobj which contain objects. Various region segmentation methods are available but are not the gist of the present invention, and a description thereof will be omitted. In this embodiment, color-coded tiles in FIG. 34B are classified to Tbg, and white tiles are classified to Tobj.

In step S3503, the client generates management information associated with the entire image from information obtained by interpretation in step S3501.

In step S3504 and subsequent steps, the client generates a cache file for each tile.

In step S3504, "0" is substituted in variable Tn for a tile number to initialize it.

It is checked in step S3505 if tile Tn is tile Tbg which belongs to a background or tile Tobj which contains an object. If Tn is Tbg, the flow advances to step S3506 to generate a cache file for Tn with LRCP progression order. On the other hand, if it is determined in step S3505 that Tn is Tobj, the flow advances to step S3507 to generate a cache file for tile Tn with RLCP progression order.

In step S3508, variable Tn for a tile number is incremented by one. It is checked in step S3509 if the value Tn is equal to the total number of tiles of this image. If the value Tn is equal to the total number of tiles, it is determined that the cache files have been generated for all the tiles, and this flow ends.

On the other hand, if the value Tn is not equal to the total number of tiles, it is determined that tiles for which cache files are to be generated still remain, the flow returns to step S3505. In this embodiment, if Tn=110, this flow ends.

The cache files for respective tiles, which are generated in the aforementioned flow, can be sorted to the order in which they can easily cache received data, as described in the fifth, sixth, and seventh embodiments, and data can then be written in these files.

When bitstreams for respective tiles are generated from the cache files generated in this way, bitstreams with LRCP progression order are generated for tiles which belong to only the background whose details are not important, and bitstreams with RLCP progression order are generated for tiles which contain objects whose details are more likely to be displayed. That is, bitstreams having progression orders corresponding to tile properties are generated.

On the other hand, one JPEG2000 bitstream in which progression orders are changed for respective tiles can be generated. However, since one bitstream need not handle a plurality of progression orders when independent bitstreams are generated for respective tiles, the implementation load on the decoder can be reduced.

In this embodiment, the background and object are distinguished for respective tiles using the region segmentation of the low-resolution image. Alternatively, meta data that describes object positions may be received and used.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code itself installed in the computer also implements the present invention. In other words, the claims of the present invention also cover a computer program for the purpose of implementing the functions of the present invention.

In this case, so long as the system or apparatus has the functions of the program, the program may be executed in any form, e.g., as object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

Further, it is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Furthermore, besides the case where the aforesaid functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As described above, according to the present invention, encoded data, which can be used by a versatile JPEG2000 decoder in a client, and can assure a high-speed decode process of the encoded data and a high-speed display process of image data, can be suitably generated using fragmentary encoded data cached in the client, and fragmentary encoded data received as needed from the server.

The present invention is not limited to the above embodiments and various changes and modification can be made within the spirit and scope of the present inventions. Therefore, to apprise the public of the scope of the present invention, the following claims are made.

What is claimed is:

1. An encoded data generation method for generating data encoded in a JPEG2000 format, performed by a client apparatus including storage means for storing fragmentary first encoded data of JPEG2000 encoded data managed by a server apparatus, the method comprising:

a calculation step of calculating second encoded data from the JPEG2000 encoded data managed by the server apparatus, wherein the second encoded data is designated as a portion of the JPEG2000 encoded data managed by the server apparatus and excludes the fragmentary first encoded data stored in the storage means;

a request step of requesting of the server apparatus the second encoded data calculated in the calculation step;

an acquisition step of acquiring the second encoded data from the server apparatus;

a storage step of storing in the storage means the second encoded data acquired in the acquisition step;

a segmentation step of segmenting the JPEG2000 encoded data managed by the server apparatus into a plurality of tiles, each tile being a unit of display and including a plurality of layers;

a first determination step of determining, whether each of the plurality of tiles is a complete tile, wherein each of the plurality of layers of the complete tile is stored in the storage means, or an incomplete tile, wherein at least one of the plurality of layers of the incomplete tile is not stored in the storage means;

a second determination step of determining whether each tile determined to be the complete tile in the first determination step includes data encoded in the JPEG2000 format;

a removing step of removing, from the storage means, management information for managing each tile determined in the second determination step not to include data encoded in the JPEG2000 format;

a first encoding step of encoding, in the JPEG2000 format, data of each tile determined in the second determination step not to include data encoded in the JPEG2000 format;

a second encoding step of encoding, in the JPEG2000 format, dummy data in place of layers that are not stored in the storage means for each tile determined in the first determination step to be the incomplete tile, and maintaining in the storage means management information for managing each tile determined in the first determination step to be the incomplete tile; and an output step of outputting data encoded in the first and second encoding steps, the data output in the output step being encoded in the JPEG2000 format.

2. The method according to claim 1, wherein the dummy encoded data is zero length packet data encoded in the JPEG2000 format.

3. The method according to claim 1, wherein the client apparatus further comprises display means for displaying image data, wherein the fragmentary first encoded data is encoded data of the image data, and wherein said method further comprises:

a setting step of setting a portion of the JPEG2000 encoded data managed by the server apparatus that is designated by the user by at least one of moving and enlarging a display region of image data displayed by the display means;

a decoding step of decoding the encoded data encoded in the JPEG2000 format output in the output step; and a displaying step of displaying the decoded image data on a screen of the display means.

4. The method according to claim 1, wherein the first and second determination steps, the removing step, the first and second encoding steps, and the output step are processed in parallel for at least two tiles of the plurality of tiles formed in the segmentation step.

5. An encoded data generation apparatus for generating data encoded in a JPEG2000 format, the apparatus comprising:

a first storage unit configured to store fragmentary first encoded data of JPEG2000 encoded data managed by a server apparatus;

a calculation unit configured to calculate second encoded data from the JPEG2000 encoded data managed by the server apparatus, wherein the second encoded data is designated as a portion of the JPEG2000 encoded data managed by the server apparatus and excludes the fragmentary first encoded data stored in the first storage unit;

a request unit configured to request of the server apparatus the second encoded data calculated by the calculation unit;

an acquisition unit configured to acquire the second encoded data from the server apparatus;

a second storage unit configured to store the second encoded data acquired by the acquisition unit;

a segmentation unit configured to segment the JPEG2000 encoded data managed by the server apparatus into a plurality of tiles, each tile being a unit of display and including a plurality of layers;

a first determination unit configured to determine, whether each of the plurality of tiles is a complete tile, wherein each of the plurality of layers of the complete tile is stored in the first storage unit, or an incomplete tile, wherein at least one of the plurality of layers of the incomplete tile is not stored in the first storage unit;

a second determination unit configured to determine whether each tile determined to be the complete tile by the first determination unit includes data encoded in the JPEG2000 format;

a removing unit configured to remove, from the first storage unit, management information for managing each tile determined by the second determination unit not to include data encoded in the JPEG2000 format;

a first encoding unit configured to encode, in the JPEG2000 format, data of each tile determined by the second determination unit not to include data encoded in the JPEG2000 format;

a second encoding unit configured to encode, in the JPEG2000 format, dummy data in place of layers that are not stored in the first storage unit for each tile determined by the first determination unit to be the incomplete tile, and maintaining in the first storage unit management information for managing each tile determined by the first determination unit to be the incomplete tile; and an output unit configured to output data encoded by the first and second encoding unit, the data output by the output unit being encoded in the JPEG2000 format.

6. The encoded data generation apparatus according to claim 5, wherein the encoded data generation apparatus and the server apparatus communicate with each other via a network.

7. A computer-readable medium encoded with computer-readable instructions for causing a computer including storage means for storing fragmentary first encoded data of JPEG2000 encoded data managed by a server apparatus to perform a method for generating data encoded in a JPEG2000 format, the method comprising:

a calculation step of calculating second encoded data from the JPEG2000 encoded data managed by the server apparatus, wherein the second encoded data is designated as a portion of the JPEG2000 encoded data managed by the server apparatus and excludes the fragmentary first encoded data stored in the storage means;

a request step of requesting of the server apparatus the second encoded data calculated in the calculation step;

an acquisition step of acquiring the second encoded data from the server apparatus;

a storage step of storing in the storage means the second encoded data acquired in the acquisition step;

a segmentation step of segmenting the JPEG2000 encoded data managed by the server apparatus into a plurality of tiles, each tile being a unit of display and including a plurality of layers;

a first determination step of determining, whether each of the plurality of tiles is a complete tile, wherein each of the plurality of layers of the complete tile is stored in the storage means, or an incomplete tile, wherein at least one of the plurality of layers of the incomplete tile is not stored in the storage means;

a second determination step of determining whether each tile determined to be the complete tile in the first determination step includes data encoded in the JPEG2000 format;

a removing step of removing, from the storage means, management information for managing each tile determined in the second determination step not to include data encoded in the JPEG2000 format;

a first encoding step of encoding. in the JPEG2000 format, data of each tile determined in the second determination step not to include data encoded in the JPEG2000 format;

a second encoding step of encoding, in the JPEG2000 format, dummy data in place of layers that are not stored in the storage means for each tile determined in the first determination step to be the incomplete tile, and maintaining in the storage means management information for managing each tile determined in the first determination step to be the incomplete tile; and an output step of outputting data encoded in the first and second encoding steps, the data output in the output step being encoded in the JPEG2000 format.

* * * * *